US012756043B2

(12) United States Patent
Fujimoto et al.

(10) Patent No.: US 12,756,043 B2
(45) Date of Patent: Oct. 6, 2026

(54) ELECTRIC APPARATUS

(71) Applicant: MAKITA CORPORATION, Anjo (JP)

(72) Inventors: Yasuyuki Fujimoto, Anjo (JP); Masao Miwa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 1050 days.

(21) Appl. No.: 17/913,623

(22) PCT Filed: Mar. 12, 2021

(86) PCT No.: PCT/JP2021/010079

§ 371 (c)(1),
(2) Date: Sep. 22, 2022

(87) PCT Pub. No.: WO2021/220637

PCT Pub. Date: Nov. 4, 2021

(65) Prior Publication Data

US 2023/0142408 A1 May 11, 2023

(30) Foreign Application Priority Data

Apr. 27, 2020 (JP) ................................ 2020-078466
Feb. 8, 2021 (JP) ................................ 2021-018375

(51) Int. Cl.
*H01M 50/20* (2021.01)
*H01M 50/209* (2021.01)
(Continued)

(52) U.S. Cl.
CPC ......... *H01M 50/20* (2021.01); *H01M 50/209* (2021.01); *H01M 50/244* (2021.01); *H01M 50/271* (2021.01)

(58) Field of Classification Search
None
See application file for complete search history.

(56) References Cited

U.S. PATENT DOCUMENTS 9,954,205 B2 * 4/2018 Liu .................... H01M 50/514
2011/0197389 A1 * 8/2011 Ota .................... H01M 50/213
429/121

(Continued)

FOREIGN PATENT DOCUMENTS

JP H04-370659 A 12/1992
JP H08-45490 A 2/1996
WO 2019/017249 A1 1/2019

OTHER PUBLICATIONS

Jun. 1, 2021 International Search Report issued in International Patent Application No. PCT/JP2021/010079.

(Continued)

*Primary Examiner* — Maria Laios
(74) *Attorney, Agent, or Firm* — Oliff PLC

(57) ABSTRACT

An electrical apparatus includes a body including an output portion, a battery holder having a first surface and a second surface, a first battery mount located on the first surface and including a first guide to allow a first battery to slide on the first battery mount while being guided along the first guide for attachment to and detachment from the first battery mount, and a second battery mount located on the second surface and including a second guide to allow a second battery to slide on the second battery mount while being guided along the second guide for attachment to and detachment from the second battery mount.

16 Claims, 38 Drawing Sheets

(51) Int. Cl.
*H01M 50/244* (2021.01)
*H01M 50/271* (2021.01)

(56) References Cited

U.S. PATENT DOCUMENTS

| | | | | |
|---|---|---|---|---|
| 2012/0052356 | A1* | 3/2012 | Sugiura | H01M 50/244 429/100 |
| 2014/0240438 | A1* | 8/2014 | Furuyama | H01M 50/213 347/222 |
| 2020/0119318 | A1* | 4/2020 | Okuoka | H01M 50/271 |
| 2021/0013540 | A1* | 1/2021 | Liu | H01M 10/0525 |
| 2021/0140620 | A1 | 5/2021 | Tsuge et al. | |

OTHER PUBLICATIONS

Oct. 27, 2022 International Preliminary Report on Patentability issued in International Application No. PCT/JP2021/010079.

* cited by examiner

ELECTRIC APPARATUS

FIELD

The present disclosure relates to an electrical apparatus.

BACKGROUND

Known electrical apparatuses are powered by batteries. WO 2019/017249 describes an illuminator powered by batteries for power tools.

BRIEF SUMMARY

Technical Problem

Electrical apparatuses powered by batteries are often used at work sites. Electrical apparatuses are to be miniaturized for placement that does not obstruct operations or for easy portability.

One or more aspects of the present disclosure are directed to an electrical apparatus that is powered by batteries and miniaturized.

Solution to Problem

A first aspect of the present disclosure provides an electrical apparatus to which a first battery or a second battery is detachably attachable, the apparatus including:

a body including an output portion;

a battery holder having a first surface and a second surface;

a first battery mount on the first surface, the first battery mount including a first guide to allow the first battery to slide on the first battery mount while being guided along the first guide for attachment to and detachment from the first battery mount; and a second battery mount on the second surface, the second battery mount including a second guide to allow the second battery to slide on the second battery mount while being guided along the second guide for attachment to and detachment from the second battery mount.

A second aspect of the present disclosure provides an electrical apparatus to which a first battery or a second battery is detachably attachable, the apparatus including:

a body including an output portion;

a cover configured to define, with the body, a battery compartment;

a first battery mount to which the first battery is attachable, the first battery mount being located on a first surface of the body facing the battery compartment; and a second battery mount to which the second battery is attachable, the second battery mount being located on at least one second surface of the cover facing the battery compartment.

Advantageous Effects

The electrical apparatus according to the above aspects of the present disclosure is powered by batteries and miniaturized.

DETAILED DESCRIPTION

Although one or more embodiments of the present disclosure will now be described with reference to the drawings, the present disclosure is not limited to the embodiments. The components in the embodiments described below may be combined as appropriate. One or more components may be eliminated.

In the embodiments, the positional relationships between the components will be described using the directional terms such as front and rear (or frontward and rearward), right and left (or lateral), and up and down (or vertical). The terms indicate relative positions or directions with respect to the center of an electrical apparatus.

First Embodiment

Overview of Electrical Apparatus

Figure 1:
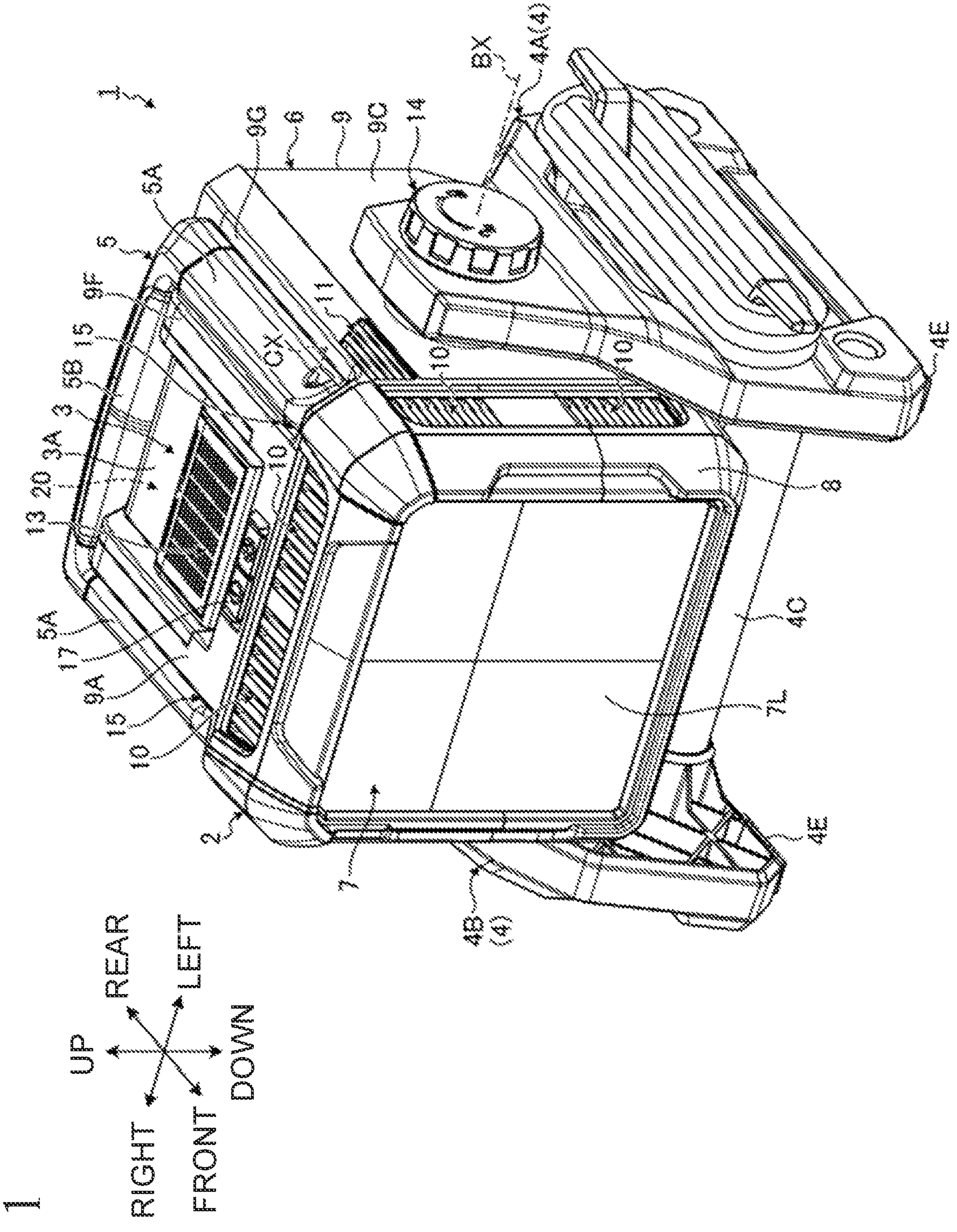
FIG. 1 is a perspective view of an electrical apparatus according to a first embodiment as viewed from the left front.
Figure 2:
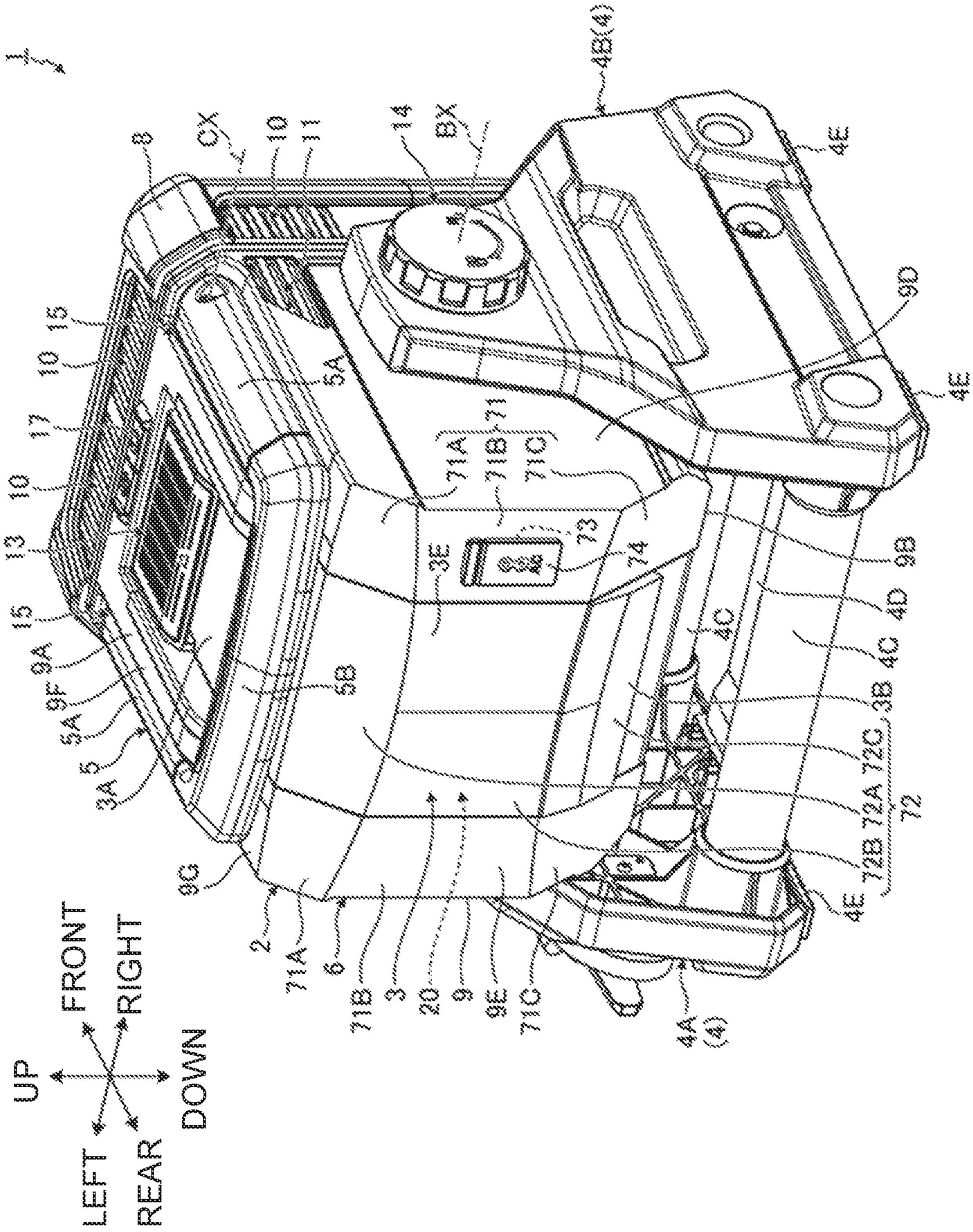
FIG. 2 is a perspective view of the electrical apparatus according to the first embodiment as viewed from the right rear.

FIG. 1 is a perspective view of an electrical apparatus 1 according to an embodiment as viewed from the left front. FIG. 2 is a perspective view of the electrical apparatus 1 as viewed from the right rear.

The electrical apparatus 1 according to the embodiment is an illuminator.

As shown in FIGS. 1 and 2, the electrical apparatus 1 includes a body 2, a cover 3, a leg 4, and a handle 5. The cover 3 is joined to the body 2. The leg 4 is joined to the body 2. The handle 5 is joined to the body 2.

The body 2 includes a housing 6 and a light emitter 7.

The housing 6 includes a front housing 8 and a rear housing 9. The front housing 8 is located frontward from the rear housing 9.

The front housing 8 is a rectangular frame. The front housing 8 surrounds the light emitter 7. The front housing 8 accommodates at least a part of the light emitter 7. The front housing 8 has vents 10 in its upper, lower, left, and right portions. The vents 10 connect the inside and the outside of the housing 6.

The rear housing 9 is connected to the rear end of the front housing 8. The rear housing 9 includes an upper plate 9A, a lower plate 9B, a left plate 9C, a right plate 9D, and a rear plate 9E. Each of the lower plate 9B, the left plate 9C, and the right plate 9D has vents 11. The vents 11 connect the inside and the outside of the housing 6.

Figure 6:
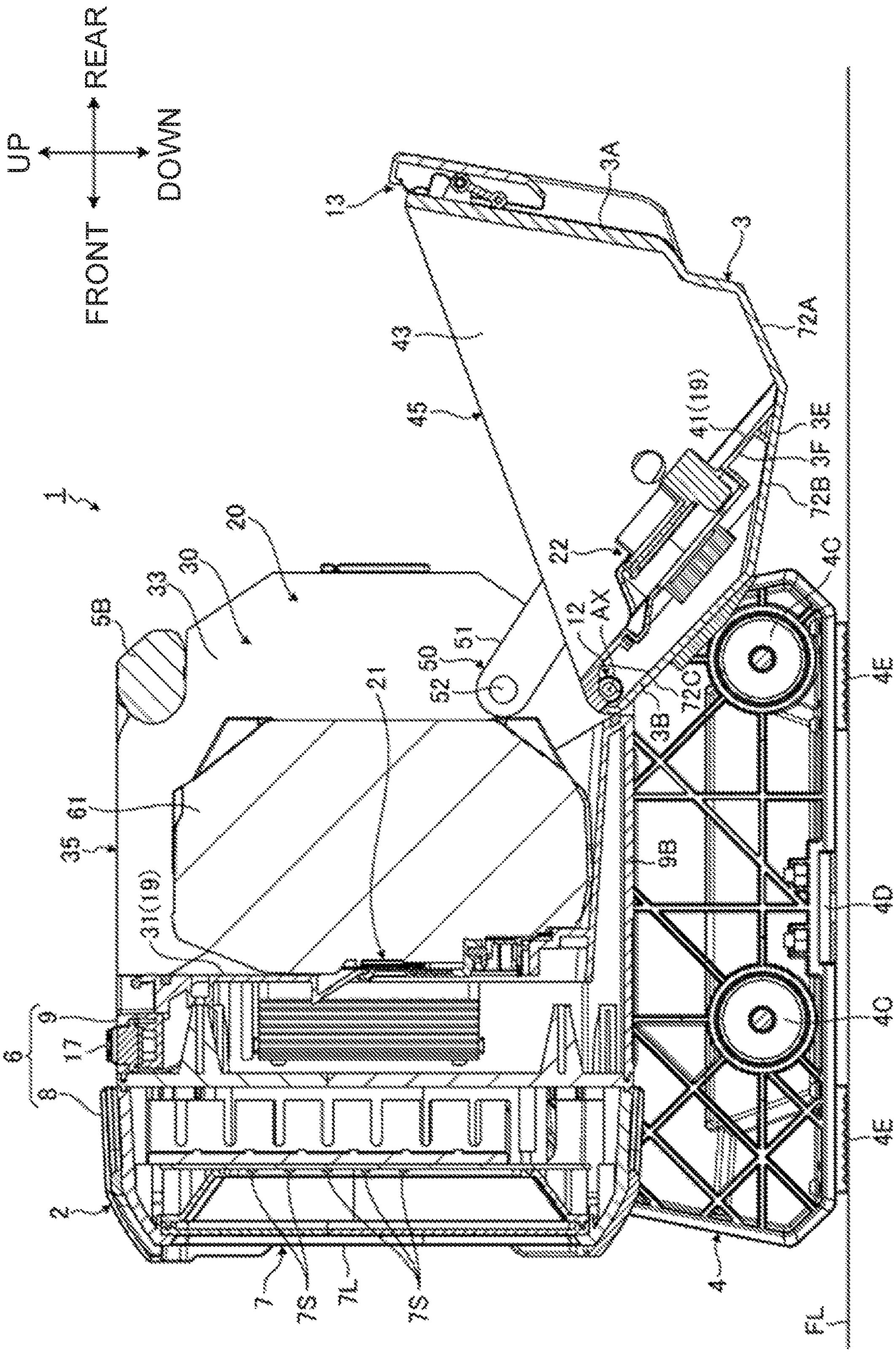
FIG. 6 is a cross-sectional side view of the electrical apparatus according to the first embodiment.
Figure 7:
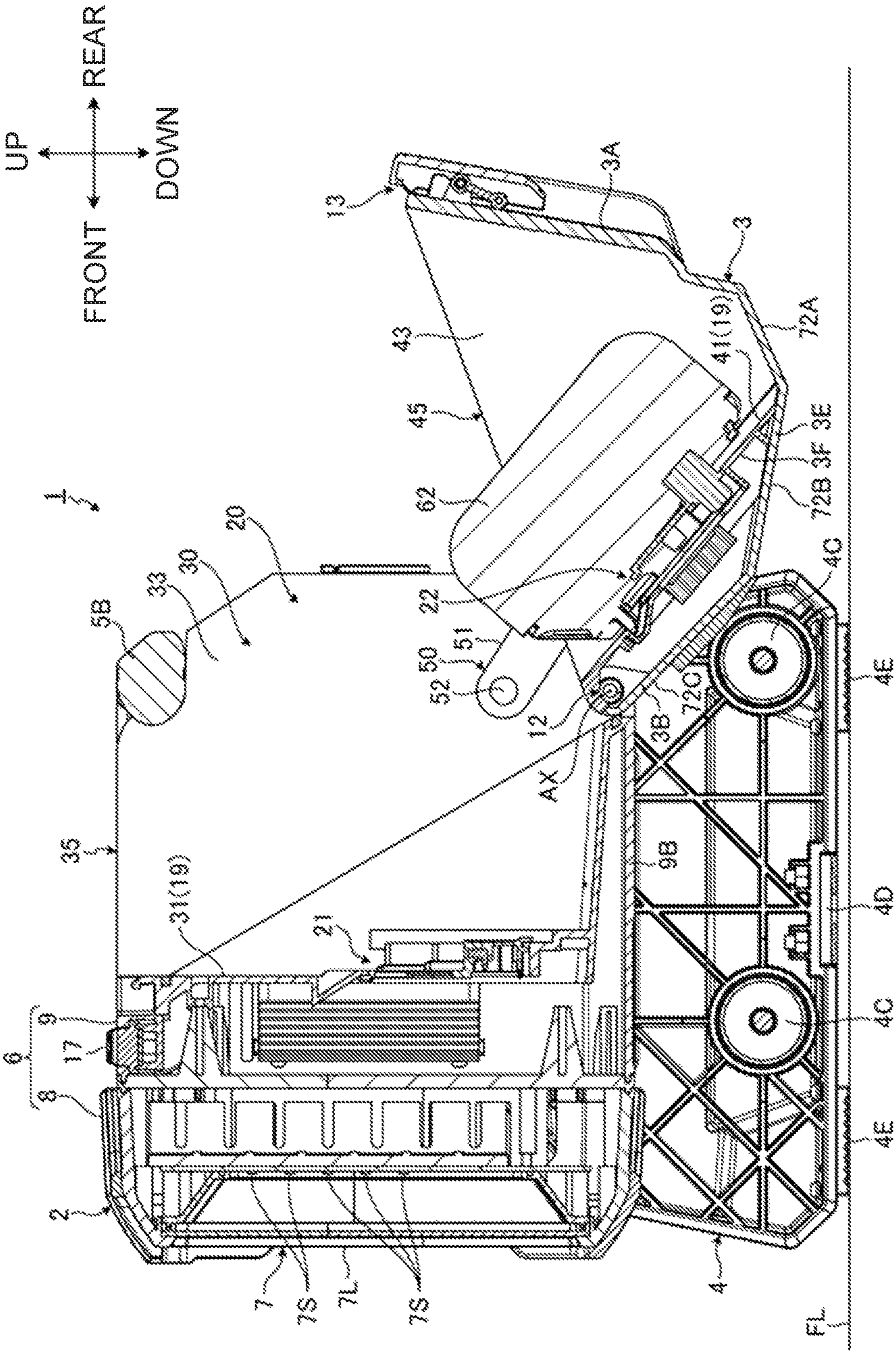
FIG. 7 is a cross-sectional side view of the electrical apparatus according to the first embodiment.

The light emitter 7 emits light frontward. The light emitter 7 is an output portion of the electrical apparatus 1 for outputting light. The light emitter 7 is located on a front portion of the body 2. As shown in FIGS. 6 and 7, the light emitter 7 includes multiple light sources 7S and a lens 7L. The lens 7L is located in front of the light sources 7S. The light sources 7S include, for example, light-emitting diodes (LEDs). The lens 7L is a light-transmissive plate.

The cover 3 defines, with the body 2, a battery compartment 20. The cover 3 is connected to a rear portion of the body 2. The body 2 in the embodiment has its rear portion being a rear portion of the rear housing 9.

The rear housing 9 has rear surfaces 71. The cover 3 has a rear surface 72. The rear surfaces 71 are located on the left and right of the rear surface 72.

Each rear surface 71 of the rear housing 9 includes an upper area 71A, an intermediate area 71B, and a lower area 71C. Each intermediate area 71B is between the corresponding upper area 71A and the corresponding lower area 71C. The upper areas 71A slope upward and frontward. The lower areas 71C slope downward and frontward. One of the rear surfaces 71 includes, on its intermediate area 71B, an alternating current (AC) terminal 73 connectable to a utility power supply. The AC terminal 73 is covered with a cover 74.

The rear surface 72 of the cover 3 includes an upper area 72A, an intermediate area 72B, and a lower area 72C. The intermediate area 72B is between the upper area 72A and the lower area 72C. The upper area 72A slopes upward and frontward. The lower area 72C slopes downward and frontward.

The leg 4 is joined to the rear housing 9 with joining units 14. The leg 4 includes a left leg 4A and a right leg 4B. The left leg 4A is joined to the left plate 9C of the rear housing 9. The right leg 4B is joined to the right plate 9D of the rear housing 9. The leg 4 is pivotable about a rotation axis BX of the joining units 14. The rotation axis BX extends in the lateral direction. The left leg 4A and the right leg 4B are joined together with two rods 4C and one plate 4D. The left leg 4A and the right leg 4B are pivotable together.

The leg 4 has lower surfaces 4E located below the lower surface of the body 2. The body 2 has its lower surface including the lower surface of the rear housing 9. When the electrical apparatus 1 is placed on a placement surface FL, the leg 4 has the lower surfaces 4E in contact with the placement surface FL.

The handle 5 is grippable by a user of the electrical apparatus 1. The handle 5 includes a pair of arms 5A and a handle portion 5B. The handle portion 5B connects the pair of arms 5A. The handle 5 is joined to the rear housing 9 with hinges 15. The handle 5 is pivotable about a hinge axis CX of the hinges 15. The hinge axis CX extends in the lateral direction.

The upper plate 9A includes a protrusion 9F and a peripheral portion 9G. The protrusion 9F protrudes upward. The peripheral portion 9G surrounds the protrusion 9F. The peripheral portion 9G has the upper surface located below the upper surface of the protrusion 9F. The upper plate 9A includes a step between the upper surface of the protrusion 9F and the peripheral portion 9G. The handle 5 is joined to side surfaces of the protrusion 9F with the hinges 15.

One of the arms 5A is joined to the left side surface of the protrusion 9F with one of the hinges 15. The other arm 5A is joined to the right side surface of the protrusion 9F with another hinge 15. The handle 5 is joined to the body 2 with the hinges 15 to have its handle portion 5B pivotable about the hinge axis CX.

The handle 5 is pivotable to a retracted position and to an in-use position. At the retracted position, the arms 5A and the handle portion 5B face the upper surface of the peripheral portion 9G. The handle 5 at the retracted position is at least partially located above the cover 3. At the in-use position, the arms 5A and the handle portion 5B are apart from the upper surface of the peripheral portion 9G, and the handle portion 5B is located above the hinges 15. The user of the electrical apparatus 1 can move the handle 5 to the in-use position and carry the electrical apparatus 1 while gripping the handle portion 5B.

The electrical apparatus 1 includes a power button 17. The power button 17 is located on a front portion of the upper plate 9A of the rear housing 9. The power button 17 is operable to activate the electrical apparatus 1.

Battery Holder and Battery Compartment

Figure 3:
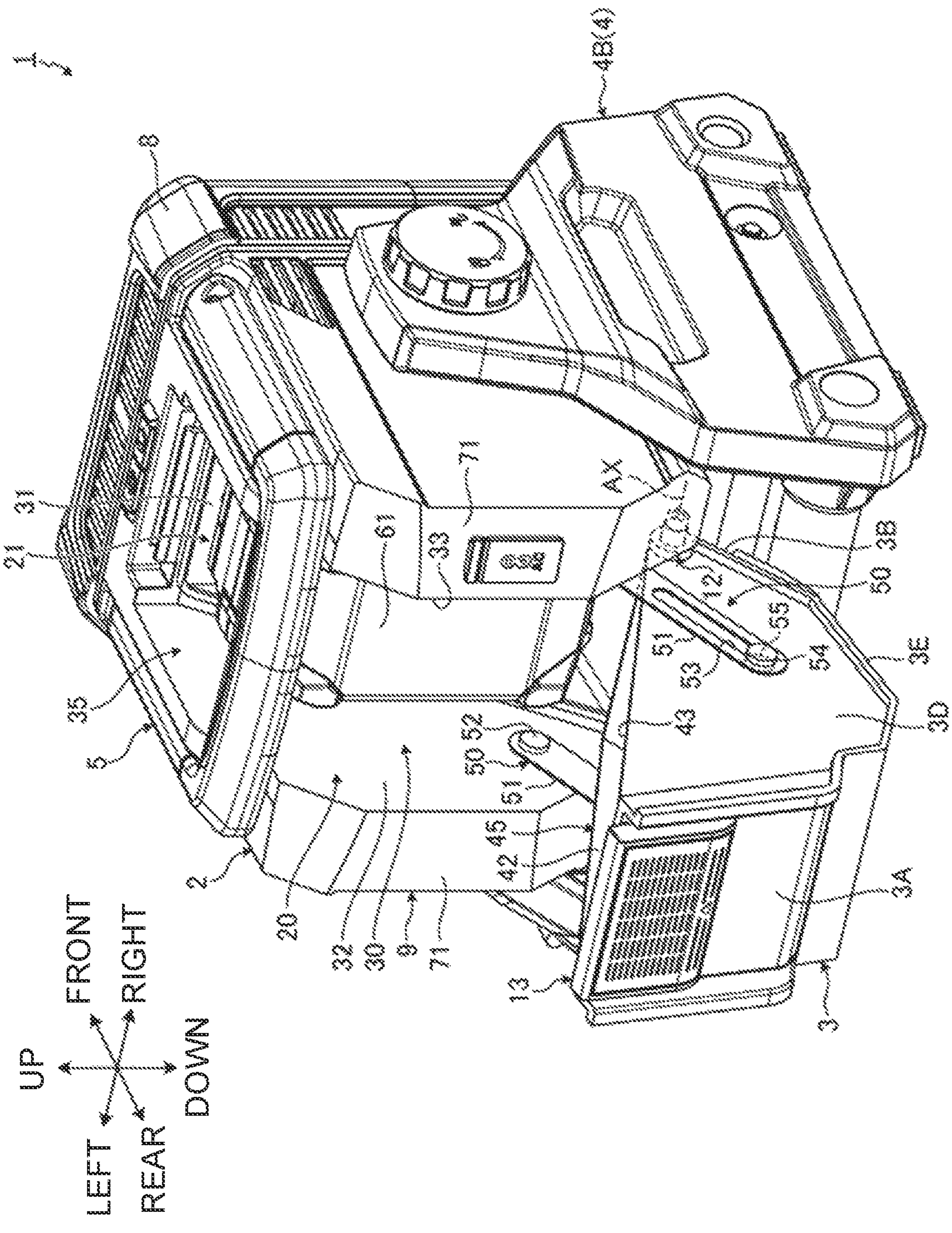
FIG. 3 is a perspective view of the electrical apparatus according to the first embodiment as viewed from the right rear.
Figure 4:
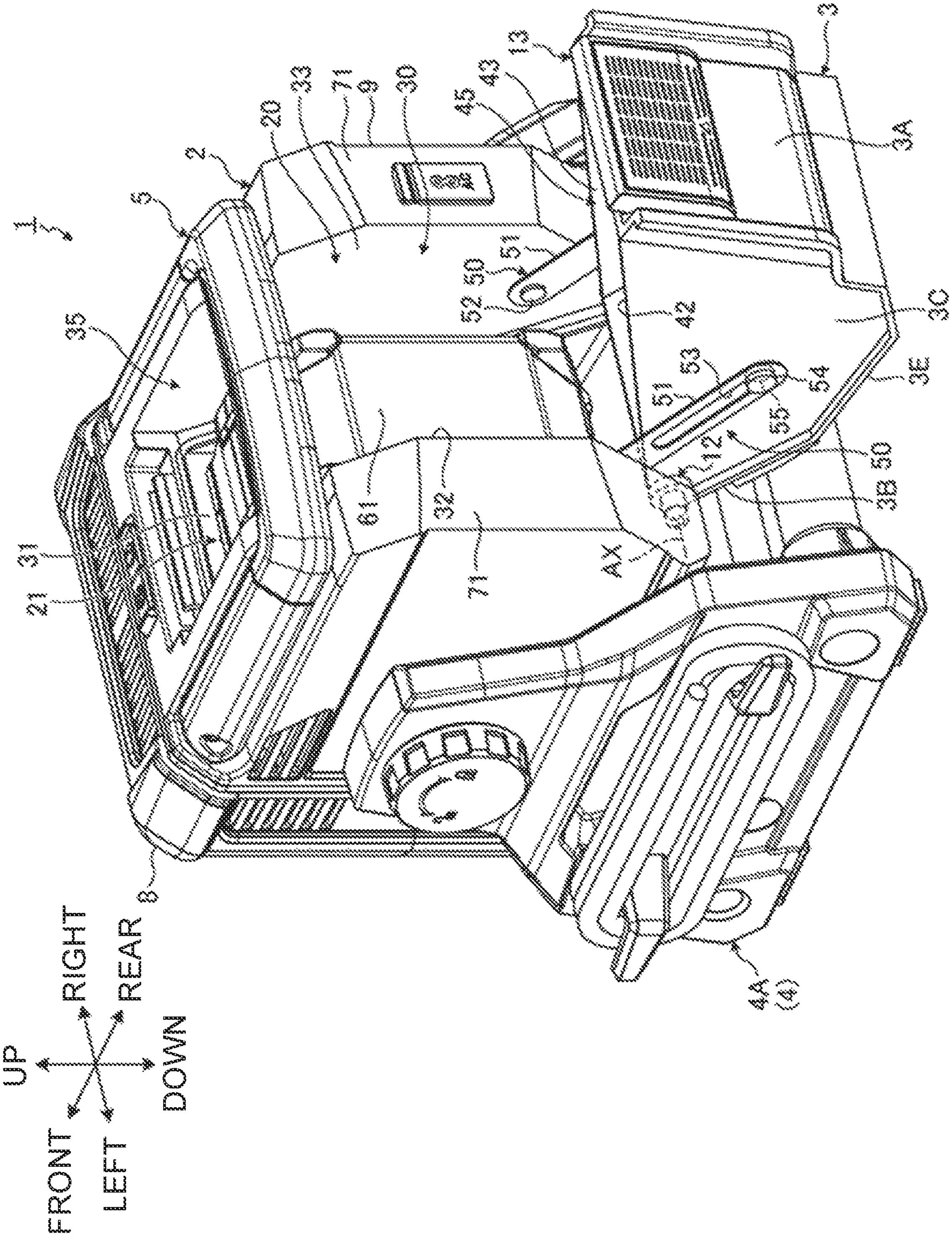
FIG. 4 is a perspective view of the electrical apparatus according to the first embodiment as viewed from the left rear.
Figure 5:
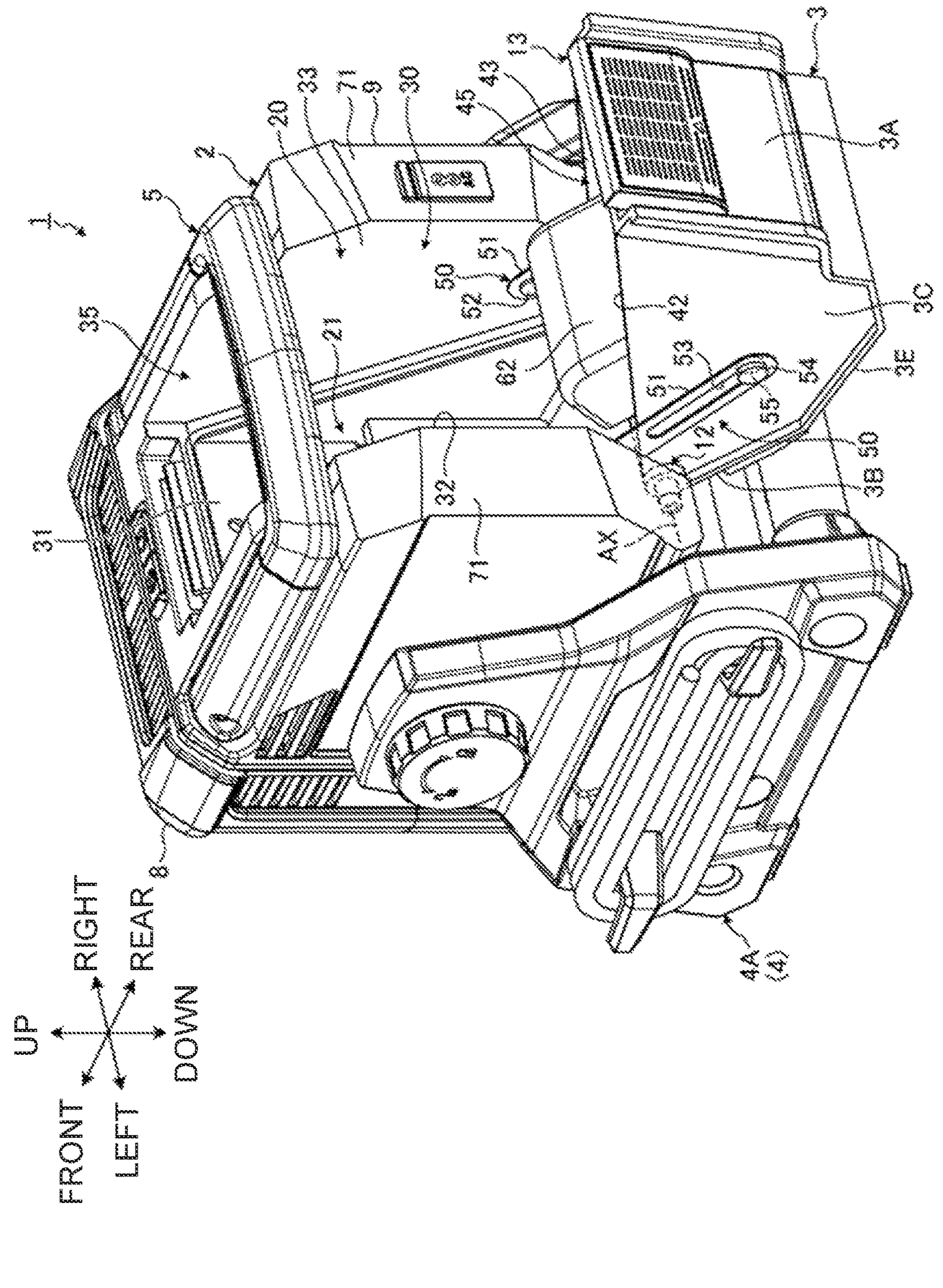
FIG. 5 is a perspective view of the electrical apparatus according to the first embodiment as viewed from the left rear.

FIG. 3 is a perspective view of the electrical apparatus 1 as viewed from the right rear. FIG. 4 is a perspective view of the electrical apparatus 1 as viewed from the left rear. FIG. 5 is a perspective view of the electrical apparatus 1 as viewed from the left rear. FIG. 6 is a cross-sectional side view of the electrical apparatus 1. FIG. 7 is a cross-sectional side view of the electrical apparatus 1.

The electrical apparatus 1 includes a battery holder 19. The battery holder 19 has a support surface 31 (first surface) and a support surface 41 (second surface). The support surface 31 (first surface) receives a battery. The support surface 41 (second surface) receives a battery. The support surface 31 (first surface) and the support surface 41 (second surface) face in different directions. In the embodiment, the support surface 31 is located on the body 2. The support surface 41 is located on the cover 3.

The cover 3 defines, with the body 2, the battery compartment 20. The cover 3 is pivotably joined to the body 2. FIGS. 1 and 2 each show the cover 3 pivoted to close the battery compartment 20. FIGS. 3 to 7 each show the cover 3 pivoted to open the battery compartment 20.

The battery compartment 20 is closed with the cover 3 pivoted to connect to the rear portion of the body 2. The battery compartment 20 is open with the cover 3 pivoted to be apart from the rear portion of the body 2.

The electrical apparatus 1 includes a hinge 12 joining the cover 3 to the body 2. The hinge 12 joins the cover 3 to a lower rear portion of the rear housing 9. The hinge 12 is located at the bottom of the cover 3 when the cover 3 is pivoted to close the battery compartment 20. The cover 3 is pivotably joined to the lower rear portion of the rear housing 9 with the hinge 12. The hinge 12 has its hinge axis AX extending in the lateral direction. The cover 3 is joined to the body 2 with the hinge 12 to have its upper end pivotable about the hinge axis AX.

The cover 3 pivoted to close the battery compartment 20 is herein referred to as the cover 3 being closed for convenience. The cover 3 pivoted to open the battery compartment 20 is herein referred to as the cover 3 being open for convenience. The battery compartment 20 is closed with the cover 3 being closed. The battery compartment 20 is open with the cover 3 being open.

In the embodiment, the cover 3 being closed may be the cover 3 having its upper portion connected to an upper rear portion of the body 2. The cover 3 being closed has the rear surface 72 including the lower area 72C sloping downward and frontward. The cover 3 being open may be the cover 3 having its upper portion apart from the upper rear portion of the body 2.

As shown in FIGS. 3 to 5, the body 2 has a recess 30 in the rear portion. As described above, the rear portion of the body 2 is the rear portion of the rear housing 9. The recess 30 is recessed frontward. The recess 30 is open at its upper end and forms an opening 35. The cover 3 being closed is at least partially located inside the recess 30.

The cover 3 includes an upper plate 3A, a lower plate 3B, a left plate 3C, a right plate 3D, and a rear plate 3E. The left plate 3C and the right plate 3D are arranged in the lateral direction. The left plate 3C and the right plate 3D face each other. When the cover 3 is closed, the lower plate 3B is connected to the left plate 3C and the right plate 3D at their lower ends. When the cover 3 is closed, the rear plate 3E is connected to the left plate 3C and the right plate 3D at their rear ends. When the cover 3 is closed, the left plate 3C and the right plate 3D are located inside the recess 30. The cover 3 has an opening 45. When the cover 3 is closed, the opening 45 is defined by the upper plate 3A, the lower plate 3B, the left plate 3C, and the right plate 3D at their front ends. When the cover 3 is closed, the opening 45 is located at the front end of the cover 3.

The cover 3 includes a support plate 3F between the left plate 3C and the right plate 3D. The support plate 3F has the upper end fastened to the rear plate 3E. The support plate 3F has the lower end fastened to the lower plate 3B. The support plate 3F has the left end fastened to the left plate 3C. The support plate 3F has the right end fastened to the right plate 3D.

The recess 30 in the body 2 has an inner surface including the support surface 31, a left inner surface 32, and a right inner surface 33. The left inner surface 32 is connected to the left end of the support surface 31. The right inner surface 33 is connected to the right end of the support surface 31. The support surface 31 is located frontward from the rear surfaces 71 of the rear housing 9. The support surface 31 faces rearward. The left inner surface 32 faces rightward. The right inner surface 33 faces leftward.

The cover 3 has the inner surface including the support surface 41, a left inner surface 42, and a right inner surface 43. The left inner surface 42 is connected to the left end of the support surface 41. The right inner surface 43 is connected to the right end of the support surface 41. The support surface 41 is located rearward from the support surface 31. The support surface 41 is located on the support plate 3F. When the cover 3 is closed, the support surface 41 faces upward and frontward. The left inner surface 42 is located on the left plate 3C. The left inner surface 42 faces rightward. The right inner surface 43 is located on the right plate 3D. The right inner surface 43 faces leftward.

When the cover 3 is closed, the battery compartment 20 is defined by the support surface 31, the support surface 41, the left inner surface 42, and the right inner surface 43. The support surface 31 faces the battery compartment 20. The support surface 41 faces the battery compartment 20. The left inner surface 42 faces the battery compartment 20. The right inner surface 43 faces the battery compartment 20.

When the cover 3 is open, the battery compartment 20 is partially defined by the support surface 31, the left inner surface 32, and the right inner surface 33. The support surface 31 faces the battery compartment 20. The left inner surface 32 faces the battery compartment 20. The right inner surface 33 faces the battery compartment 20.

When the cover 3 is open, the battery compartment 20 is partially defined by the support surface 41, the left inner surface 42, and the right inner surface 43. The support surface 41 faces the battery compartment 20. The left inner surface 42 faces the battery compartment 20. The right inner surface 43 faces the battery compartment 20.

The cover 3 includes a latch 13. When the cover 3 is closed, the latch 13 is located at the top of the cover 3. The latch 13 fastens the cover 3 connected to the body 2 to the rear housing 9. In this state, the battery compartment 20 is closed.

The electrical apparatus 1 includes linkages 50 joining the cover 3 to the body 2. The linkages 50 are located on the left and right portions of the cover 3. Each linkage 50 includes a link 51, a first joint 52, and a second joint 54. The first joint 52 joins an end of the link 51 to the body 2. The link 51 has the end pivotably joined to the body 2. The link 51 has a guide slot 53 receiving the second joint 54. The second joint 54 is slidable along the guide slot 53. The second joint 54 is received in the guide slot 53 in the link 51 and joined to the cover 3.

In the linkage 50 on the left portion of the cover 3, the first joint 52 joins the end of the link 51 to the left inner surface 32 of the recess 30. The second joint 54 is received in the guide slot 53 and joined to the left surface of the left plate 3C.

In the linkage 50 on the right portion of the cover 3, the first joint 52 joins the end of the link 51 to the right inner surface 33 of the recess 30. The second joint 54 is received in the guide slot 53 and joined to the right surface of the right plate 3D.

The pivot range of the cover 3 is defined by the linkages 50. The cover 3 is pivotable within the pivot range defined by the linkages 50. The pivot range of the cover 3 is defined based on the length of each guide slot 53. As shown in FIGS. 1 and 2, the cover 3 placed at a first end (closing end) of the pivot range is closed. The cover 3 placed at the first end of the pivot range closes the battery compartment 20. As shown in FIGS. 3 to 5, the cover 3 is placed at a second end (opening end) of the pivot range and is thus open with each second joint 54 being placed at an end of the corresponding guide slot 53. In this state, the battery compartment 20 is open.

Each linkage 50 includes a brake 55 between the link 51 and the second joint 54. The brake 55 is, for example, a rubber ring located between the link 51 and the cover 3. The brake 55 reduces the speed of the cover 3 changing from being closed to being open. The brake 55 allows the cover 3 to avoid opening suddenly. The brake 55 may be between the link 51 and the second joint 54.

Each linkage 50 may include a damper that dampens the kinetic energy of the cover 3 changing from being closed to being open. The damper joins, for example, the cover 3 to the body 2. To dampen the kinetic energy of the cover 3, the damper may include an elastic body such as a spring or a rubber piece, or may be a viscous substance such as oil. The damper also allows the cover 3 to avoid opening suddenly.

As shown in FIGS. 6 and 7, the cover 3 placed at the second end of the pivot range is above the lower surface 4E of the leg 4. In other words, the cover 3 is out of contact with the placement surface FL when the lower surface 4E of the leg 4 is in contact with the placement surface FL.

Battery and Battery Mount

Figure 8A:
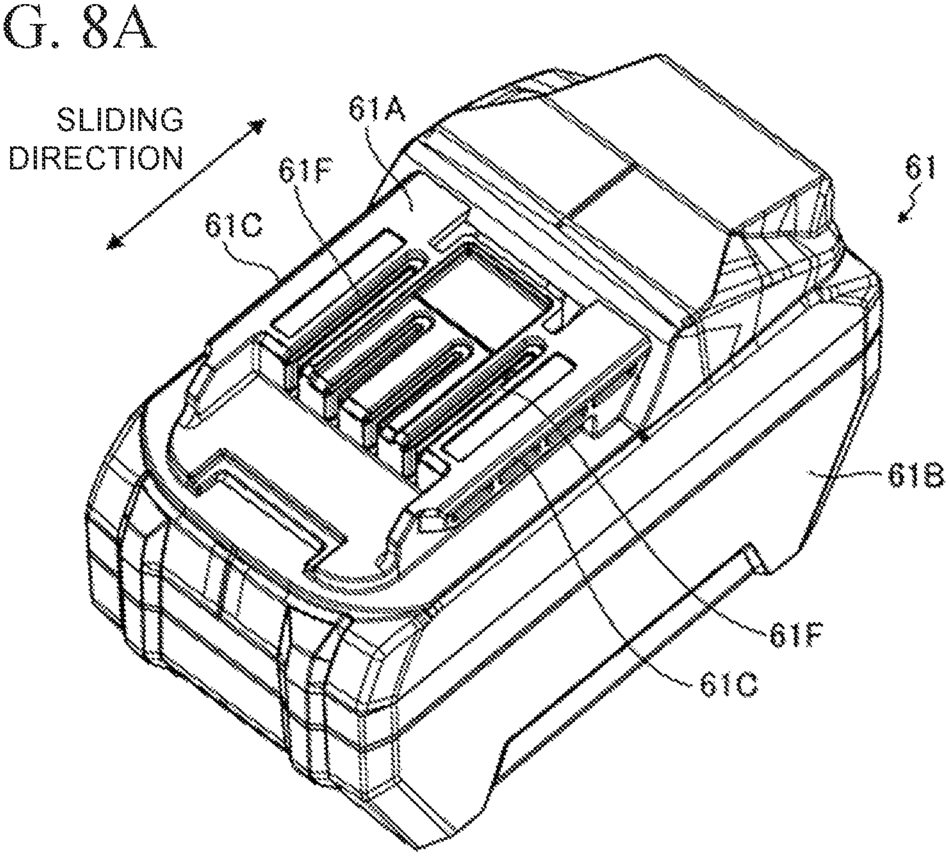
FIG. 8A is a perspective view of a first battery in the first embodiment.
Figure 8B:
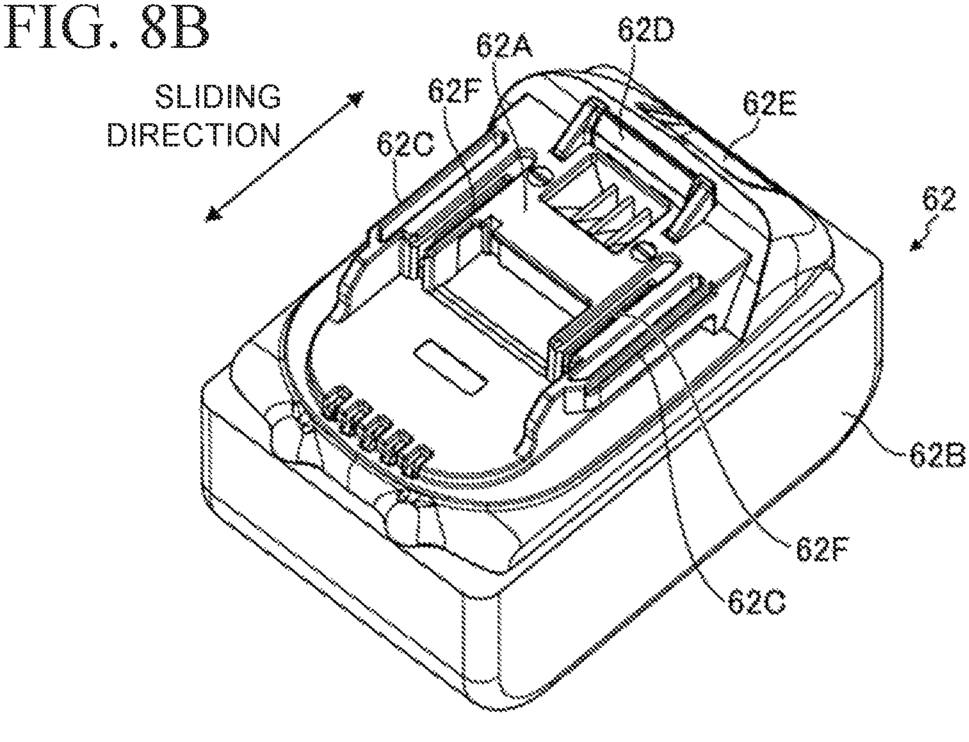
FIG. 8B is a perspective view of a second battery in the first embodiment.
Figure 9:
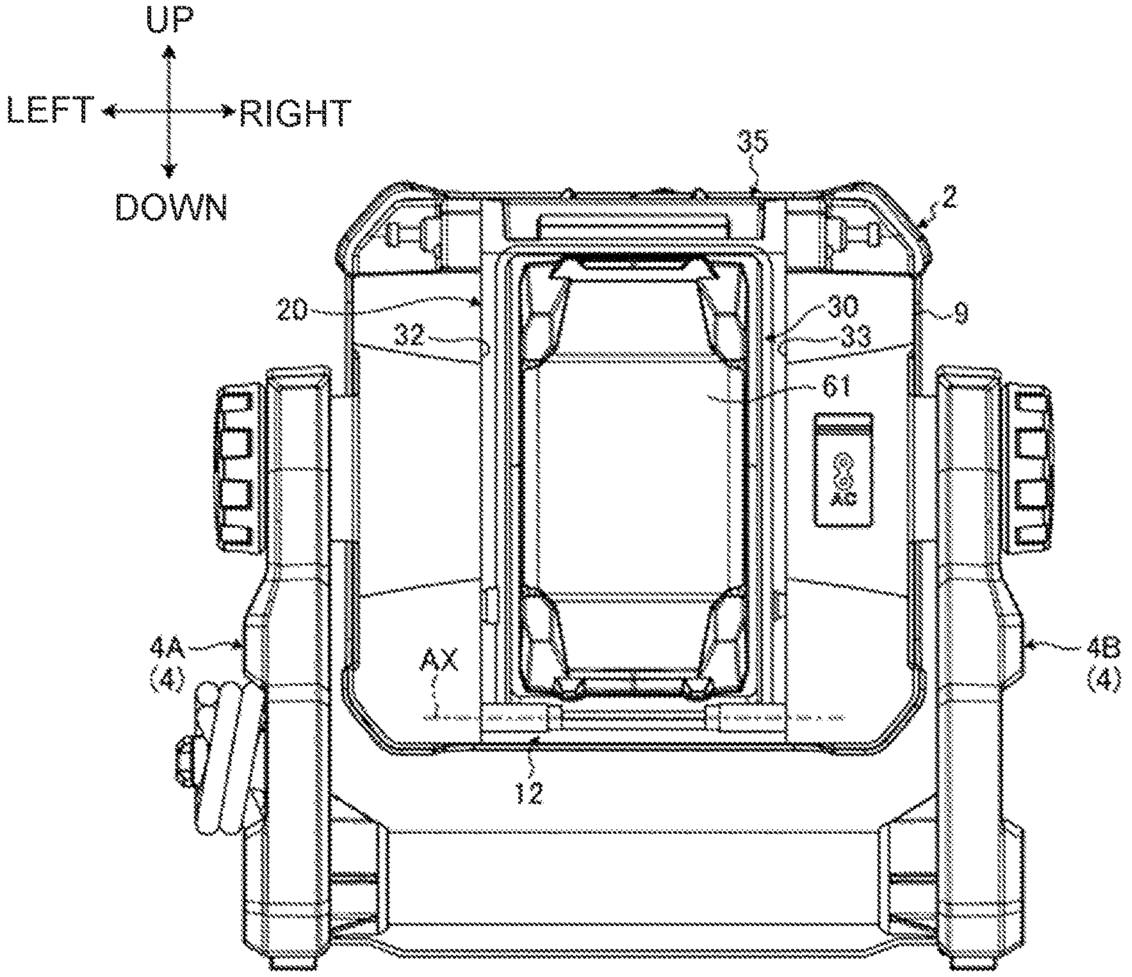
FIG. 9 is a rear view of the first battery attached to a first battery mount in the first embodiment.
Figure 10:
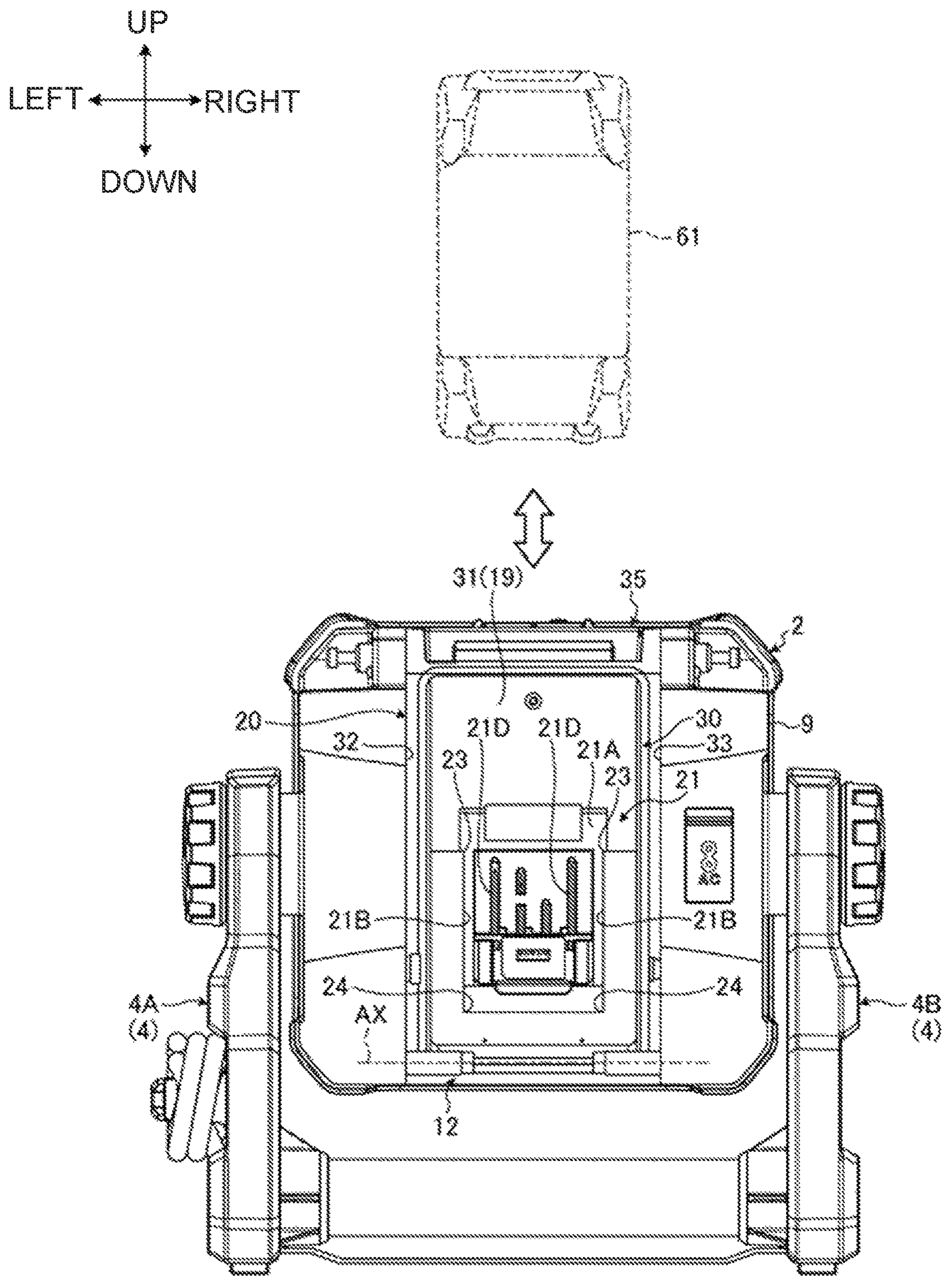
FIG. 10 is a rear view of the first battery mount in the first embodiment.
Figure 11:
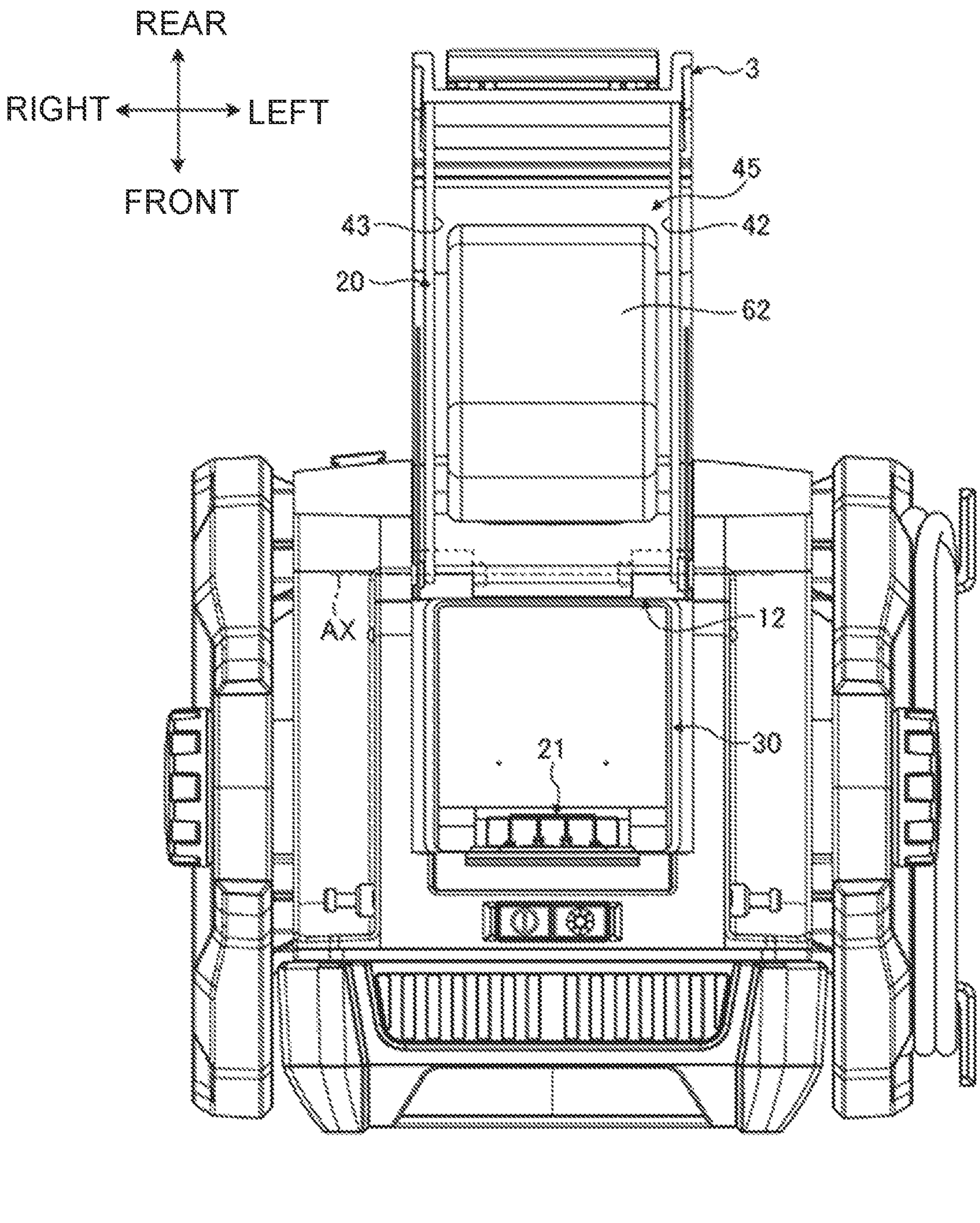
FIG. 11 is a top view of the second battery attached to a second battery mount in the first embodiment.
Figure 12:
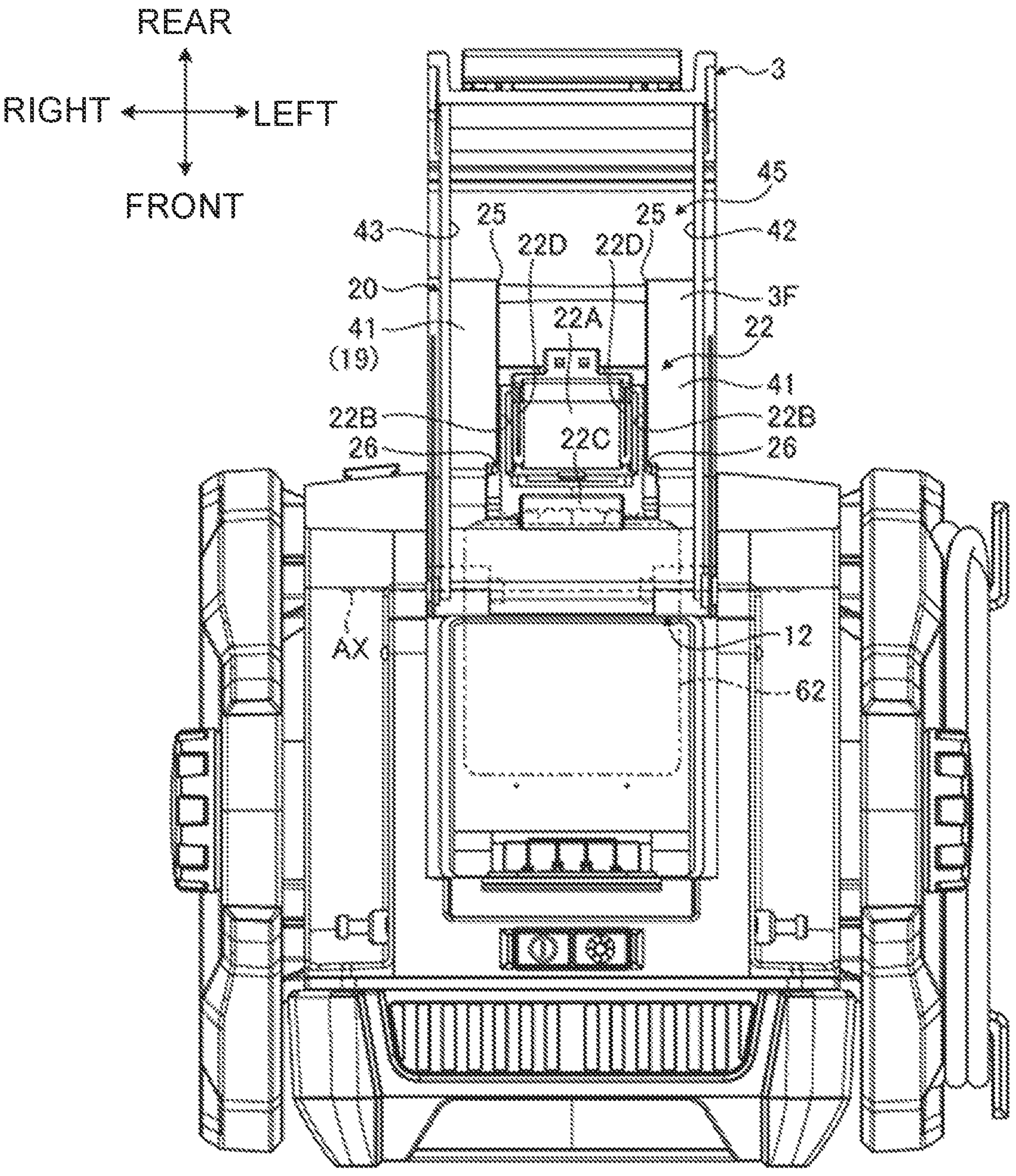
FIG. 12 is a top view of the second battery mount in the first embodiment.

FIG. 8A is a perspective view of a first battery 61 in the embodiment, and FIG. 8B is a perspective view of a second battery 62 in the embodiment. FIG. 9 is a rear view of the first battery 61 attached to a first battery mount 21. FIG. 10 is a rear view of the first battery mount 21. FIG. 11 is a top view of the second battery 62 attached to a second battery mount 22. FIG. 12 is a top view of the second battery mount 22.

In FIGS. 9 and 10, the cover 3 and the handle 5 are not shown. In FIGS. 11 and 12, the handle 5 is not shown.

The electrical apparatus 1 includes the first battery mount 21 and the second battery mount 22. The first battery mount 21 receives the first battery 61. The second battery mount 22 receives the second battery 62.

The first battery mount 21 is located on the support surface 31 (first surface) of the battery holder 19. The second battery mount 22 is located on the support surface 41 (second surface) of the battery holder 19.

The first battery mount 21 is located in the battery compartment 20. The second battery mount 22 is located in the battery compartment 20. The battery compartment 20 is defined by at least a part of the inner surface of the recess 30 in the body 2 and at least a part of the inner surface of the cover 3.

The first battery mount 21 is located on the support surface 31 of the body 2 facing the battery compartment 20. The second battery mount 22 is located on the support surface 41 of the cover 3 facing the battery compartment 20.

The hinge 12 has its hinge axis AX extending in the lateral direction. The support surface 31 is parallel to the hinge axis AX of the hinge 12. The support surface 41 is parallel to the hinge axis AX of the hinge 12.

The first battery 61 and the second battery 62 are slidable. Each of the first battery 61 and the second battery 62 is a battery for power tools.

The first battery 61 and the second battery 62 supply power to the electrical apparatus 1. The first battery 61 and the second battery 62 thus function as power supplies for the electrical apparatus 1. The first battery 61 and the second battery 62 may be secondary batteries. The first battery 61 and the second battery 62 in the embodiment may be rechargeable lithium-ion batteries.

The first battery 61 is attached to the first battery mount 21 to supply power to the electrical apparatus 1. The second battery 62 is attached to the second battery mount 22 to supply power to the electrical apparatus 1.

As shown in FIG. 8A, the first battery 61 includes a housing 61B with an attachment surface 61A, a pair of slides 61C, and a pair of power terminals 61F. The housing 61B has an internal space to accommodate a battery cell. The battery cell is a rechargeable lithium-ion battery. The slides 61C extend in a predetermined sliding direction. The power terminals 61F are between the pair of slides 61C. One of the power terminals 61F is a positive power terminal. The other power terminal 61F is a negative power terminal.

As shown in FIG. 8B, the second battery 62 includes a housing 62B with an attachment surface 62A, a pair of slides 62C, a protruding portion 62D, a release button 62E, and a pair of power terminals 62F. The protruding portion 62D is supported movably on the housing 62B. The release button 62E is operable to operate the protruding portion 62D. The housing 62B has an internal space to accommodate a battery cell. The battery cell is a rechargeable lithium-ion battery. The slides 62C extend in a predetermined sliding direction. The protruding portion 62D is supported movably by a spring. The protruding portion 62D protrudes from the attachment surface 62A under an elastic force from the spring. The power terminals 62F are between the pair of slides 62C. One of the power terminals 62F is a positive power terminal. The other power terminal 62F is a negative power terminal.

The first battery 61 and the second battery 62 are of different types. The electrical apparatus 1 may use, as its power supply, the first battery 61 and the second battery 62 of different types.

The first battery 61 and the second battery 62 differ in rated voltage (V). The first battery 61 has a higher rated voltage than the second battery 62. The first battery 61 has a rated voltage of, for example, 36 V. The second battery 62 has a rated voltage of, for example, 10.8 V. The first battery 61 may have a rated voltage of 40 V. The second battery 62 may have a rated voltage of 18 V.

The first battery 61 and the second battery 62 differ in capacity (Ah). The first battery 61 has a higher capacity than the second battery 62.

The first battery 61 and the second battery 62 differ in weight (g). The first battery 61 is heavier than the second battery 62.

The first battery 61 and the second battery 62 differ in outer dimensions (mm). The first battery 61 has greater outer dimensions than the second battery 62.

As shown in FIG. 10, the first battery mount 21 has a mount surface 21A, first guides 21B for guiding the first battery 61, and power terminals 21D.

The mount surface 21A faces the attachment surface 61A of the first battery 61.

The first guides 21B guide the first battery 61 in a predetermined guiding direction. The slides 61C on the first battery 61 are guided along the first guides 21B. Multiple first guides 21B are arranged in the lateral direction parallel to the hinge axis AX. In the embodiment, two first guides 21B are arranged in the lateral direction. The guiding direction of the first guides 21B is orthogonal to the hinge axis AX of the hinge 12.

The power terminals 21D are connected to the power terminals 61F on the first battery 61 to supply power from the first battery 61 to the electrical apparatus 1.

The second battery mount 22 has a mount surface 22A, second guides 22B for guiding the second battery 62, a locking slot 22C, and power terminals 22D.

The mount surface 22A faces the attachment surface 62A of the second battery 62.

The second guides 22B guide the second battery 62 in a predetermined guiding direction. The slides 62C on the second battery 62 are guided along the second guides 22B. Multiple second guides 22B are arranged in the lateral direction parallel to the hinge axis AX. In the embodiment, two second guides 22B are arranged in the lateral direction. The guiding direction of the second guides 22B is orthogonal to the hinge axis AX of the hinge 12.

The locking slot 22C is located in the mount surface 22A. The locking slot 22C receives the protruding portion 62D on the second battery 62. This fastens the second battery 62 to the second battery mount 22. In response to an operation on the release button 62E, the second battery 62 is unlocked and released from the second battery mount 22.

The power terminals 22D are connected to the power terminals 62F on the second battery 62 to supply power from the second battery 62 to the electrical apparatus 1.

Attaching and Detaching Batteries

The first battery 61 is slidable on the first battery mount 21 while being guided along the first guides 21B for attachment to and detachment from the first battery mount 21. With the cover 3 being open, the first battery 61 is attachable to and detachable from the first battery mount 21.

In the embodiment, the guiding direction of the first guides 21B is the vertical direction. The first battery 61 is slidable in the vertical direction for attachment to and detachment from the first battery mount 21.

Each first guide 21B has a first end 23 and a second end 24. The second ends 24 are nearer the hinge 12 than the first ends 23. The first ends 23 are located upward from the second ends 24.

To attach the first battery 61 to the first battery mount 21, the user of the electrical apparatus 1 slides the first battery 61 downward along the first battery mount 21 after placing the slides 61C in contact with the first ends 23 of the first guides 21B. The first battery 61 slides from the first ends 23 toward the second ends 24. The first battery 61 moves downward while being guided along the first guides 21B. The first battery 61 is thus attached to the first battery mount 21.

In this manner, the first battery 61 is slidable on the first battery mount 21 while being guided along the first guides 21B toward the second ends 24 for attachment to the first battery mount 21.

To detach the first battery 61 from the first battery mount 21, the first battery 61 is slid upward.

Figure 13:
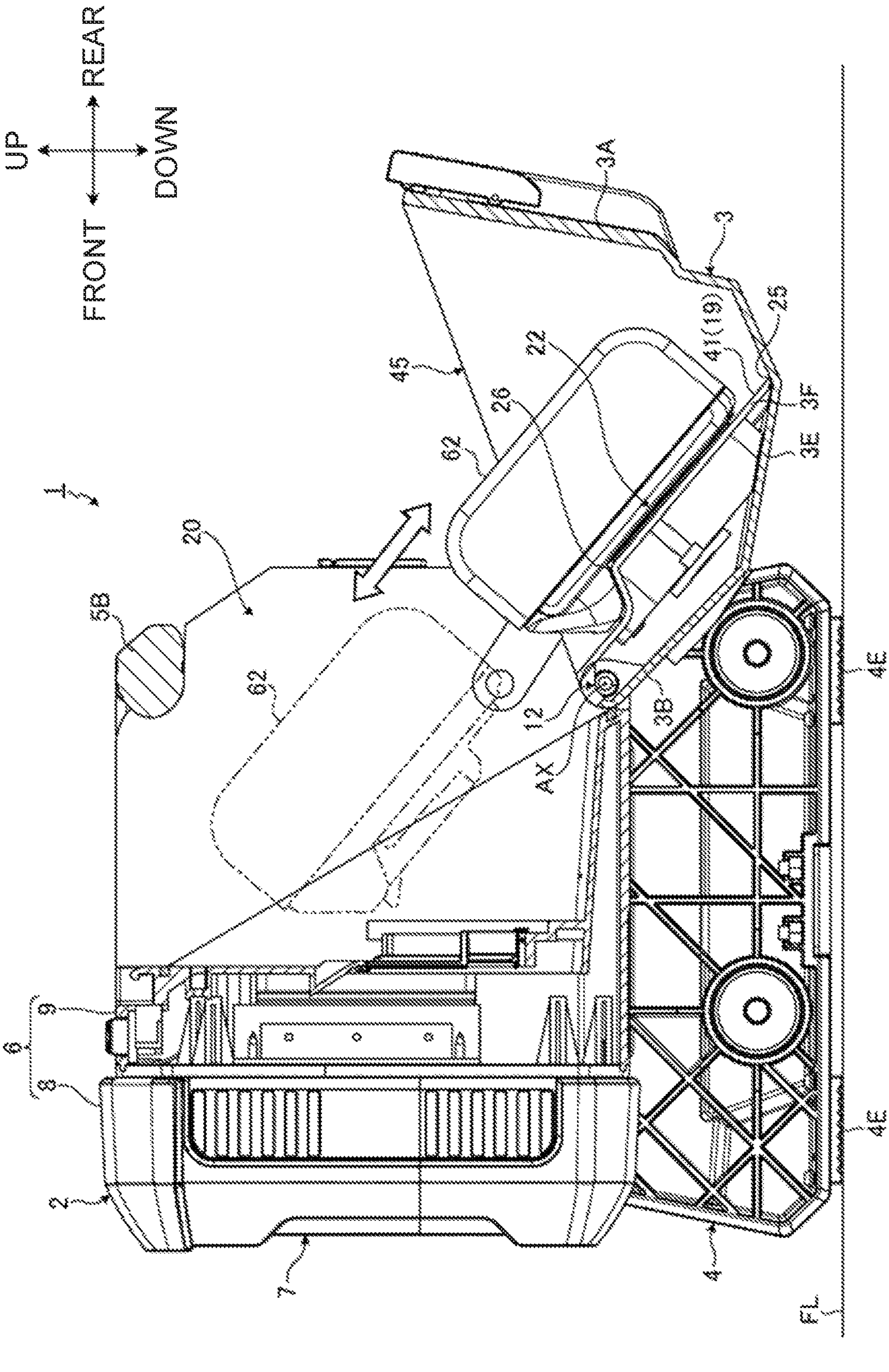
FIG. 13 is a view of the second battery in the first embodiment being attached.

FIG. 13 is a view of the second battery 62 being attached. FIG. 13 is a left view of the electrical apparatus 1 partially being cut away. The second battery 62 is slidable on the second battery mount 22 while being guided along the second guides 22B for attachment to and detachment from the second battery mount 22. With the cover 3 being open, the second battery 62 is attachable to and detachable from the second battery mount 22.

In the embodiment, the second battery 62 is attachable to and detachable from the second battery mount 22 when the cover 3 is at the second end of the pivot range. The guiding direction of the second guides 22B is diagonal to the placement surface FL on which the leg 4 is placed. The second battery 62 is slidable in the diagonal direction for attachment to and detachment from the second battery mount 22.

Each second guide 22B has a third end 25 and a fourth end 26. The fourth ends 26 are nearer the hinge 12 than the third ends 25. The third ends 25 are located rearward from the fourth ends 26 when the cover 3 is at the second end of the pivot range. The third ends 25 are at a lower position than the fourth ends 26. In other words, the third ends 25 are located below the fourth ends 26.

To attach the second battery 62 to the second battery mount 22, the user of the electrical apparatus 1 slides the second battery downward and rearward along the second battery mount 22 after placing the slides 62C in contact with the fourth ends 26 of the second guides 22B. The second battery 62 slides from the fourth ends 26 toward the third ends 25. The second battery 62 moves downward and rearward while being guided along the second guides 22B. With the protruding portion 62D received in the locking slot 22C in the second battery mount 22, the second battery 62 is fastened to the second battery mount 22. The second battery 62 is thus attached to the second battery mount 22.

In this manner, the second battery 62 is slidable on the second battery mount 22 while being guided along the second guides 22B toward the third ends 25 for attachment to the second battery mount 22.

To detach the second battery 62 from the second battery mount 22, the user of the electrical apparatus 1 operates the release button 62E. The protruding portion 62D is thus removed from the locking slot 22C. This unlocks the second battery 62 to be released from the second battery mount 22. The second battery 62 is then slid upward and frontward and detached from the second battery mount 22.

Figure 14:
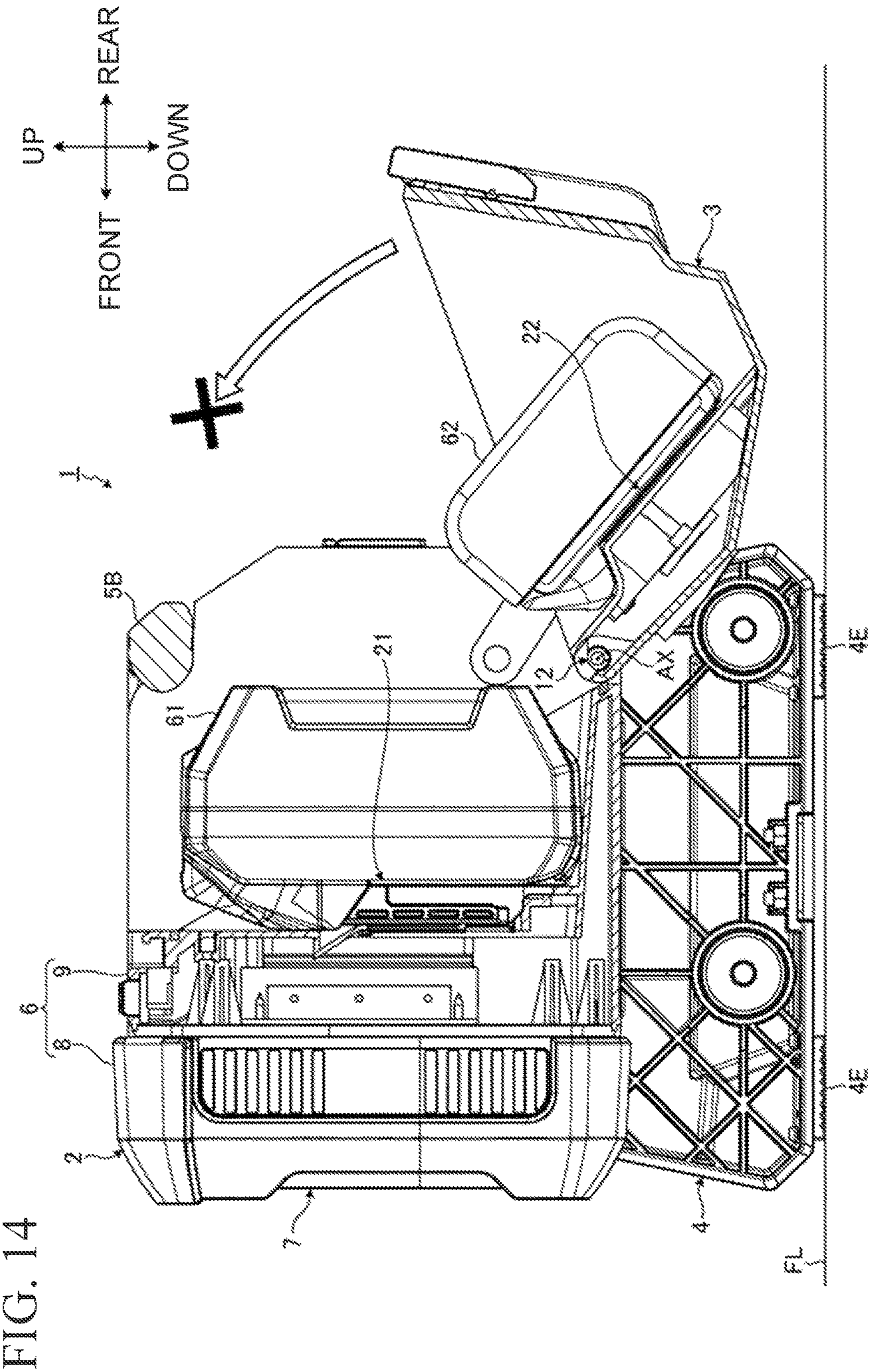
FIG. 14 is a left view of the electrical apparatus according to the first embodiment partially being cut away.

FIG. 14 is a left view of the electrical apparatus 1 partially being cut away. In FIG. 14, the cover 3 is open. The first battery 61 is attached to the first battery mount 21, and the second battery 62 is attached to the second battery mount 22. In this state, the first battery mount 21 and the second battery mount 22 are positioned relative to each other in accordance with the profiles and dimensions of the first battery 61 and the second battery 62 to cause the cover 3 to avoid being placed at the first end of the pivot range.

In other words, in a two-battery attached state in which the first battery 61 is attached to the first battery mount 21 and the second battery 62 is attached to the second battery mount 22, the user of the electrical apparatus 1 cannot close the cover 3 with the first battery 61 and the second battery 62 blocking each other.

Switch

Figure 15:
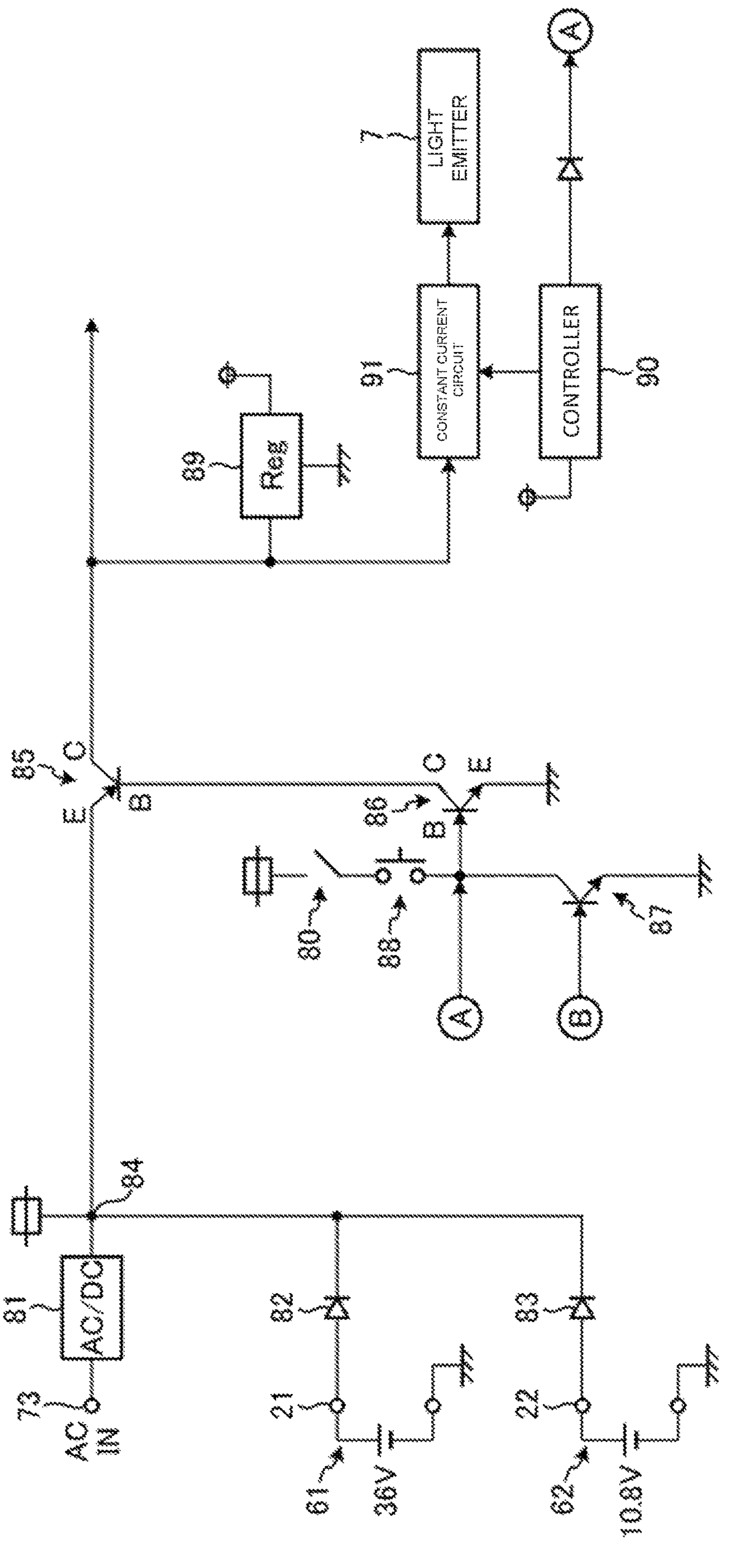
FIG. 15 is a diagram of a switch in the first embodiment.

FIG. 15 is a diagram of a switch 80 in the embodiment. The electrical apparatus 1 according to the embodiment includes the switch 80 that is operated when the cover 3 is closed. The switch 80 is located, for example, on a portion of the support surface 31 adjacent to the first battery mount 21. The switch 80 may be, for example, a pushbutton switch. The switch 80 remains unoperated when the cover 3 is open. The switch 80 is pressed by at least a partof the cover 3 when the cover 3 is closed. The switch 80 may not be a pushbutton switch. The switch 80 may be any switch that remains unoperated when the cover 3 is open and that is operated when the cover 3 is closed.

The switch 80 is operable to cause the light emitter 7 to be disabled in response to the cover 3 being open and to cause the light emitter 7 to be enabled in response to the cover 3 being closed. With the light emitter 7 being disabled, the electrical apparatus 1 cannot be activated. With the light emitter 7 being enabled, the electrical apparatus 1 can be activated. In the embodiment, when the cover 3 is open and the switch 80 remains unoperated, an operation on the power button 17 does not activate the electrical apparatus 1 and does not cause the light emitter 7 to operate. When the cover 3 is closed and the switch 80 is operated, an operation on the power button 17 activates the electrical apparatus 1 and causes the light emitter 7 to operate.

As described above with reference to FIG. 14, for example, the user of the electrical apparatus 1 cannot close the cover 3 in the two-battery attached state. Thus, in the two-battery attached state, an operation on the power button 17 does not activate the electrical apparatus 1.

In contrast, the user of the electrical apparatus 1 can close the cover 3 in a single-battery attached state in which the first battery 61 is attached to the first battery mount 21 and the second battery 62 is unattached to the second battery mount 22 or in which the second battery 62 is attached to the second battery mount 22 and the first battery 61 is unattached to the first battery mount 21. With the cover 3 being closed in the single-battery attached state, an operation on the power button 17 activates the electrical apparatus 1.

Activating the electrical apparatus 1 in the two-battery attached state may cause a current to flow from the first battery 61 to the second battery 62 or from the second battery 62 to the first battery 61. In the embodiment, the cover 3 cannot be closed in the two-battery attached state, and thus an operation on the power button 17 does not activate the electrical apparatus 1. This reduces the likelihood of the flow of current described above.

As shown in FIG. 15, the electrical apparatus 1 includes the AC terminal 73, the first battery mount 21, and the second battery mount 22. The electrical apparatus 1 also includes an AC-DC converter 81 connected to the AC terminal 73, a diode 82, and a diode 83. The diode 82 is connected to the first battery mount 21. The diode 83 is connected to the second battery mount 22. The AC-DC converter 81 is connected in parallel to each of the first battery mount 21 and the second battery mount 22. The AC terminal 73 is connected to each of the first battery mount 21 and the second battery mount 22 at a connection point 84.

The electrical apparatus 1 also includes the switch 80, a first switching element 85, a second switching element 86, a third switching element 87, a power switch 88, a regulator 89, a controller 90, and a constant current circuit 91.

In FIG. 15, various current-limiting resistors are not shown.

The switch 80 is an on-off switch. As described above, the switch 80 remains unoperated when the cover 3 is open and is operated when the cover 3 is closed. The switch 80 is off when the cover 3 is open, and is on when the cover 3 is closed.

Each of the first switching element 85, the second switching element 86, and the third switching element 87 is a transistor.

The first switching element 85 is between the connection point 84 and the light emitter 7. A direct current voltage is applied to the connection point 84 from one of the AC-DC converter 81, the first battery mount 21, or the second battery mount 22. In response to the first switching element 85 being on, the voltage at the connection point 84 is applied to the controller 90 and the light emitter 7. In response to the first switching element 85 being off, the voltage at the connection point 84 is not applied to the controller 90 or the light emitter 7.

The second switching element 86 is connected to the first switching element 85. The second switching element 86 switches the first switching element 85 to be on or off. In response to the second switching element 86 being on, the first switching element 85 is on.

The power switch 88 is an on-off switch. The power switch 88 is between the switch 80 and the second switching element 86. The power switch 88 is off when the power button 17 is unoperated, and is on when the power button 17 is operated.

In response to the switch 80 being on and the power switch 88 being on, the voltage at the connection point 84 is applied to the base of the second switching element 86. This causes the second switching element 86 to be on and causes the first switching element 85 to be on. This causes the voltage at the connection point 84 to be applied to the regulator 89, which then outputs a predetermined voltage (e.g., 5 V). This causes a voltage to be applied to the controller 90 including a microcomputer. In response to the voltage applied, the controller 90 is activated. In the embodiment, the electrical apparatus 1 being activated refers to the controller 90 being activated.

In response to the second switching element 86 being on and the first switching element 85 being on, the light emitter 7 receives a current through the constant current circuit 91. This causes the light emitter 7 to operate and emit light. The controller 90 can adjust the current to be supplied to the light emitter 7 as appropriate by transmitting an analog signal to the constant current circuit 91. This allows the light emitter 7 to have brightness adjusted as appropriate.

The second switching element 86 has a base electrode that is set to either a high level or a low level based on a control signal output from the controller 90. The second switching element 86 remains on when its base electrode is at the high level.

In response to the voltage at the connection point 84 being applied to the controller 90, the controller 90 is activated and outputs the control signal to the base electrode of the second switching element 86. This causes the second switching element 86 to have its base electrode set to the high level and thus to remain on. In response to the switch 80 being on and the power switch 88 being on, the controller 90 continues outputting the control signal to the base electrode of the second switching element 86. This causes the first switching element 85 to remain on and causes the light emitter 7 to continue emitting light. The second switching element 86 with its base electrode set to the high level remains on after the power button 17 is released and the power switch 88 is turned off.

In response to the switch 80 being off, the second switching element 86 has its base electrode set to the low level and is thus off. The second switching element 86 remains off after the power button 17 is operated and the power switch 88 is turned on. In this state, the first switching element 85 is also off. The voltage at the connection point 84 is not applied to the controller 90 or the light emitter 7.

First Modification of Switch

Figure 16:
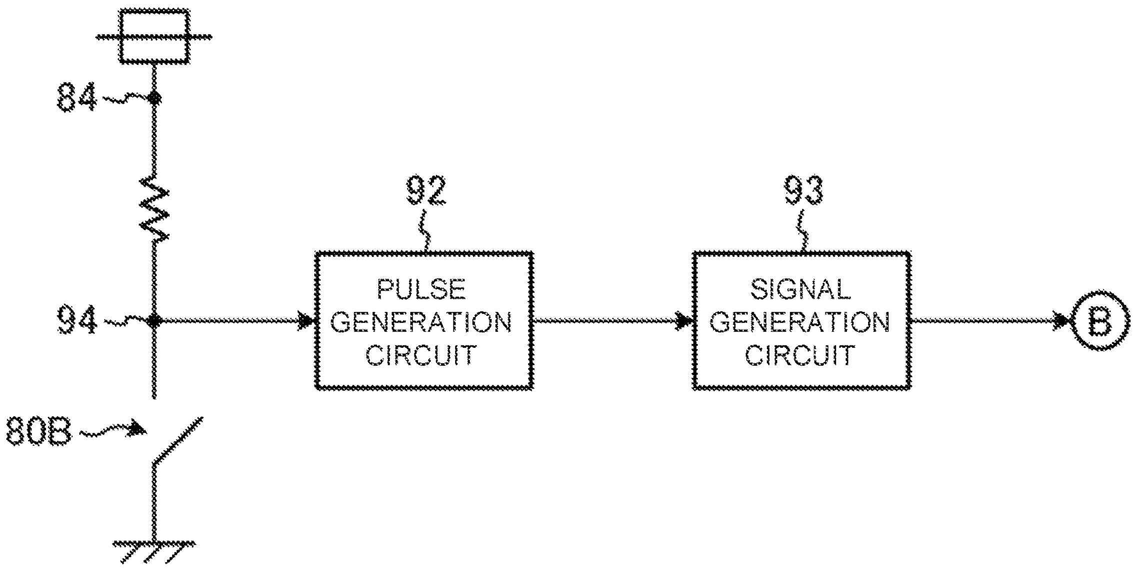
FIG. 16 is a diagram of a switch in a first modification of the first embodiment.

FIG. 16 is a diagram of a switch 80 in a first modification of the embodiment. As shown in FIG. 16, the electrical apparatus 1 may include an open-cover detection circuit for detecting the cover 3 changed from being closed to being open. For example, the open-cover detection circuit stops the operation of the light emitter 7 upon detecting the cover 3 changed from being closed to being open while the light emitter 7 is in operation.

The electrical apparatus 1 includes a switch 80B. The switch 80B is off when the cover 3 is open, and is on when the cover 3 is closed. The switch 80B and the above switch 80 may be a common switch, or may be separate switches. The switch 80B is connected to a pulse generation circuit 92 with a connection point 94 in between. In response to the switch 80B being on, the connection point 94 is connected to the ground. The connection point 94 has its potential increased in response to the cover 3 changing from being closed to being open and the switch 80B changing from being on to being off. This causes the pulse generation circuit 92 to generate a pulse, which then causes a signal generation circuit 93 to generate a control signal. The control signal has a duration longer than the pulse width. The signal generation circuit 93 outputs the control signal to the base electrode of the third switching element 87 described with reference to FIG. 15.

The third switching element 87 has its base electrode that is set to either a high level or a low level based on the control signal output from the signal generation circuit 93. The third switching element 87 remains on when its base electrode is at the high level.

For example, the third switching element 87 may be turned on in response to the cover 3 changing from being closed to being open while light is emitted from the light emitter 7. This causes the second switching element 86 to have its base electrode connected to the ground and thus switch to the low level. This causes the second switching element 86 to be off and causes the first switching element 85 to be off. This stops the application of the voltage at the connection point 84 to the controller 90 and the light emitter 7.

The open-cover detection circuit thus stops the operation of the light emitter 7 forcibly in response to the user of the electrical apparatus 1 accidentally opening the cover 3 while the light emitter 7 is in operation.

Second Modification of Switch

Figure 17:
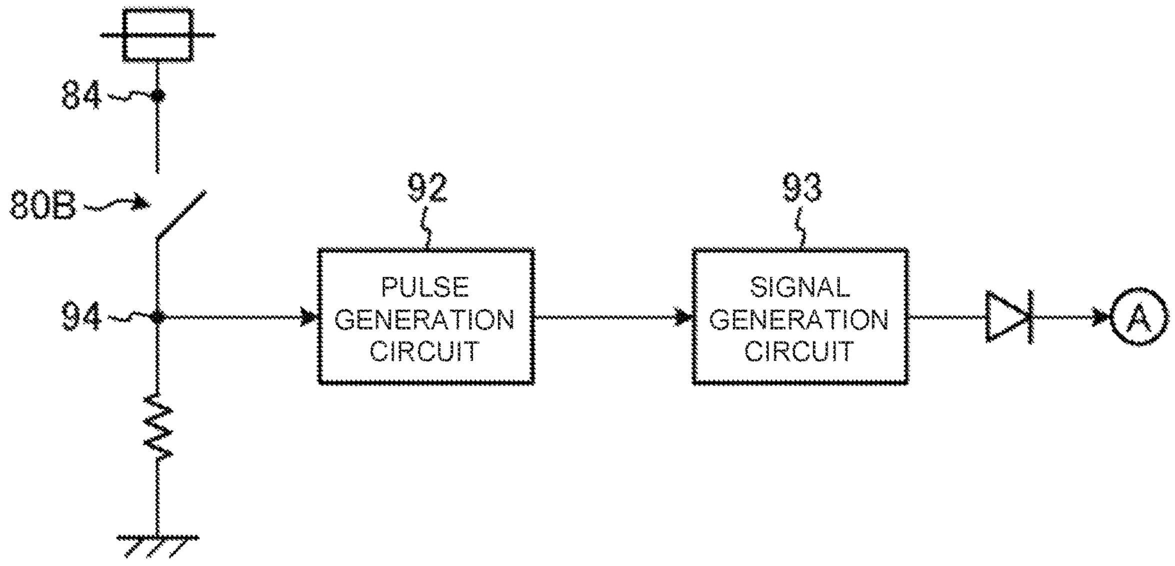
FIG. 17 is a diagram of a switch in a second modification of the first embodiment.

FIG. 17 is a diagram of a switch 80 in a second modification of the embodiment. As shown in FIG. 17, the electrical apparatus 1 may include a closed-cover detection circuit for detecting the cover 3 changed from being open to being closed. Upon detecting the cover 3 changed from being open to being closed, the closed-cover detection circuit causes the light emitter 7 to operate when the power button 17 remains unoperated.

As shown in FIG. 17, a switch 80B is connected to a pulse generation circuit 92 with a connection point 94 in between. In response to the switch 80B being off, the connection point 94 is connected to the ground. The connection point 94 has its potential increased in response to the cover 3 changing from being open to being closed and the switch 80B changing from being off to being on. This causes the pulse generation circuit 92 to generate a pulse, which then causes a signal generation circuit 93 to generate a control signal. The control signal has a duration longer than the pulse width. The signal generation circuit 93 outputs the control signal to the base electrode of the second switching element 86 described with reference to FIG. 15.

The control signal output from the signal generation circuit 93 causes the second switching element 86 to have its base electrode set to the high level. This causes the second switching element 86 to be on and causes the first switching element 85 to be on. This starts the application of the voltage at the connection point 84 to the controller 90 and the light emitter 7. The light emitter 7 thus starts operating.

The closed-cover detection circuit can thus start the operation of the light emitter 7 automatically in response to the user of the electrical apparatus 1 simply closing the cover 3.

As described above, the electrical apparatus 1 according to the embodiment includes the battery holder 19 having the support surface 31 (first surface) and the support surface 41 (second surface). The support surface 31 is located on the body 2. The support surface 41 is located on the cover 3. The first battery mount 21 is located on the support surface 31 of the body 2. The second battery mount 22 is located on the support surface 41 of the cover 3. The electrical apparatus 1 with this structure can be miniaturized. The electrical apparatus 1 with this structure can be miniaturized as compared with, for example, an electrical apparatus including two battery mounts arranged in parallel on a single surface. The electrical apparatus 1 powered by a battery (the first battery 61 or the second battery 62) is often used at work sites such as construction sites. The electrical apparatus 1 with the smaller outer dimensions can be placed in a manner that does not obstruct operations or can be portable easily.

The first battery mount 21 includes the first guides 21B. The second battery mount 22 includes the second guides 22B. The first battery 61 is slidable on the first battery mount 21 while being guided along the first guides 21B for attachment to and detachment from the first battery mount 21. The second battery 62 is slidable on the second battery mount 22 while being guided along the second guides 22B for attachment to and detachment from the second battery mount 22. Being slidable, the first battery 61 can be easily attached to and detached from the first battery mount 21 by the user of the electrical apparatus 1. Being slidable, the second battery 62 can be easily attached to and detached from the second battery mount 22 by the user of the electrical apparatus 1.

The cover 3 is joined to the body 2 with the hinge 12. The guiding direction of the first guides 21B and the guiding direction of the second guides 22B are each orthogonal to the hinge axis AX of the hinge 12. The user of the electrical apparatus 1 can thus smoothly attach and detach the first battery 61 to and from the first battery mount 21 and smoothly attach and detach the second battery 62 to and from the second battery mount 22 with the cover 3 pivoted to open the battery compartment 20.

The multiple first guides 21B are arranged in a direction parallel to the hinge axis AX of the hinge 12. In the embodiment, the hinge 12 has the hinge axis AX extending in the lateral direction. The two first guides 21B are arranged in the lateral direction. The user of the electrical apparatus 1 can thus smoothly attach and detach the first battery 61 to and from the first battery mount 21 with the cover 3 pivoted to open the battery compartment 20.

The multiple second guides 22B are arranged in a direction parallel to the hinge axis AX of the hinge 12. In the embodiment, the hinge 12 has the hinge axis AX extending in the lateral direction. The two second guides 22B are arranged in the lateral direction. The user of the electrical apparatus 1 can thus smoothly attach and detach the second battery 62 to and from the second battery mount 22 with the cover 3 pivoted to open the battery compartment 20.

The support surface 41 on which the second battery mount 22 is located in parallel to the hinge axis AX. The user of the electrical apparatus 1 can thus smoothly attach and detach the second battery 62 to and from the second battery mount 22 with the cover 3 pivoted to open the battery compartment 20.

Each first guide 21B has the first end 23 and the second end 24 nearer the hinge 12 than the first end 23. The user of the electrical apparatus 1 can thus smoothly attach the first battery 61 to the first battery mount 21 by sliding the first battery 61 from the first ends 23 toward the second ends 24.

In the first guides 21B, the first ends 23 are at a higher position than the second ends 24. The user of the electrical apparatus 1 can thus smoothly attach the first battery 61 to the first battery mount 21 by sliding the first battery 61 downward along the first battery mount 21.

The second guides 22B have the third ends 25 and the fourth ends 26 nearer the hinge 12 than the third ends 25. The user of the electrical apparatus 1 can thus smoothly attach the second battery 62 to the second battery mount 22 by sliding the second battery 62 from the fourth ends 26 toward the third ends 25.

The cover 3 is pivotable within a predetermined pivot range. The cover 3 placed at the first end of the pivot range is closed. In this state, the battery compartment 20 is closed. The third ends 25 are at a lower position than the fourth ends 26 when the cover 3 is at the second end of the pivot range. The user of the electrical apparatus 1 can thus smoothly attach the second battery 62 to the second battery mount 22 by sliding the second battery 62 diagonally downward along the second battery mount 22.

The cover 3 placed at the second end of the pivot range is above the lower surface 4E of the leg 4. The cover 3 is thus out of contact with the placement surface FL when placed at the second end of the pivot range.

In the two-battery attached state in which the first battery 61 is attached to the first battery mount 21 and the second battery 62 is attached to the second battery mount 22, the first battery mount 21 and the second battery mount 22 are positioned relative to each other in accordance with the profiles and dimensions of the first battery 61 and the second battery 62 to cause the cover 3 to avoid being placed at the first end of the pivot range. Activating the electrical apparatus 1 in the two-battery attached state may cause a current to flow from the first battery 61 to the second battery 62 or from the second battery 62 to the first battery 61. In the embodiment, the cover 3 cannot be closed in the two-battery attached state, and thus an operation on the power button 17 does not activate the electrical apparatus 1. This reduces the likelihood of the flow of current described above.

The first battery 61 attachable to the first battery mount 21 on the body 2 is heavier than the second battery 62 attachable to the second battery mount 22 on the cover 3. The electrical apparatus 1 thus has a balanced weight.

The pivot range of the cover 3 can be properly defined by the linkages 50 joining the cover 3 to the body 2.

Each linkage 50 includes the link 51, the first joint 52 joining an end of the link 51 to the body 2, and the second joint 54 received in the guide slot 53 in the link 51 and joined to the cover 3. The pivot range of the cover 3 can thus be defined properly based on the length of each guide slot 53.

Each linkage 50 includes the brake 55 between the link 51 and the cover 3. This allows the cover 3 to avoid opening suddenly.

The cover 3 being closed has the rear surface 72 including the lower area 72C sloping downward and frontward. The electrical apparatus 1 with this structure can be miniaturized. In the embodiment, the rear housing 9 has the rear surfaces 71 including the lower areas 71C also sloping downward and frontward. The electrical apparatus 1 with this structure can be miniaturized.

The switch 80 is operable to cause the light emitter 7 to be disabled in response to the cover 3 being open and to cause the light emitter 7 to be enabled in response to the cover 3 being closed. The electrical apparatus 1 is not activated with the cover 3 being open. The electrical apparatus 1 can be activated properly with the cover 3 being closed.

In the above embodiment, a third battery mount (not shown) may be located on the inner surface of the cover 3 facing the battery compartment 20 or on the inner surface of the body 2 facing the battery compartment 20.

In the above embodiment, the first surface (the support surface 31) and the second surface (the support surface 41) of the battery holder 19 may be both located on the body 2. For the first surface (the support surface 31) and the second surface (the support surface 41) of the battery holder 19 being both located on the body 2, the cover 3 may be eliminated.

Second Embodiment

The same or corresponding components as those in the first embodiment are given the same reference numerals herein, and will be described briefly or will not be described.

In the first embodiment, the first battery mount 21 is located on the body 2, and the second battery mount 22 is located on the cover 3. More specifically, the support surface 31 including the first battery mount 21 is located on the body 2, and the support surface 41 including the second battery mount 22 is located on the cover 3. The first battery mount 21 and the second battery mount 22 may be both located on the body 2. In other words, the first surface (the support surface 31) and the second surface (the support surface 41) of the battery holder (19) may be both located on the body 2.

Figure 18:
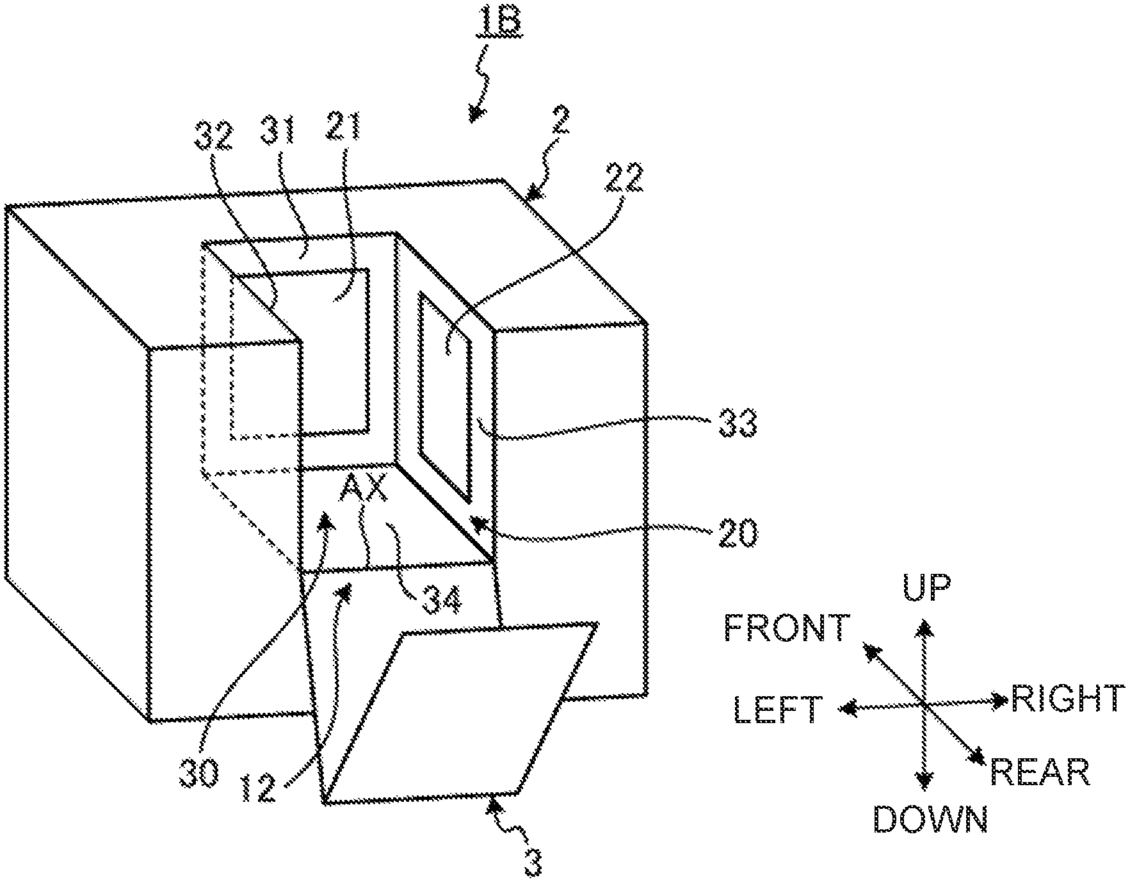
FIG. 18 is a schematic diagram of an electrical apparatus according to a second embodiment.
Figure 19:
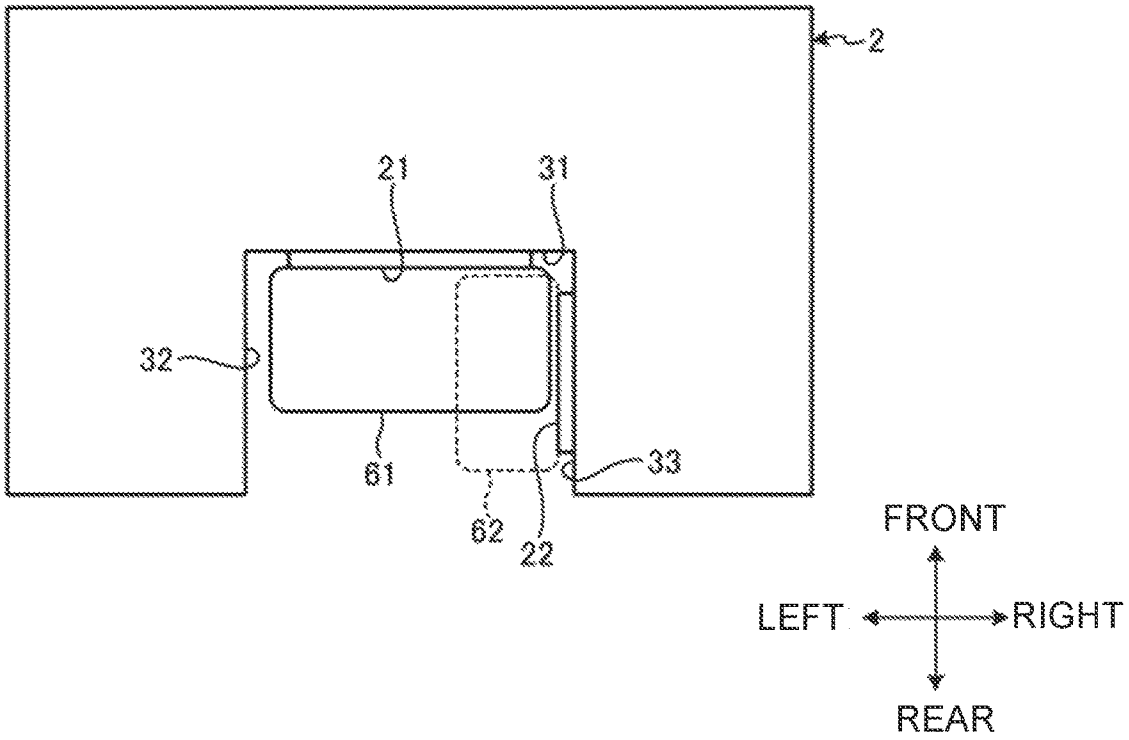
FIG. 19 is a schematic diagram of the electrical apparatus according to the second embodiment.

FIGS. 18 and 19 are schematic diagrams of an electrical apparatus 1B according to a second embodiment. As shown in FIG. 18, the electrical apparatus 1B includes a body 2 and a cover 3. As in the first embodiment, the cover 3 is joined to the body 2 with a hinge 12. The hinge 12 has its hinge axis AX extending in the lateral direction.

The body 2 and the cover 3 define a battery compartment 20. As in the first embodiment, the body 2 has a recess 30. The recess 30 has an inner surface including a support surface 31, a left inner surface 32, a right inner surface 33, and a bottom surface 34. The support surface 31, the left inner surface 32, the right inner surface 33, and the bottom surface 34 face in different directions. As in the first embodiment, the support surface 31 faces rearward. The left inner surface 32 faces rightward. The right inner surface 33 faces leftward. The bottom surface 34 faces upward. The support surface 31, the left inner surface 32, the right inner surface 33, and the bottom surface 34 face the battery compartment 20.

FIG. 19 is a top view of the body 2 in FIG. 18. In the present embodiment, the first battery mount 21 and the second battery mount 22 are both located on the body 2. The first battery mount 21 is located on the support surface 31 of the body 2. The second battery mount 22 is located on the right inner surface 33 of the body 2.

As in the first embodiment, the first battery mount 21 receives a first battery 61 that is slidable. The second battery mount 22 receives a second battery 62 that is slidable. In the present embodiment, the guiding direction of the first battery mount 21 is the vertical direction. The guiding direction of the second battery mount 22 is the vertical direction. The first battery mount 21 includes first guides 21B with its guiding direction orthogonal to the hinge axis AX of the hinge 12. The second battery mount 22 includes second guides 22B with its guiding direction orthogonal to the hinge axis AX of the hinge 12.

The first battery 61 is slidable on the first battery mount 21 in the vertical direction while being guided along the first guides 21B for attachment to and detachment from the first battery mount 21. The second battery 62 is slidable on the second battery mount 22 in the vertical direction while being guided along the second guides 22B for attachment to and detachment from the second battery mount 22.

As shown in FIG. 19, the first battery mount 21 and the second battery mount 22 are positioned relative to each other in accordance with the profiles and dimensions of the first battery 61 and the second battery 62 to cause the second battery 62 to be unattachable to the second battery mount 22 when the first battery 61 is attached to the first battery mount 21 and to cause the first battery 61 to be unattachable to the first battery mount 21 when the second battery 62 is attached to the second battery mount 22.

In other words, when the first battery 61 is attached to the first battery mount 21, the second battery 62 is blocked by the first battery 61 and is unattachable to the second battery mount 22. When the second battery 62 is attached to the second battery mount 22, the first battery 61 is blocked by the second battery 62 and is unattachable to the first battery mount 21.

One of the first battery mount 21 or the second battery 62 may be located on the left inner surface 32 of the recess 30. One of the first battery mount 21 or the second battery 62 may be located on the bottom surface 34 of the recess 30. The first battery mount 21 may be located on one of the support surface 31, the left inner surface 32, the right inner surface 33, or the bottom surface 34, and the second battery mount 22 may be located on another of these surfaces.

A third battery mount (not shown) may be located on the inner surface of the cover 3 facing the battery compartment 20 or on the inner surface of the body 2 facing the battery compartment 20.

The cover 3 may be eliminated.

As described above, the body 2 in the present embodiment has a first surface and a second surface facing in different directions. The first battery mount 21 is located on the first surface. The second battery mount 22 is located on the second surface. The electrical apparatus 1B with this structure can be miniaturized as compared with, for example, an electrical apparatus including two battery mounts arranged in parallel on a single surface.

In the embodiment, the first battery mount 21 and the second battery mount 22 are positioned relative to each other in accordance with the profiles and dimensions of the first battery 61 and the second battery 62 to cause the second battery 62 to be unattachable to the second battery mount 22 when the first battery 61 is attached to the first battery mount 21 and to cause the first battery 61 to be unattachable to the first battery mount 21 when the second battery 62 is attached to the second battery mount 22. Activating the electrical apparatus 1 in the two-battery attached state may cause a current to flow from the first battery 61 to the second battery 62 or from the second battery 62 to the first battery 61. In the present embodiment, the first battery mount 21 and the second battery mount 22 are positioned relative to each other in accordance with the profiles and dimensions of the first battery 61 and the second battery 62 to avoid the two-battery attached state. This reduces the likelihood of the flow of current described above.

Third Embodiment

Figure 20:
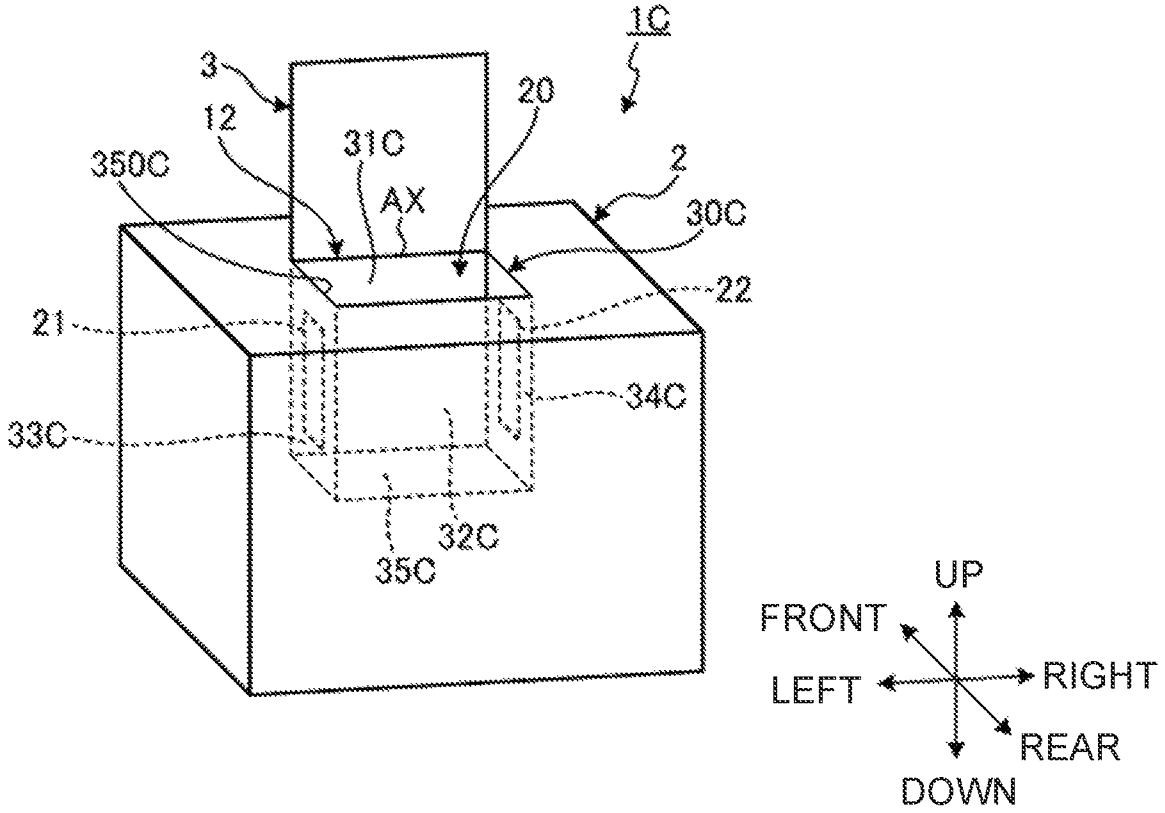
FIG. 20 is a schematic diagram of an electrical apparatus according to a third embodiment.

FIG. 20 is a schematic diagram of an electrical apparatus 1C according to an embodiment. As shown in FIG. 20, the electrical apparatus 1C includes a body 2 and a cover 3. As in the above embodiments, the cover 3 is joined to the body 2 with a hinge 12. The hinge 12 has its hinge axis AX extending in the lateral direction.

The body 2 and the cover 3 define a battery compartment 20. The body 2 has a recess 30C. The recess 30C is recessed downward from the upper surface of the body 2. The recess 30C is open at its upper end and forms an opening 350C. The recess 30C has an inner surface including a first surface 31C, a second surface 32C, a third surface 33C, a fourth surface 34C, and a fifth surface 35C. The first surface 31C, the second surface 32C, the third surface 33C, the fourth surface 34C, and the fifth surface 35C face in different directions. The first surface 31C faces rearward. The second surface 32C faces frontward. The third surface 33C faces rightward. The fourth surface 34C faces leftward. The fifth surface 35C faces upward. The first surface 31C, the second surface 32C, the third surface 33C, the fourth surface 34C, and the fifth surface 35C face the battery compartment 20.

A first battery mount 21 is located on one of the first to fifth surfaces 31C to 35C, and a second battery mount 22 is located on another of these surfaces. In other words, a battery holder 19 has a first surface and a second surface that are both located on the body 2. In the example of FIG. 20, the first battery mount 21 is located on the third surface 33C, and the second battery mount 22 is located on the fourth surface 34C.

As in the above embodiments, the first battery mount 21 receives a first battery 61 that is slidable. The second battery mount 22 receives a second battery 62 that is slidable. In the example of FIG. 20, the guiding direction of the first battery mount 21 is the vertical direction. The guiding direction of the second battery mount 22 is the vertical direction.

The first battery mount 21 and the second battery mount 22 are positioned relative to each other in accordance with the profiles and dimensions of the first battery 61 and the second battery 62 to cause the second battery 62 to be unattachable to the second battery mount 22 when the first battery 61 is attached to the first battery mount 21 and to cause the first battery 61 to be unattachable to the first battery mount 21 when the second battery 62 is attached to the second battery mount 22.

A third battery mount (not shown) may be located on the inner surface of the cover 3 facing the battery compartment 20 or on the inner surface of the body 2 facing the battery compartment 20.

The cover 3 may be eliminated.

Fourth Embodiment

Figure 21:
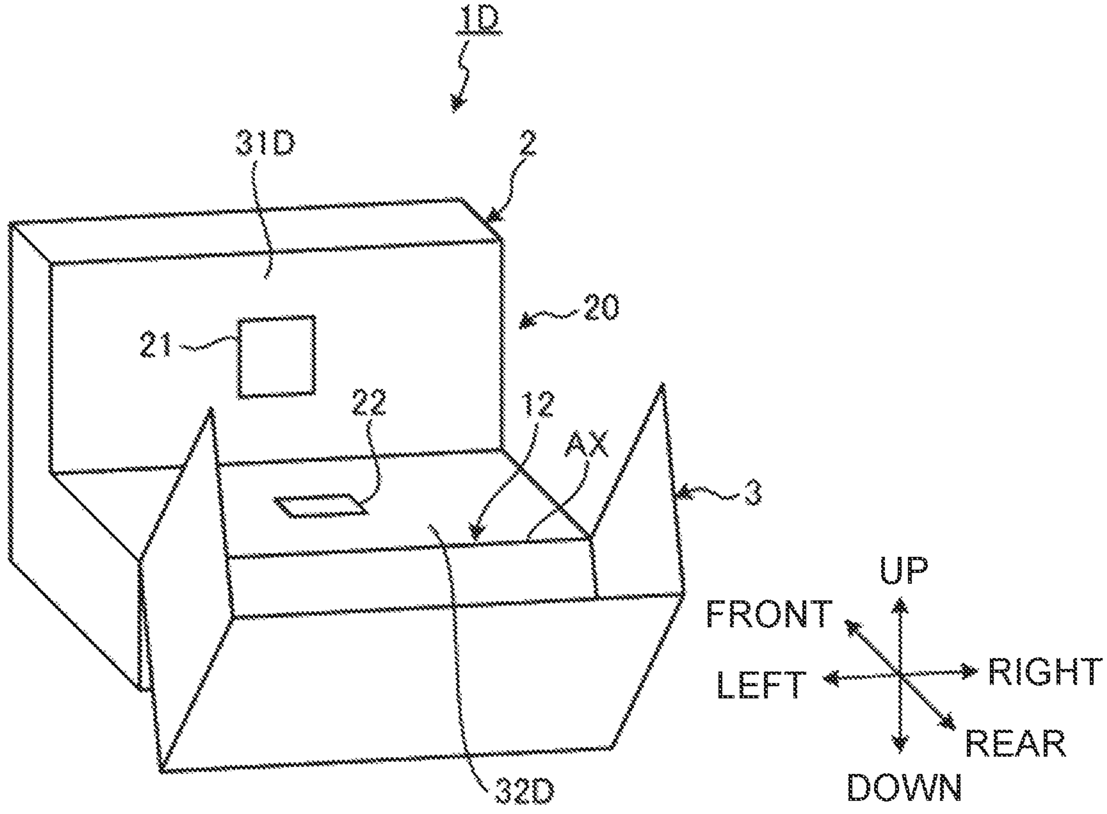
FIG. 21 is a schematic diagram of an electrical apparatus according to a fourth embodiment.

FIG. 21 is a schematic diagram of an electrical apparatus 1D according to an embodiment. As shown in FIG. 21, the electrical apparatus 1D includes a body 2 and a cover 3. As in the above embodiments, the cover 3 is joined to the body 2 with a hinge 12. The hinge 12 has its hinge axis AX extending in the lateral direction.

The body 2 and the cover 3 define a battery compartment 20. The body 2 has a first surface 31D and a second surface 32D. The first surface 31D and the second surface 32D face in different directions. The first surface 31D faces rearward. The second surface 32D faces upward. The first surface 31D and the second surface 32D face the battery compartment 20.

A first battery mount 21 is located on the first surface 31D, and a second battery mount 22 is located on the second surface 32D. In other words, a holder (19) has a first surface and a second surface that are both located on the body 2.

As in the above embodiments, the first battery mount 21 receives a first battery 61 that is slidable. The second battery mount 22 receives a second battery 62 that is slidable. In the example of FIG. 21, the guiding direction of the first battery mount 21 may be the vertical direction or the lateral direction. The guiding direction of the second battery mount 22 may be the front-rear direction or the lateral direction.

The first battery mount 21 and the second battery mount 22 are positioned relative to each other in accordance with the profiles and dimensions of the first battery 61 and the second battery 62 to cause the second battery 62 to be unattachable to the second battery mount 22 when the first battery 61 is attached to the first battery mount 21 and to cause the first battery 61 to be unattachable to the first battery mount 21 when the second battery 62 is attached to the second battery mount 22.

A third battery mount (not shown) may be located on the inner surface of the cover 3 facing the battery compartment 20 or on the inner surface of the body 2 facing the battery compartment 20.

The cover 3 may be eliminated.

Fifth Embodiment

Figure 22:
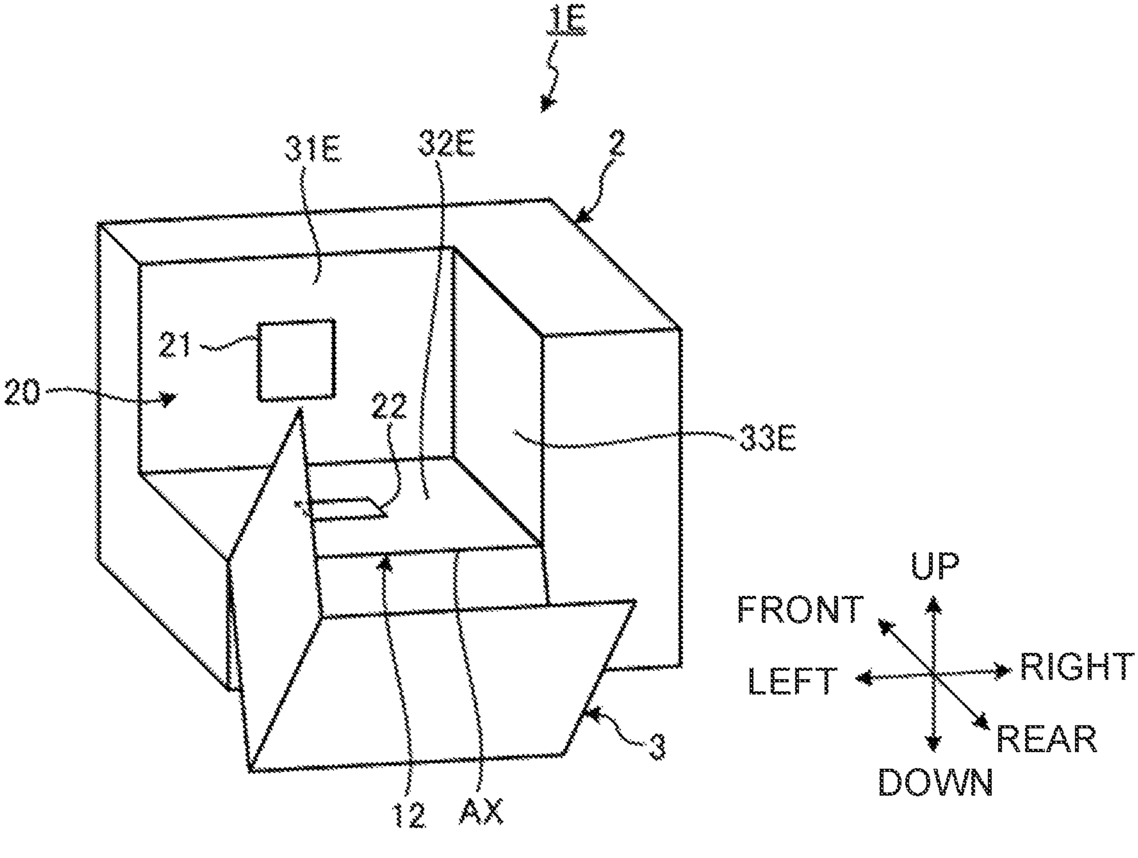
FIG. 22 is a schematic diagram of an electrical apparatus according to a fifth embodiment.

FIG. 22 is a schematic diagram of an electrical apparatus 1E according to a fifth embodiment. As shown in FIG. 22, the electrical apparatus 1E includes a body 2 and a cover 3. As in the above embodiments, the cover 3 is joined to the body 2 with a hinge 12. The hinge 12 has its hinge axis AX extending in the lateral direction.

The body 2 and the cover 3 define a battery compartment 20. The body 2 has a first surface 31E, a second surface 32E, and a third surface 33E. The first surface 31E, the second surface 32E, and the third surface 33E face in different directions. The first surface 31E faces rearward. The second surface 32E faces upward. The third surface 33E faces leftward. The first surface 31E, the second surface 32E, and the third surface 33E face the battery compartment 20.

A first battery mount 21 is located on one of the first surface 31E, the second surface 32E, or the third surface 33E, and a second battery mount 22 is located on another of these surfaces. In other words, a holder (19) has a first surface and a second surface that are both located on the body 2. In the example of FIG. 22, the first battery mount 21 is located on the first surface 31E, and the second battery mount 22 is located on the second surface 32E.

As in the above embodiments, the first battery mount 21 receives a first battery 61 that is slidable. The second battery mount 22 receives a second battery 62 that is slidable.

A third battery mount (not shown) may be located on the inner surface of the cover 3 facing the battery compartment 20 or on the inner surface of the body 2 facing the battery compartment 20.

The cover 3 may be eliminated.

Sixth Embodiment

Figure 23:
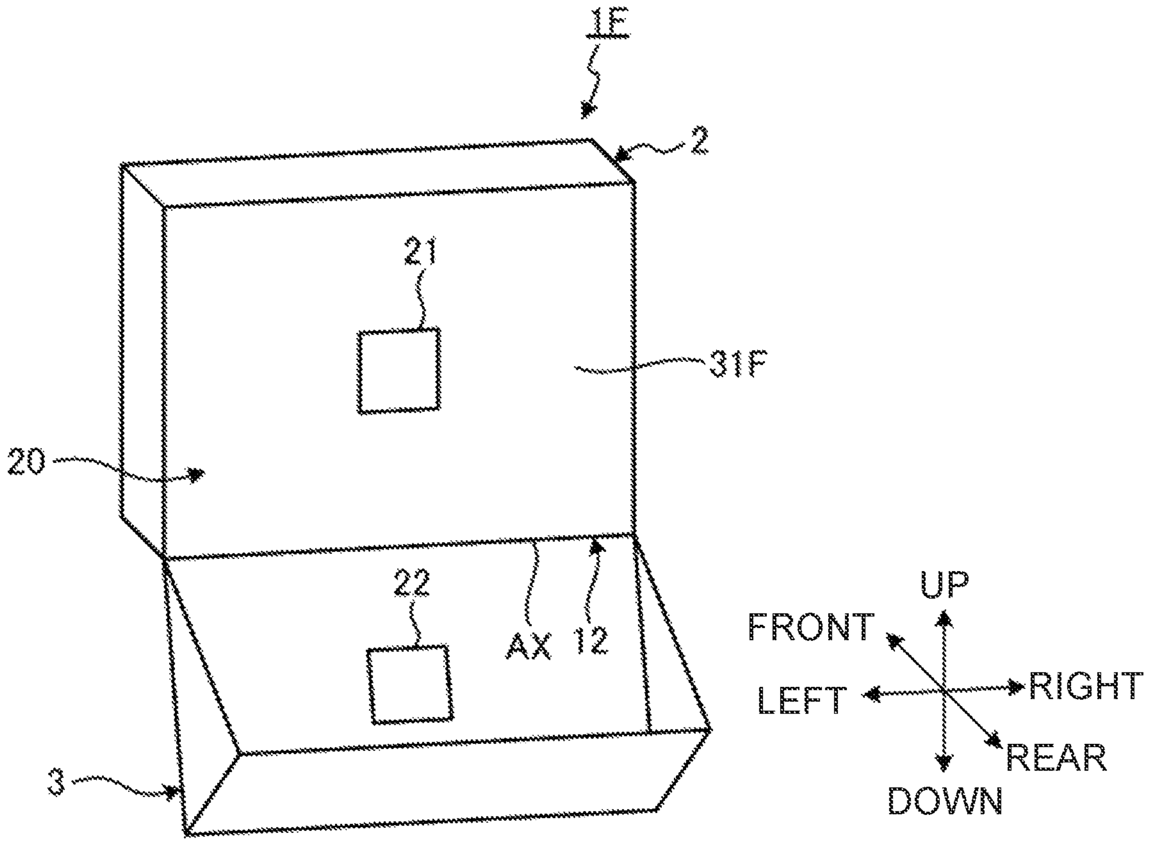
FIG. 23 is a schematic diagram of an electrical apparatus according to a sixth embodiment.

FIG. 23 is a schematic diagram of an electrical apparatus 1F according to an embodiment. As shown in FIG. 23, the electrical apparatus 1F includes a body 2 and a cover 3. As in the above embodiments, the cover 3 is joined to the body 2 with a hinge 12. The hinge 12 has its hinge axis AX extending in the lateral direction.

The body 2 and the cover 3 define a battery compartment 20. The body 2 has a first surface 31F. The first surface 31F faces rearward. The first surface 31F faces the battery compartment 20.

A first battery mount 21 is located on the first surface 31F. A second battery mount 22 is located on the inner surface of the cover 3 facing the battery compartment 20.

A third battery mount (not shown) may be located on the inner surface of the cover 3 facing the battery compartment 20 or on the inner surface of the body 2 facing the battery compartment 20.

Seventh Embodiment

Overview of Electrical Apparatus

Figure 24:
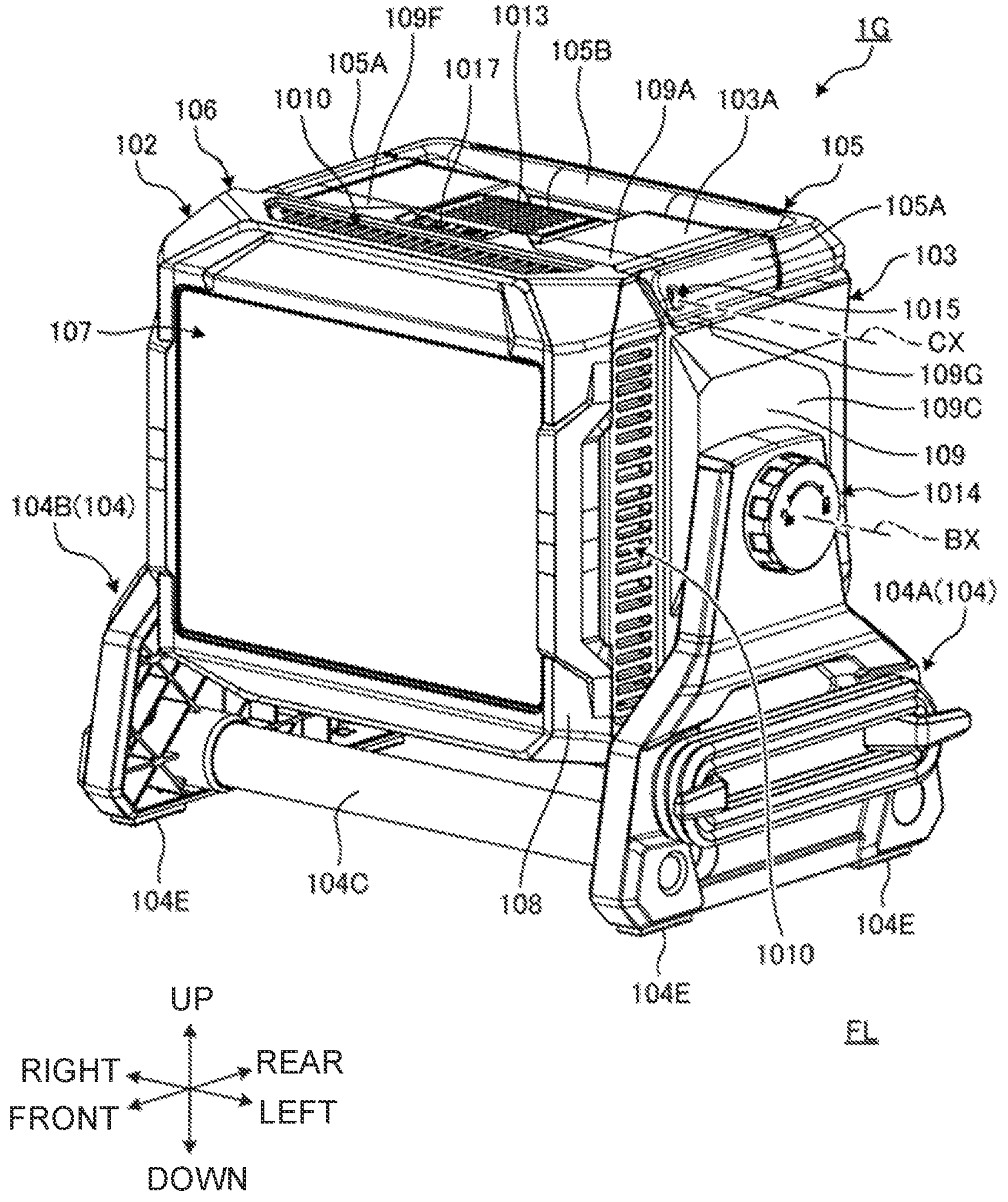
FIG. 24 is a perspective view of an electrical apparatus according to a seventh embodiment as viewed from the left front.
Figure 25:
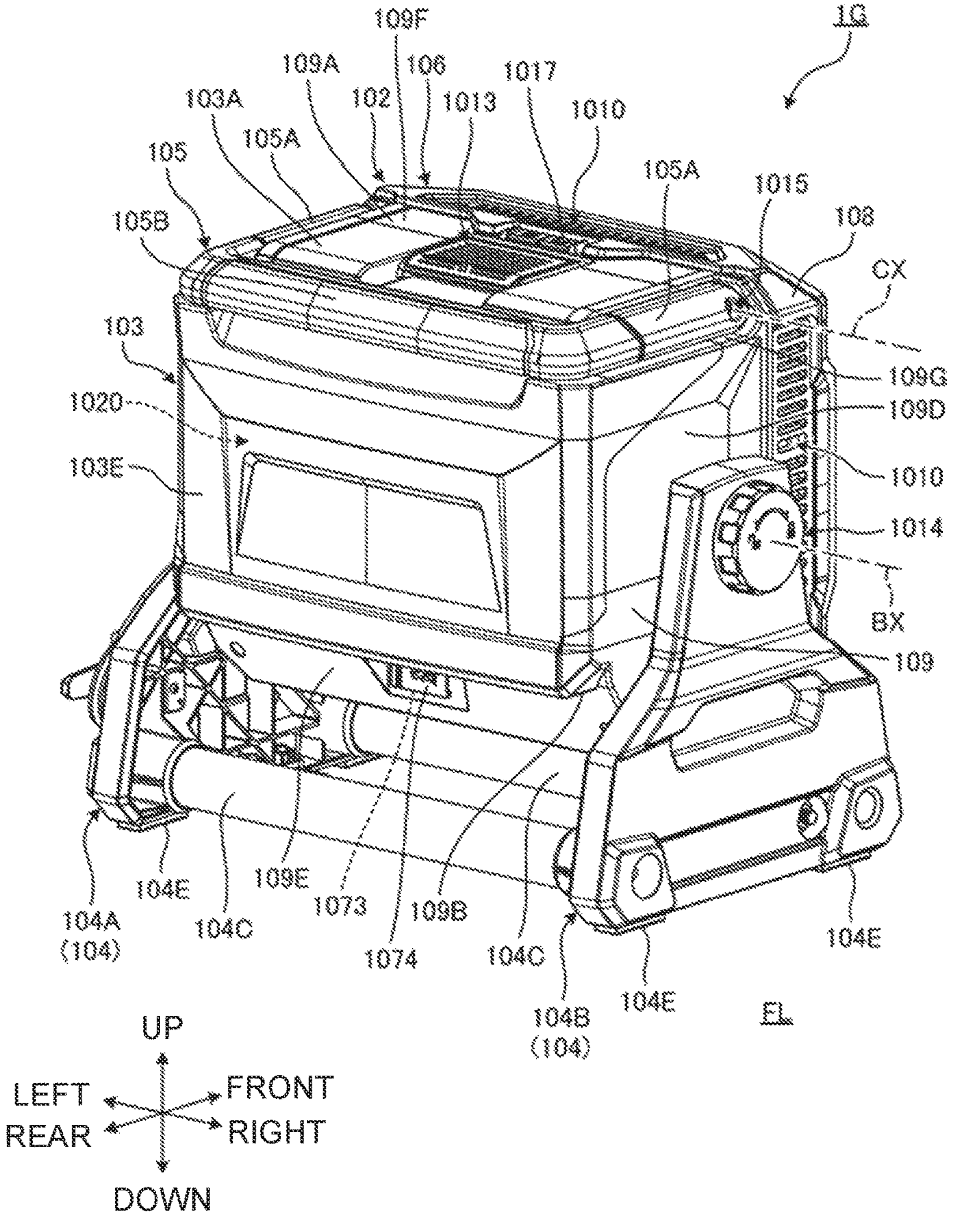
FIG. 25 is a perspective view of the electrical apparatus according to the seventh embodiment as viewed from the right rear.

FIG. 24 is a perspective view of an electrical apparatus 1G according to an embodiment as viewed from the left front. FIG. 25 is a perspective view of the electrical apparatus 1G according to the embodiment as viewed from the right rear.

As in the above embodiments, the electrical apparatus 1G is an illuminator.

As shown in FIGS. 24 and 25, the electrical apparatus 1G includes a body 102, a cover 103, a leg 104, and a handle 105. The cover 103 is joined to the body 102. The leg 104 is joined to the body 102. The handle 105 is joined to the body 102.

The body 102 includes a housing 106 and a light emitter 107.

The housing 106 includes a front housing 108 and a rear housing 109. The front housing 108 is located frontward from the rear housing 109.

The front housing 108 is a rectangular frame. The front housing 108 surrounds the light emitter 107. The front housing 108 accommodates at least a part of the light emitter 107. The front housing 108 has vents 1010 in its upper, lower, left, and right portions. The vents 1010 connect the inside and the outside of the housing 106.

The rear housing 109 is connected to the rear end of the front housing 108. The rear housing 109 includes an upper plate 109A, a lower plate 109B, a left plate 109C, a right plate 109D, and a rear plate 109E.

The light emitter 107 emits light frontward. The light emitter 107 is an output portion of the electrical apparatus 1G for outputting light. The light emitter 107 is located on a front portion of the body 102.

The cover 103 defines, with the body 102, a battery compartment 1020. The cover 103 is connected to a rear portion of the body 102. The body 102 in the embodiment has its rear portion being a rear portion of the rear housing 109. The rear housing 109 includes, on its lower portion on the rear surface, an AC terminal 1073 connectable to a utility power supply. The AC terminal 1073 is covered with a cover 1074.

The leg 104 is joined to the rear housing 109 with joining units 1014. The leg 104 includes a left leg 104A and a right leg 104B. The left leg 104A is joined to the left plate 109C of the rear housing 109. The right leg 104B is joined to the right plate 109D of the rear housing 109. The leg 104 is pivotable about a rotation axis BX of the joining units 1014. The rotation axis BX extends in the lateral direction. The left leg 104A and the right leg 104B are joined together with two rods 104C and one plate 104D (refer to FIGS. 27 to 29). The left leg 104A and the right leg 104B are pivotable together.

The leg 104 has lower surfaces 104E located below the lower surface of the body 102. The body 102 has its lower surface including the lower surface of the rear housing 109. When the electrical apparatus 1G is placed on a placement surface FL, the leg 104 has the lower surfaces 104E in contact with the placement surface FL.

The handle 105 is grippable by a user of the electrical apparatus 1G. The handle 105 includes a pair of arms 105A and a handle portion 105B. The handle portion 105B connects the pair of arms 105A. The handle 105 is joined to the rear housing 109 with hinges 1015. The handle 105 is pivotable about a hinge axis CX of the hinges 1015. The hinge axis CX extends in the lateral direction.

The upper plate 109A includes a protrusion 109F and supports 109G. The protrusion 109F protrudes upward. The supports 109G are located on the left and right of the protrusion 109F. Each support 109G has the upper surface located below the upper surface of the protrusion 109F. The upper plate 109A includes steps each between the upper surface of the protrusion 109F and the corresponding support 109G. The handle 105 is joined to side surfaces of the protrusion 109F with the hinges 1015.

One of the arms 105A is joined to the left side surface of the protrusion 109F with one of the hinges 1015. The other arm 105A is joined to the right side surface of the protrusion 109F with another hinge 1015. The handle 105 is joined to the body 102 with the hinges 1015 to have its handle portion 105B pivotable about the hinge axis CX.

The handle 105 is pivotable to a retracted position and to an in-use position. At the retracted position, the arms 105A and the handle portion 105B face the upper surfaces of the supports 109G. The handle 105 at the retracted position is at least partially located above the cover 103. At the in-use position, the arms 105A and the handle portion 105B are apart from the upper surfaces of the supports 109G, and the handle portion 105B is located above the hinges 1015. The user of the electrical apparatus 1G moves the handle 105 to the in-use position and carries the electrical apparatus 1G while gripping the handle portion 105B.

The electrical apparatus 1G includes a power button 1017. The power button 1017 is located on a front portion of the upper plate 109A of the rear housing 109. The power button 1017 is operated to activate the electrical apparatus 1G.

Battery Holder and Battery Compartment

Figure 26:
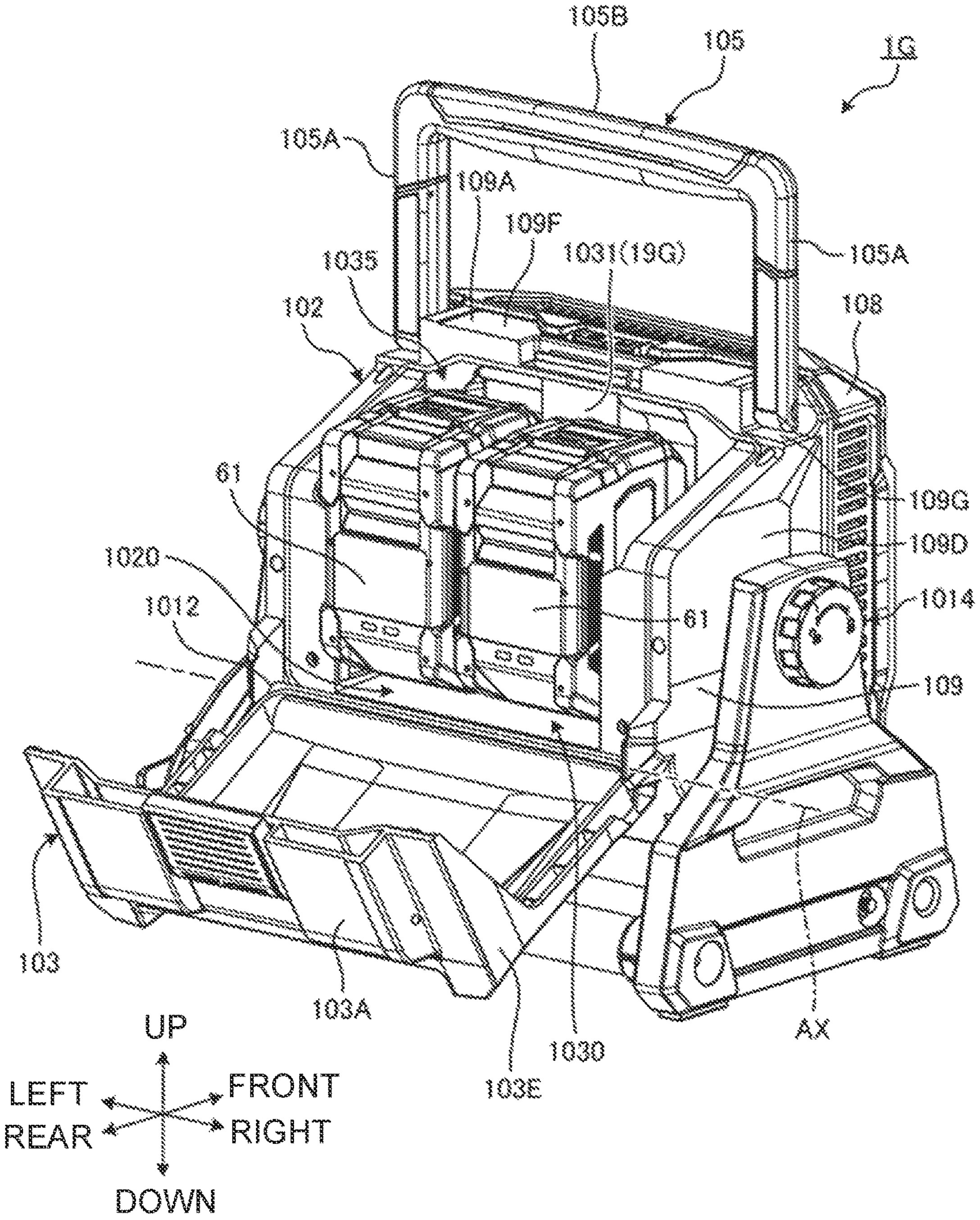
FIG. 26 is a perspective view of the electrical apparatus according to the seventh embodiment as viewed from the right rear with its cover being open.
Figure 27:
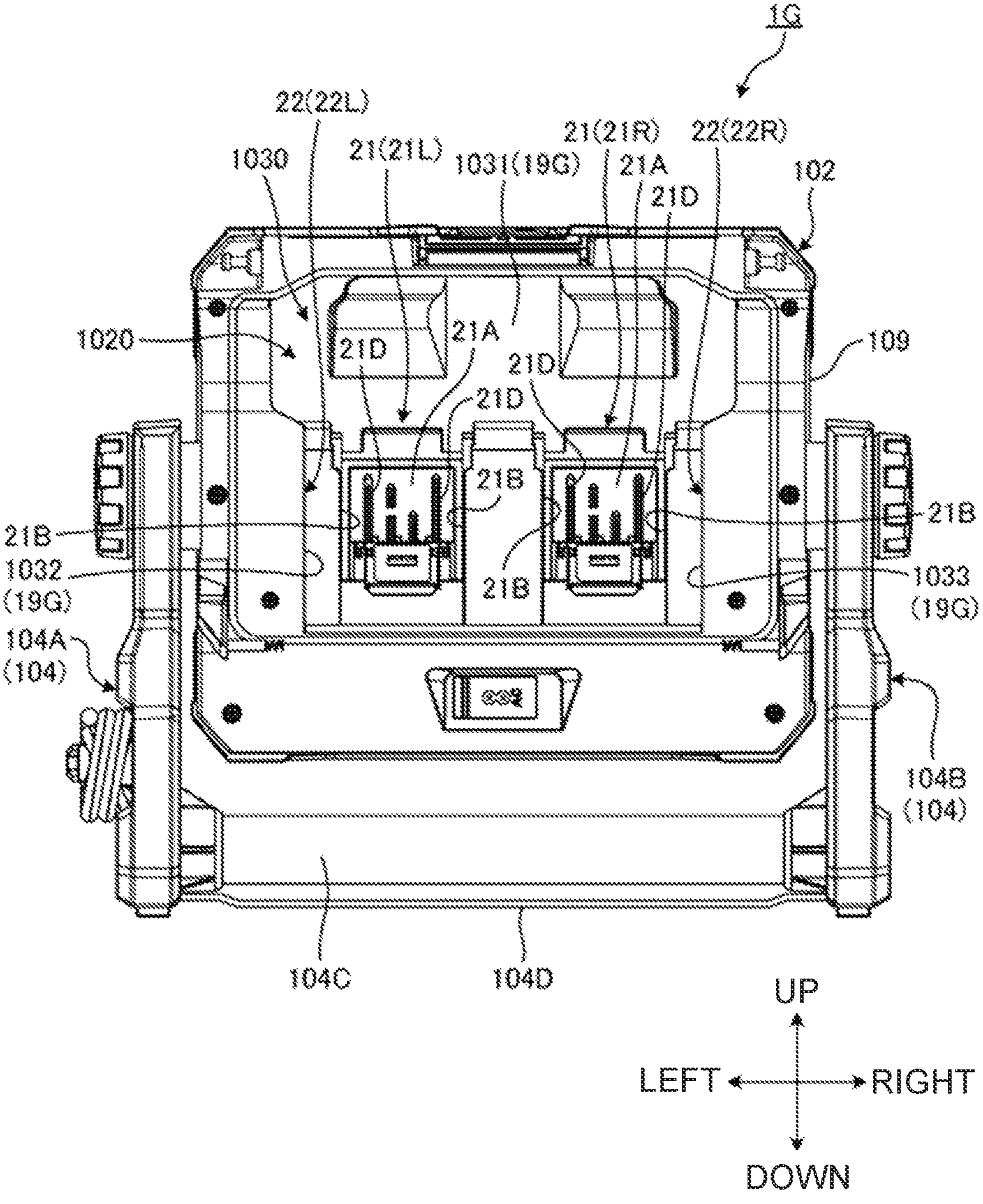
FIG. 27 is a rear view of the electrical apparatus according to the seventh embodiment with its cover removed.
Figure 28:
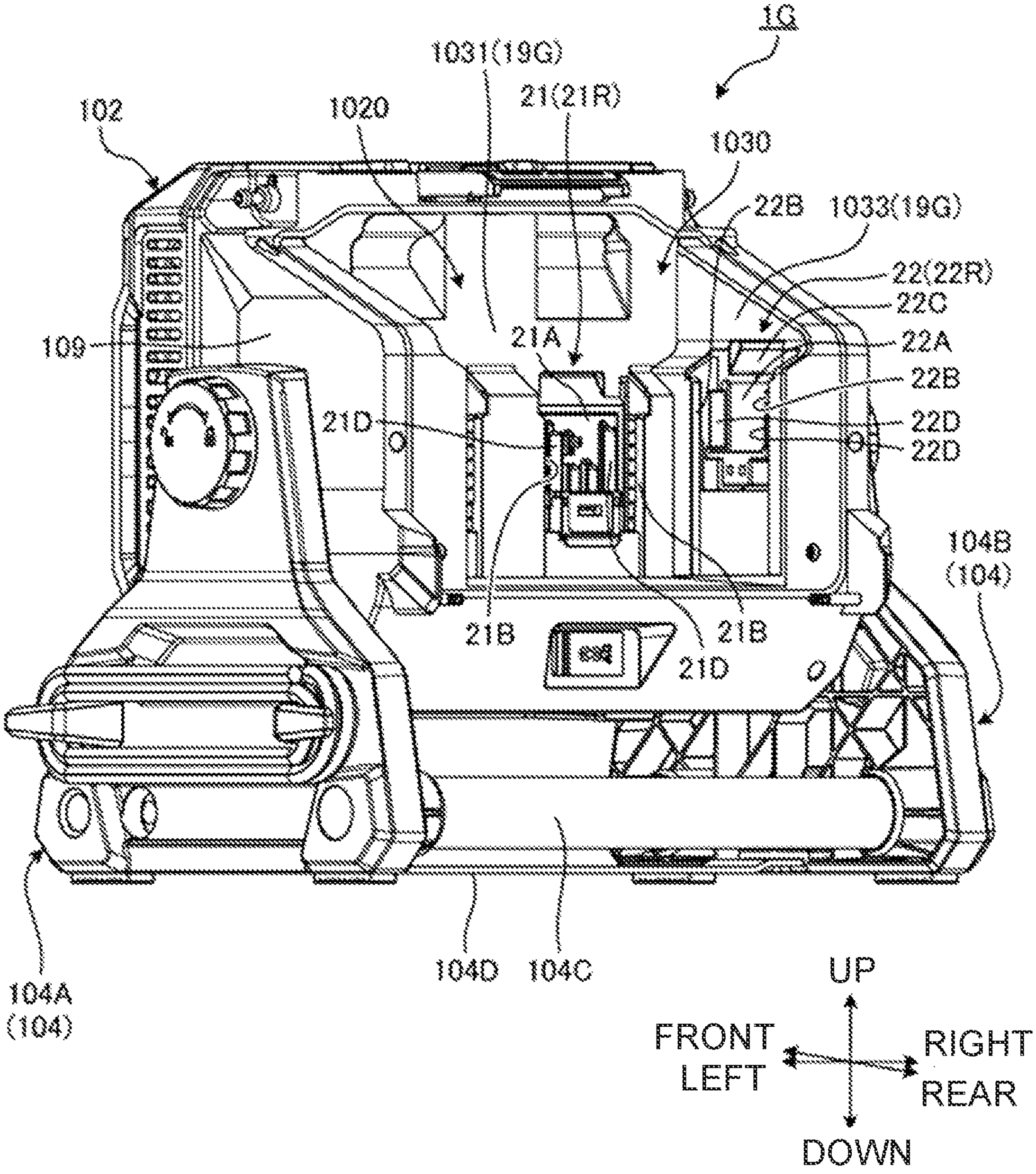
FIG. 28 is a perspective view of the electrical apparatus according to the seventh embodiment as viewed from the left rear with its cover removed.
Figure 29:
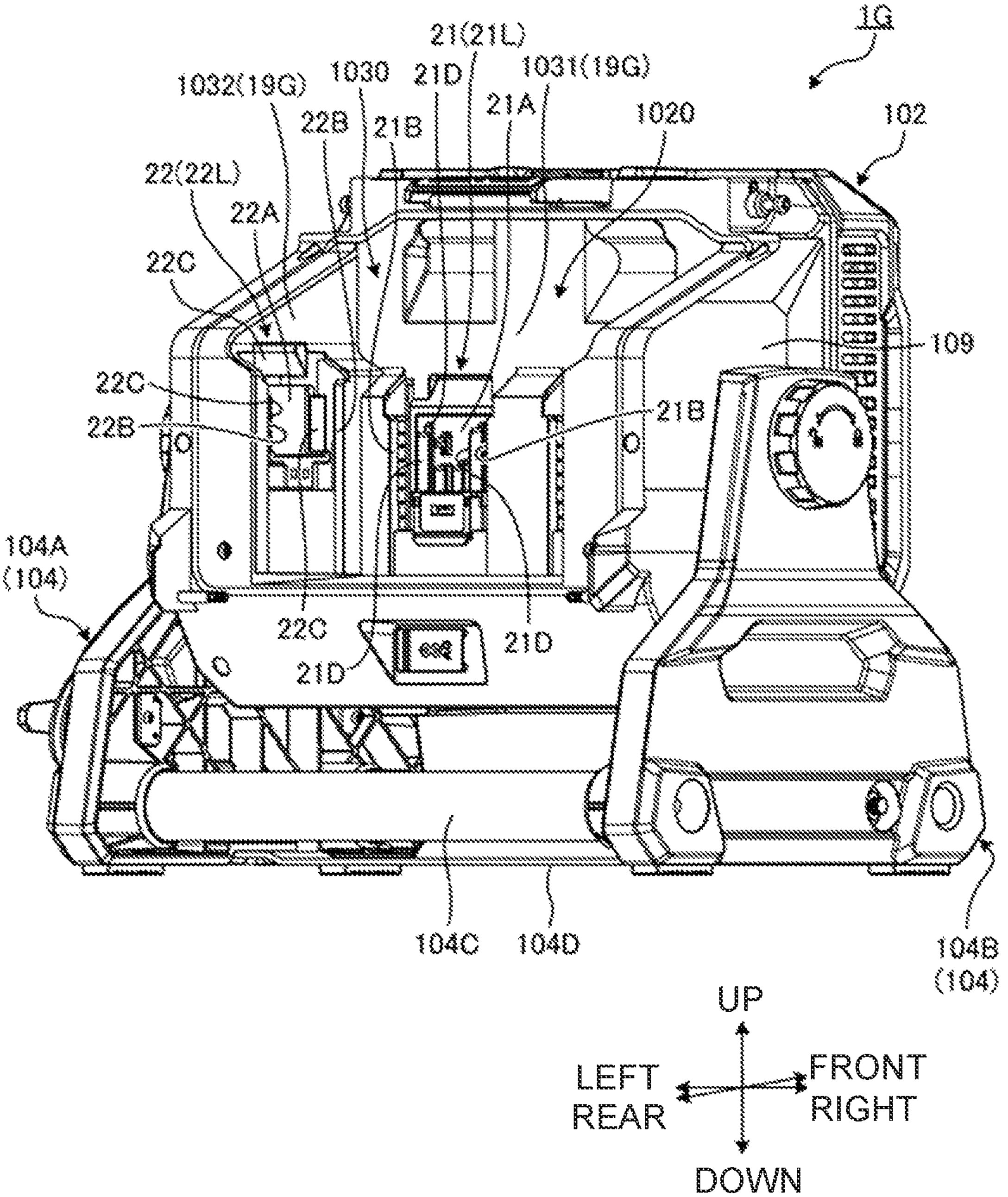
FIG. 29 is a perspective view of the electrical apparatus according to the seventh embodiment as viewed from the right rear with its cover removed.

FIG. 26 is a perspective view of the electrical apparatus 1G according to the embodiment as viewed from the right rear with its cover 103 being open. FIG. 27 is a rear view of the electrical apparatus 1G according to the embodiment with its cover 103 removed. FIG. 28 is a perspective view of the electrical apparatus 1G according to the embodiment as viewed from the left rear with its cover 103 removed. FIG. 29 is a perspective view of the electrical apparatus 1G according to the embodiment as viewed from the right rear with its cover 103 removed.

The electrical apparatus 1G includes a battery holder 19G. The battery holder 19G has a rear inner surface 1031 (first surface), a left inner surface 1032 (second surface), and a right inner surface 1033 (second surface). The rear inner surface 1031 (first surface) receives a battery. The left inner surface 1032 (second surface) and the right inner surface 1033 (second surface) receive batteries. The rear inner surface 1031 (first surface), the left inner surface 1032 (second surface), and the right inner surface 1033 (second surface) face in different directions. In the embodiment, the rear inner surface 1031, the left inner surface 1032, and the right inner surface 1033 are all located on the body 102.

The cover 103 defines, with the body 102, a battery compartment 1020. The cover 103 is pivotably joined to the body 102. The battery compartment 1020 is closed with the cover 103 pivoted to connect to the rear portion of the body 102. The battery compartment 1020 is open with the cover 103 pivoted to be apart from the rear portion of the body 102.

The electrical apparatus 1G includes a hinge 1012 joining the cover 103 to the body 102. The hinge 1012 joins the cover 103 to a lower rear portion of the rear housing 109. The hinge 1012 is located at the bottom of the cover 103 when the cover 103 is pivoted to close the battery compartment 1020. The cover 103 is pivotably joined to the lower rear portion of the rear housing 109 with the hinge 1012. The hinge 1012 has its hinge axis AX extending in the lateral direction. The cover 103 is joined to the body 102 with the hinge 1012 to have its upper end pivotable about the hinge axis AX.

The body 102 has a recess 1030 in the rear portion. The body 102 has its rear portion being a rear portion of the rear housing 109. The recess 1030 is recessed frontward. The recess 1030 is open at its upper end and forms an opening 1035.

The cover 103 includes an upper plate 103A and a rear plate 103E. When the cover 103 is closed, the upper plate 103A is located at the opening 1035.

The cover 103 and the rear housing 109 are fastened with a latch 1013. In this state, the battery compartment 1020 is closed.

The recess 1030 in the body 102 has an inner surface including the rear inner surface 1031 (first surface), the left inner surface 1032 (second surface), and the right inner surface 1033 (second surface). The left inner surface 1032 is located leftward from the rear inner surface 1031. The right inner surface 1033 is located rightward from the rear inner surface 1031. The left inner surface 1032 is connected to the left end of the rear inner surface 1031. The right inner surface 1033 is connected to the right end of the rear inner surface 1031. The rear inner surface 1031 is located frontward from the rear surface of the rear housing 109. The rear inner surface 1031 faces rearward. The left inner surface 1032 faces rightward. The right inner surface 1033 faces leftward. The left inner surface 1032 and the right inner surface 1033 face each other. The rear inner surface 1031 and the left inner surface 1032 are substantially orthogonal to each other. The rear inner surface 1031 and the right inner surface 1033 are substantially orthogonal to each other.

The rear inner surface 1031 faces the battery compartment 1020. The left inner surface 1032 faces the battery compartment 1020. The right inner surface 1033 faces the battery compartment 1020.

Battery Mounts

The electrical apparatus 1G includes first battery mounts 21 and second battery mounts 22. Each first battery mount 21 receives a first battery 61. Each second battery mount 22 receives a second battery 62. The first battery mounts 21 are located in the battery compartment 1020. The second battery mounts 22 are located in the battery compartment 1020. The battery compartment 1020 is defined by at least a part of the inner surface of the recess 1030 in the body 102 and at least a part of the inner surface of the cover 103.

Two first battery mounts 21 are located on the rear inner surface 1031 of the battery holder 19G. The two first battery mounts 21 are arranged in the lateral direction on the rear inner surface 1031.

The electrical apparatus 1G includes two second battery mounts 22. One of the second battery mounts 22 is located on the left inner surface 1032 of the battery holder 19G. The other second battery mount 22 is located on the right inner surface 1033 of the battery holder 19G.

The first battery mounts 21 each have a mount surface 21A, first guides 21B, and power terminals 21D. The first guides 21B guide the first battery 61.

The mount surface 21A faces an attachment surface 61A of the first battery 61 (refer to FIG. 8A).

The first guides 21B guide the first battery 61 in a predetermined guiding direction. The first battery 61 includes slides 61C (refer to FIG. 8A) that are guided along the first guides 21B. The two first guides 21B are arranged in the lateral direction. The guiding direction of the first guides 21B is the vertical direction.

The power terminals 21D are connected to power terminals 61F on the first battery 61 (refer to FIG. 8A) to supply power from the first battery 61 to the electrical apparatus 1G.

The second battery mounts 22 each have a mount surface 22A, second guides 22B, a locking slot 22C, and power terminals 22D. The second guides 22B guide the second battery 62.

The mount surface 22A faces an attachment surface 62A of the second battery 62 (refer to FIG. 8B).

The second guides 22B guide the second battery 62 in a predetermined guiding direction. The second battery 62 includes slides 62C (refer to FIG. 8B) that are guided along the second guides 22B. The two second guides 22B are arranged in the front-rear direction. The guiding direction of the second guides 22B is the vertical direction.

The locking slot 22C is located in the mount surface 22A. The locking slot 22C receives a protruding portion 62D on the second battery 62 (refer to FIG. 8B). This fastens the second battery 62 to the second battery mount 22. In response to an operation on a release button 62E (refer to FIG. 8B), the second battery 62 is unlocked and released from the second battery mount 22.

The power terminals 22D are connected to power terminals 62F on the second battery 62 (refer to FIG. 8B) to supply power from the second battery 62 to the electrical apparatus 1G.

The first battery mount 21 and the second battery mount 22 have different interface structures. The mount surface 21A, the first guides 21B, and the power terminals 21D are at relative positions different from the relative positions of the mount surface 22A, the second guides 22B, and the power terminals 22D. For example, the pair of first guides 21B have a distance between them different from the distance between the pair of second guides 22B. The pair of power terminals 21D have a distance between them different from the distance between the pair of power terminals 22D. The mount surface 21A has dimensions different from the dimensions of the mount surface 22A. The mount surface 21A has a profile different from the profile of the mount surface 22A.

As in the above embodiments, the first battery 61 and the second battery 62 are slidable. Each of the first battery 61 and the second battery 62 is a battery for power tools.

The first battery 61 and the second battery 62 supply power to the electrical apparatus 1G. The first battery 61 and the second battery 62 thus function as power supplies for the electrical apparatus 1G. The first battery 61 and the second battery 62 may be secondary batteries. The first battery 61 and the second battery 62 in the embodiment may be rechargeable lithium-ion batteries.

The first battery 61 is attached to the first battery mount 21 to supply power to the electrical apparatus 1G. The second battery 62 is attached to the second battery mount 22 to supply power to the electrical apparatus 1G.

As described with reference to FIG. 8A, the first battery 61 includes a housing 61B with the attachment surface 61A, the pair of slides 61C, and the pair of power terminals 61F. The housing 61B has an internal space to accommodate a battery cell. The battery cell is a rechargeable lithium-ion battery. The slides 61C extend in a predetermined sliding direction. The power terminals 61F are between the pair of slides 61C. One of the power terminals 61F is a positive power terminal. The other power terminal 61F is a negative power terminal.

As described with reference to FIG. 8B, the second battery 62 includes a housing 62B with the attachment surface 62A, the pair of slides 62C, the protruding portion 62D, the release button 62E, and the pair of power terminals 62F. The protruding portion 62D is supported movably on the housing 62B. The release button 62E is operable to operate the protruding portion 62D. The housing 62B has an internal space to accommodate a battery cell. The battery cell is a rechargeable lithium-ion battery. The slides 62C extend in a predetermined sliding direction. The protruding portion 62D is supported movably by a spring. The protruding portion 62D protrudes from the attachment surface 62A under an elastic force from the spring. The power terminals 62F are between the pair of slides 62C. One of the power terminals 62F is a positive power terminal. The other power terminal 62F is a negative power terminal.

The first battery 61 and the second battery 62 are of different types. The electrical apparatus 1G may use, as its power supply, the first battery 61 and the second battery 62 of different types.

The first battery 61 and the second battery 62 differ in rated voltage (V). The first battery 61 has a higher rated voltage than the second battery 62. The first battery 61 has a rated voltage of, for example, 36 V. The second battery 62 has a rated voltage of, for example, 10.8 V. The first battery 61 may have a rated voltage of 40 V. The second battery 62 may have a rated voltage of 18 V.

The first battery 61 and the second battery 62 differ in capacity (Ah). The first battery 61 has a higher capacity than the second battery 62.

The first battery 61 and the second battery 62 differ in weight (g). The first battery 61 is heavier than the second battery 62.

The first battery 61 and the second battery 62 differ in outer dimensions (mm). The first battery 61 has greater outer dimensions than the second battery 62.

The first battery 61 is slidable on the first battery mount 21 while being guided along the first guides 21B for attachment to and detachment from the first battery mount 21. With the cover 103 being open, the first battery 61 is attachable to and detachable from the first battery mount 21.

In the embodiment, the guiding direction of the first guides 21B is the vertical direction. The first battery 61 is slidable in the vertical direction for attachment to and detachment from the first battery mount 21.

To attach the first battery 61 to the first battery mount 21, the user of the electrical apparatus 1G places the first battery 61 into the recess 1030 through the opening 1035. The user of the electrical apparatus 1G slides the first battery 61 downward along the first battery mount 21 after placing the slides 61C in contact with the upper ends of the first guides 21B. The first battery 61 moves downward while being guided along the first guides 21B. The first battery 61 is thus attached to the first battery mount 21.

In this manner, the first battery 61 is slidable on the first battery mount 21 toward the lower ends of the first guides 21B while being guided along the first guides 21B for attachment to the first battery mount 21.

To detach the first battery 61 from the first battery mount 21, the first battery 61 is slid upward.

The second battery 62 is slidable on the second battery mount 22 while being guided along the second guides 22B for attachment to and detachment from the second battery mount 22. With the cover 103 being open, the second battery 62 is attachable to and detachable from the second battery mount 22.

In the embodiment, the guiding direction of the second guides 22B is the vertical direction. The second battery 62 is slidable in the vertical direction for attachment to and detachment from the second battery mount 22.

To attach the second battery 62 to the second battery mount 22, the user of the electrical apparatus 1G places the second battery 62 into the recess 1030 through the opening 1035. The user of the electrical apparatus 1G slides the second battery 62 downward along the second battery mount 22 after placing the slides 62C in contact with the upper ends of the second guides 22B. The second battery 62 moves downward while being guided along the second guides 22B. The second battery 62 is thus attached to the second battery mount 22.

In this manner, the second battery 62 is slidable on the second battery mount 22 while being guided along the second guides 22B toward the lower ends of the second guides 22B for attachment to the second battery mount 22.

To detach the second battery 62 from the second battery mount 22, the second battery 62 is slid upward.

Battery Attachment Patterns

FIGS. 30 to 33 are rear views of the electrical apparatus 1G according to the embodiment with its cover 103 removed.

The first battery mount 21 located on the left on the rear inner surface 1031 is hereafter referred to as a left first battery mount 21L, and the first battery mount 21 located on the right is referred to as a right first battery mount 21R for convenience. The second battery mount 22 located on the left inner surface 1032 is referred to as a left second battery mount 22L for convenience. The second battery mount 22 located on the right inner surface 1033 is referred to as a right second battery mount 22R for convenience.

Figure 30:
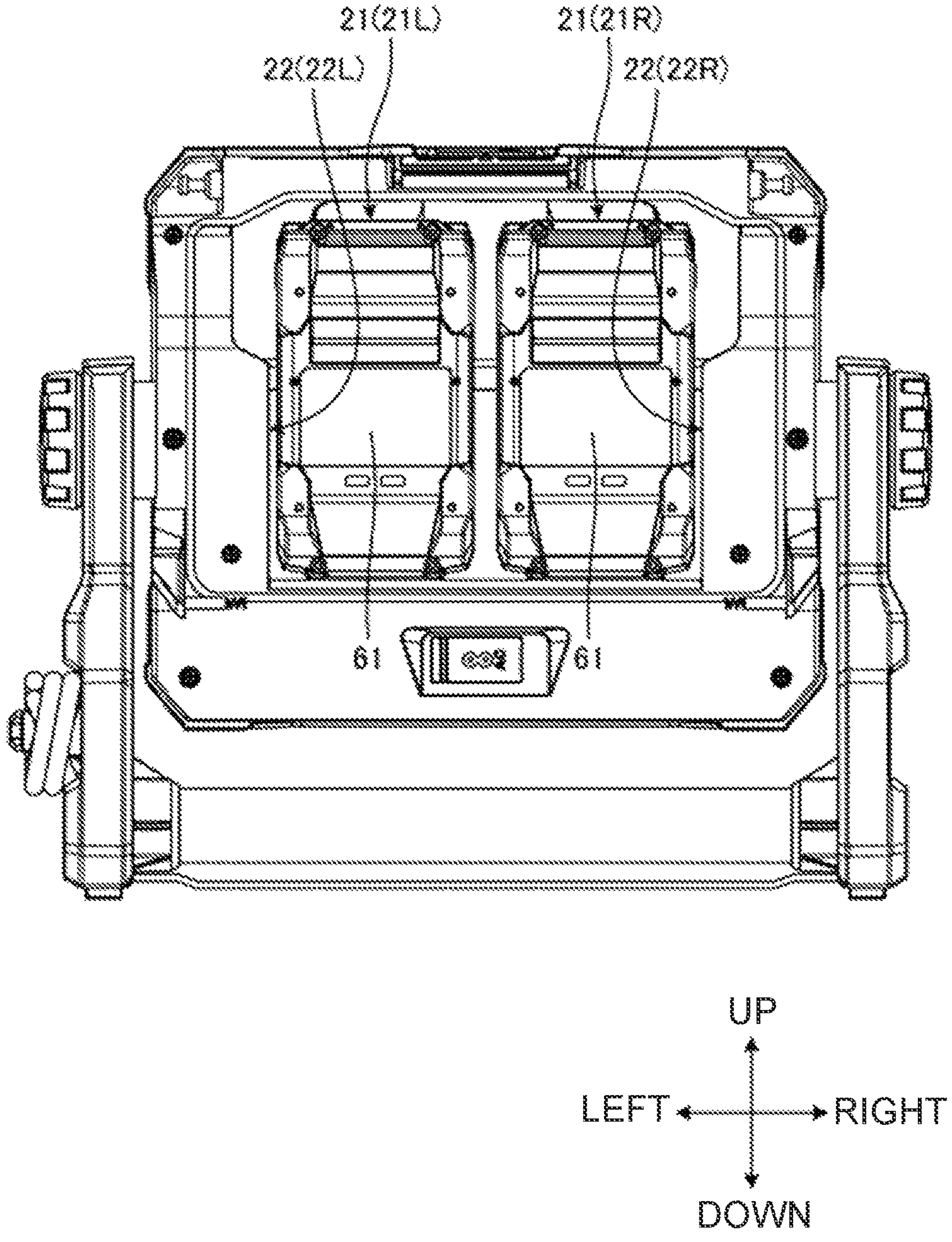
FIG. 30 is a rear view of the electrical apparatus according to the seventh embodiment with its cover removed.

FIG. 30 shows first batteries 61 attached to the two first battery mounts 21 when the second battery 62 is unattached to any of the two second battery mounts 22. In this state, the second battery 62 is unattachable to any of the two second battery mounts 22.

When the first battery 61 is attached to the left first battery mount 21L, the second battery 62 is blocked by the first battery 61 and is thus unattachable to the left second battery mount 22L.

When the first battery 61 is attached to the right first battery mount 21R, the second battery 62 is blocked by the first battery 61 and is thus unattachable to the right second battery mount 22R.

The first battery mounts 21 and the second battery mounts 22 are positioned relative to each other in accordance with the profiles and dimensions of the first battery 61 and the second battery 62 to cause the second battery 62 to be unattachable to the left second battery mount 22L when the first battery 61 is attached to the left first battery mount 21L and to cause the second battery 62 to be unattachable to the right second battery mount 22R when the first battery 61 is attached to the right first battery mount 21R.

Figure 31:
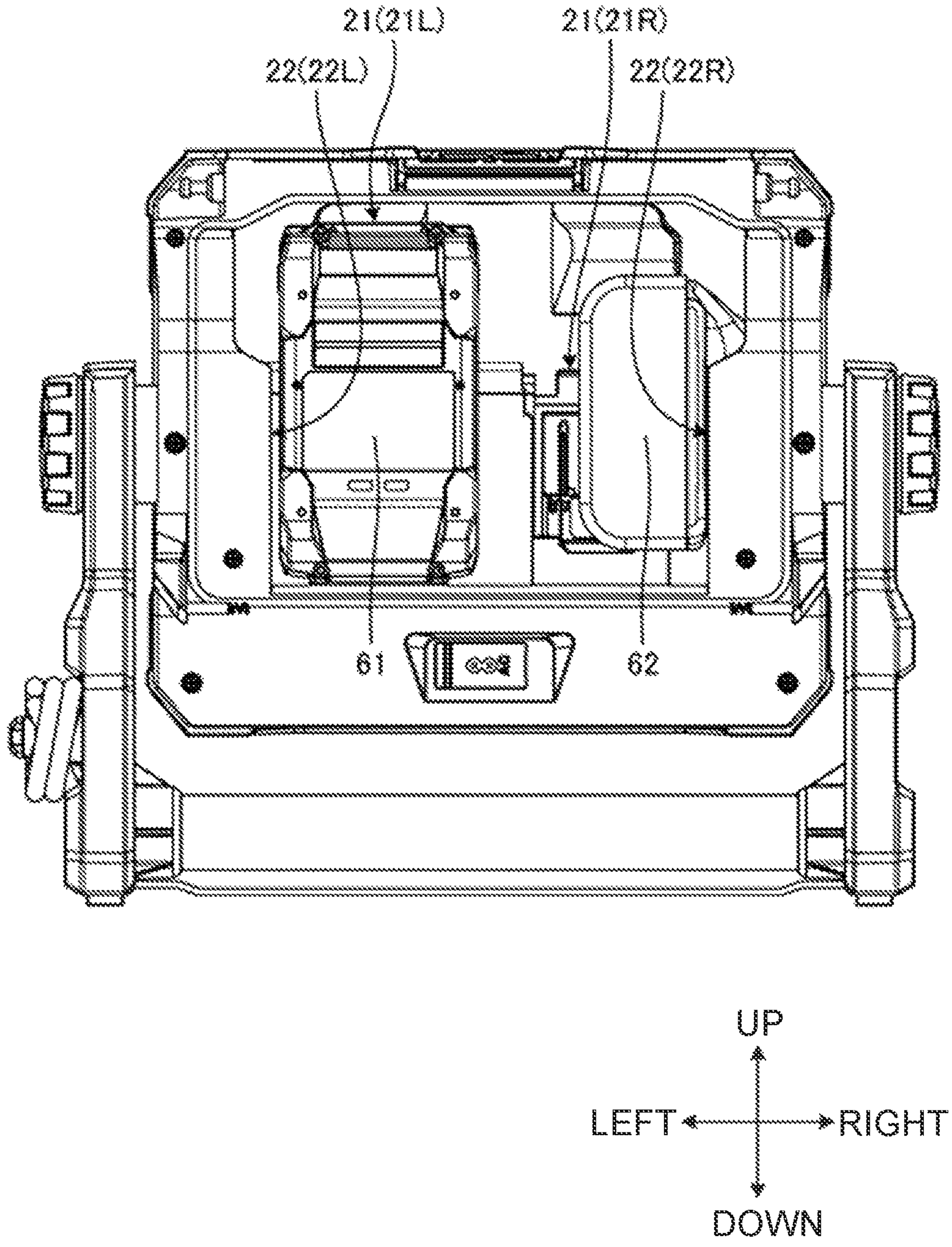
FIG. 31 is a rear view of the electrical apparatus according to the seventh embodiment with its cover removed.

FIG. 31 shows the first battery 61 attached to the left first battery mount 21L and the second battery 62 attached to the right second battery mount 22R when another first battery 61 is unattached to the right first battery mount 21R and another second battery 62 is unattached to the left second battery mount 22L. In this state, the other first battery 61 is unattachable to the right first battery mount 21R, and the other second battery 62 is unattachable to the left second battery mount 22L.

When the first battery 61 is attached to the left first battery mount 21L, the second battery 62 is blocked by the first battery 61 and is unattachable to the left second battery mount 22L.

When the second battery 62 is attached to the right second battery mount 22R, the first battery 61 is blocked by the second battery 62 and is unattachable to the right first battery mount 21R.

The first battery mounts 21 and the second battery mounts 22 are positioned relative to each other in accordance with the profiles and dimensions of the first battery 61 and the second battery 62 to cause the second battery 62 to be unattachable to the left second battery mount 22L when the first battery 61 is attached to the left first battery mount 21L and to cause the first battery 61 to be unattachable to the right first battery mount 21R when the second battery 62 is attached to the right second battery mount 22R.

Figure 32:
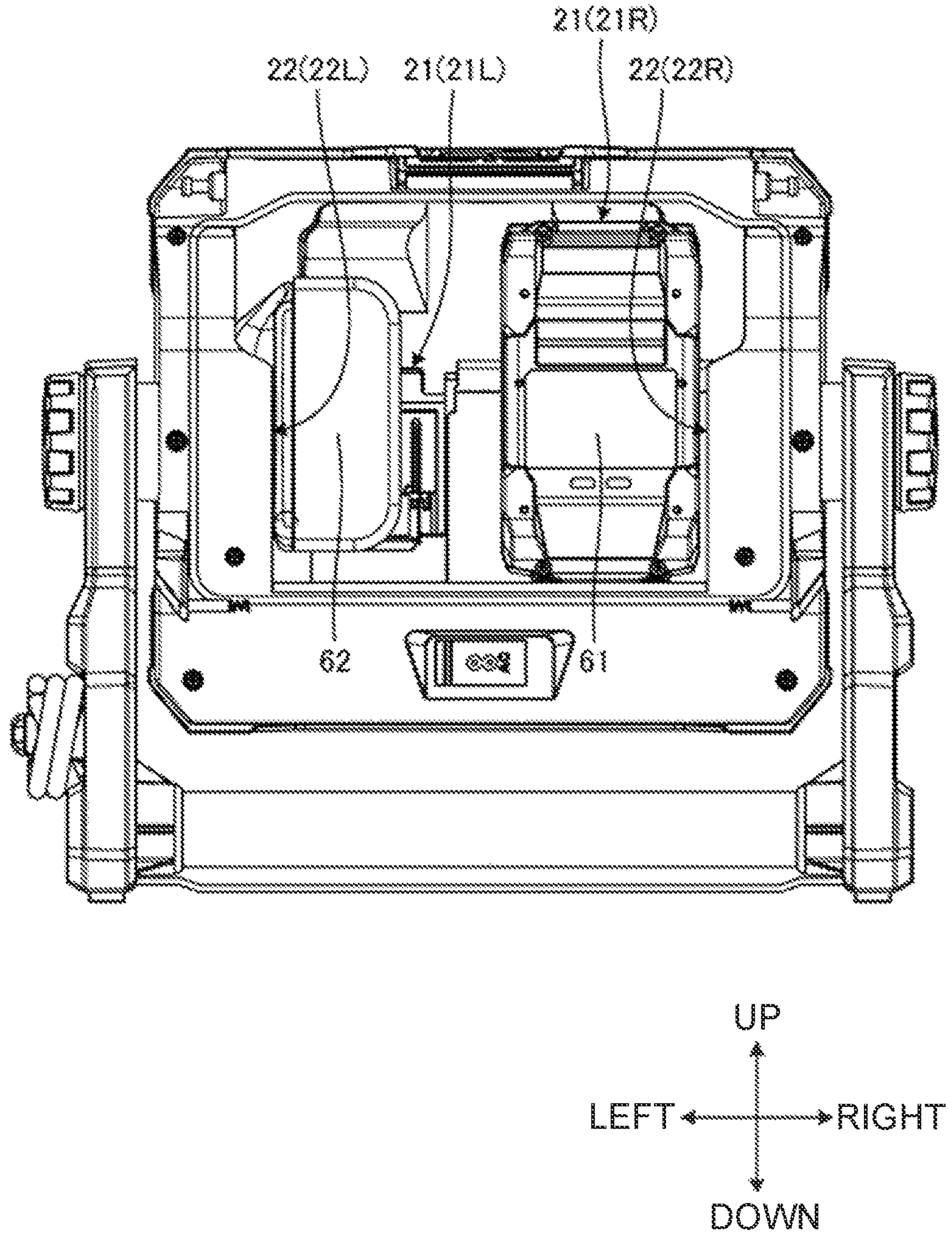
FIG. 32 is a rear view of the electrical apparatus according to the seventh embodiment with its cover removed.

FIG. 32 shows the first battery 61 attached to the right first battery mount 21R and the second battery 62 attached to the left second battery mount 22L when another first battery 61 is unattached to the left first battery mount 21L and another second battery 62 is unattached to the right second battery mount 22R. In this state, the other first battery 61 is unattachable to the left first battery mount 21L, and the other second battery 62 is unattachable to the right second battery mount 22R.

When the first battery 61 is attached to the right second battery mount 22R, the second battery 62 is blocked by the first battery 61 and is unattachable to the right first battery mount 21R.

When the second battery 62 is attached to the left second battery mount 22L, the first battery 61 is blocked by the second battery 62 and is unattachable to the left first battery mount 21L.

The first battery mounts 21 and the second battery mounts 22 are positioned relative to each other in accordance with the profiles and dimensions of the first battery 61 and the second battery 62 to cause the second battery 62 to be unattachable to the right second battery mount 22R when the first battery 61 is attached to the right first battery mount 21R and to cause the first battery 61 to be unattachable to the left first battery mount 21L when the second battery 62 is attached to the left second battery mount 22L.

Figure 33:
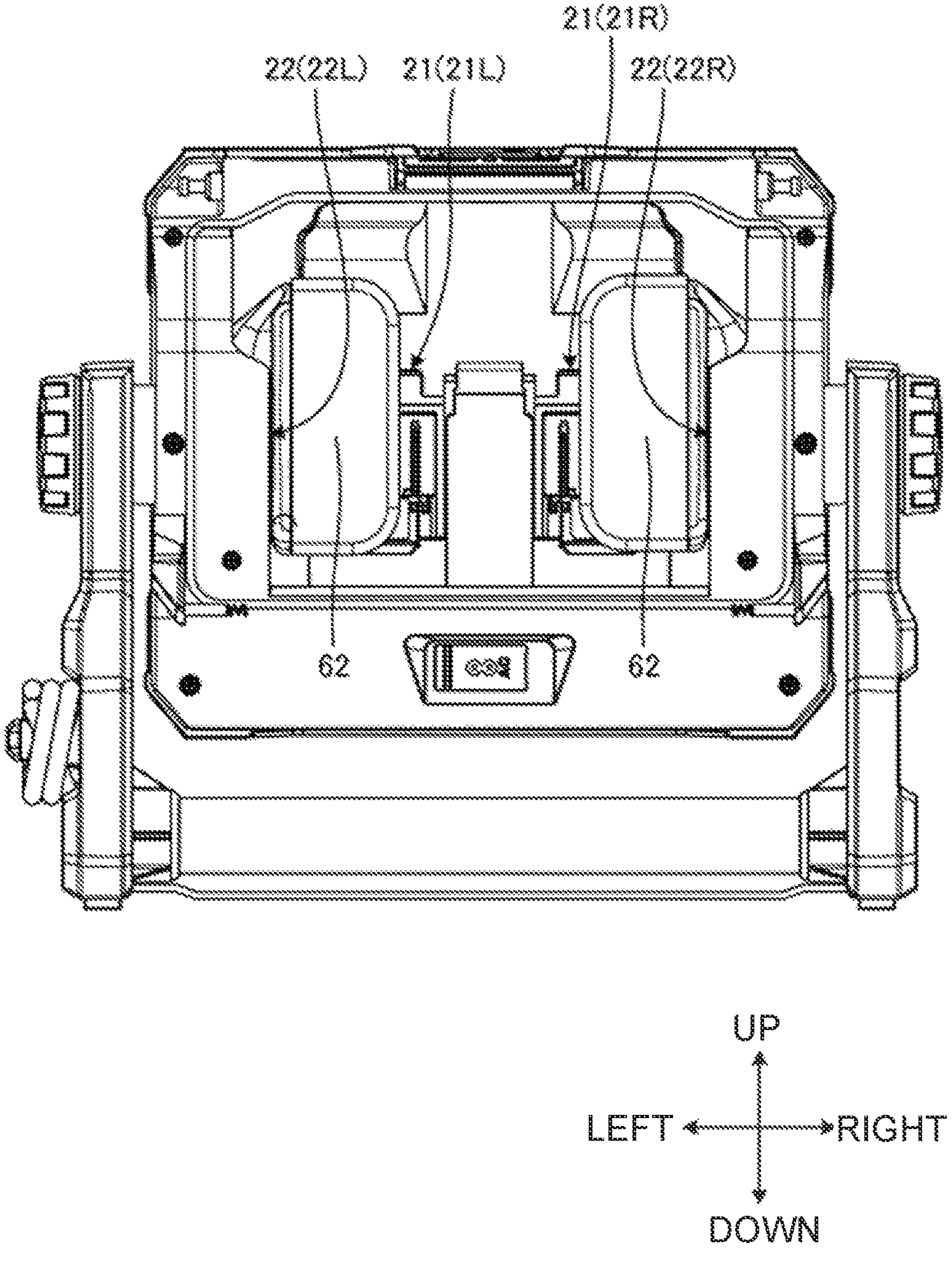
FIG. 33 is a rear view of the electrical apparatus according to the seventh embodiment with its cover removed.

FIG. 33 shows the second batteries 62 attached to the two second battery mounts 22 when the first battery 61 is unattached to any of the two first battery mounts 21. In this state, the first battery 61 is unattachable to any of the two first battery mounts 21.

When the second battery 62 is attached to the left second battery mount 22L, the first battery 61 is blocked by the second battery 62 and is unattachable to the left first battery mount 21L.

When the second battery 62 is attached to the right second battery mount 22R, the first battery 61 is blocked by the second battery 62 and is unattachable to the right first battery mount 21R.

The first battery mounts 21 and the second battery mounts 22 are positioned relative to each other in accordance with the profiles and dimensions of the first battery 61 and the second battery 62 to cause the first battery 61 to be unattachable to the left first battery mount 21L when the second battery 62 is attached to the left second battery mount 22L and to cause the first battery 61 to be unattachable to the right first battery mount 21R when the second battery 62 is attached to the right second battery mount 22R.

As shown in FIGS. 30 to 33, two batteries (61, 62) attached to the electrical apparatus 1G at the same time are electrically connected in parallel. The light emitter 107 can emit light using power supplied from the two batteries. The two batteries are electrically connected in parallel. The light emitter 107 can also emit light using power supplied from a single battery (61, 62) attached to the electrical apparatus 1G. The two batteries with the same rated voltage may be attached to the electrical apparatus 1G at the same time and electrically connected in series.

Shade

Figure 34:
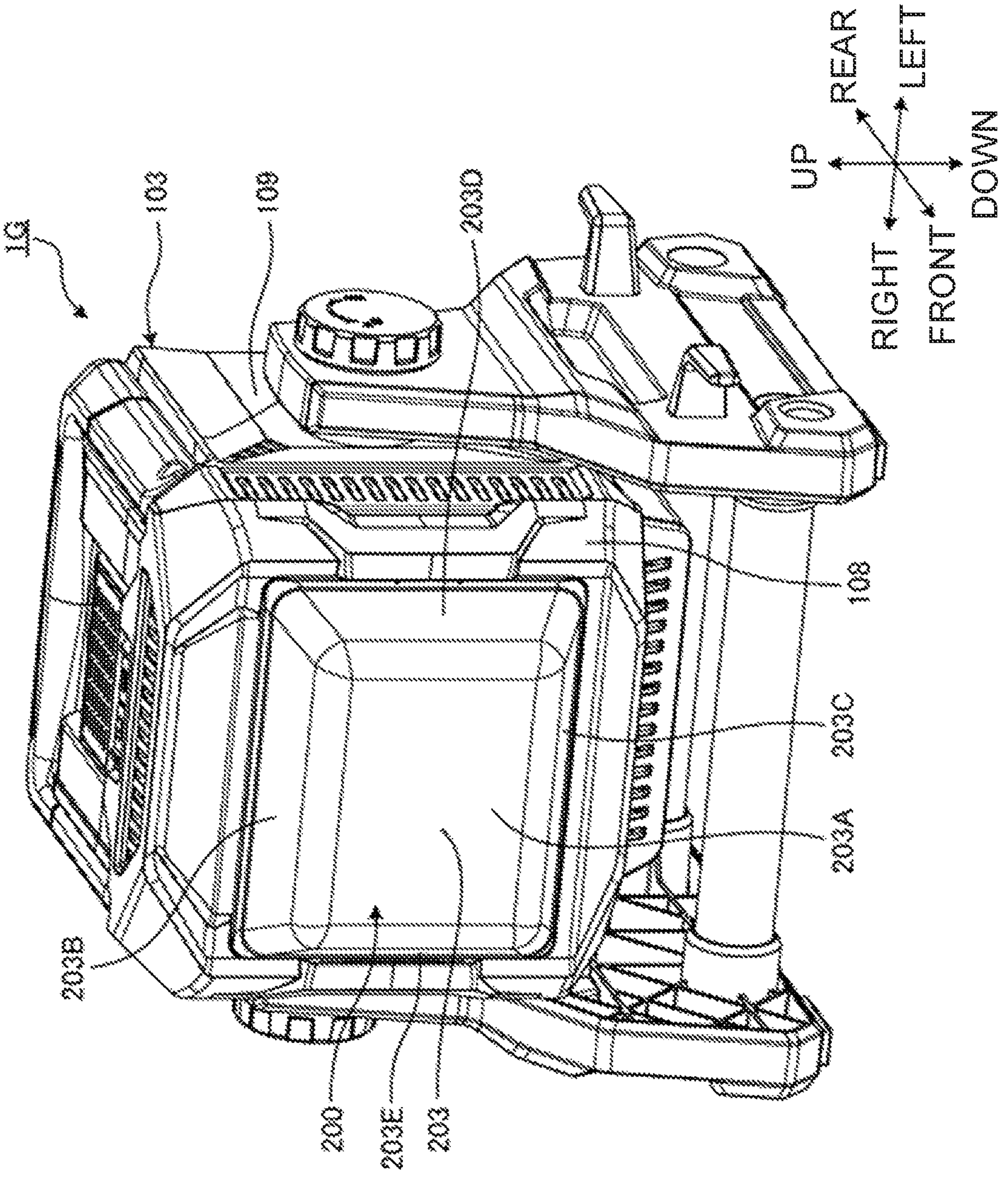
FIG. 34 is a perspective view of the electrical apparatus with a shade according to the seventh embodiment as viewed from the left front.
Figure 35:
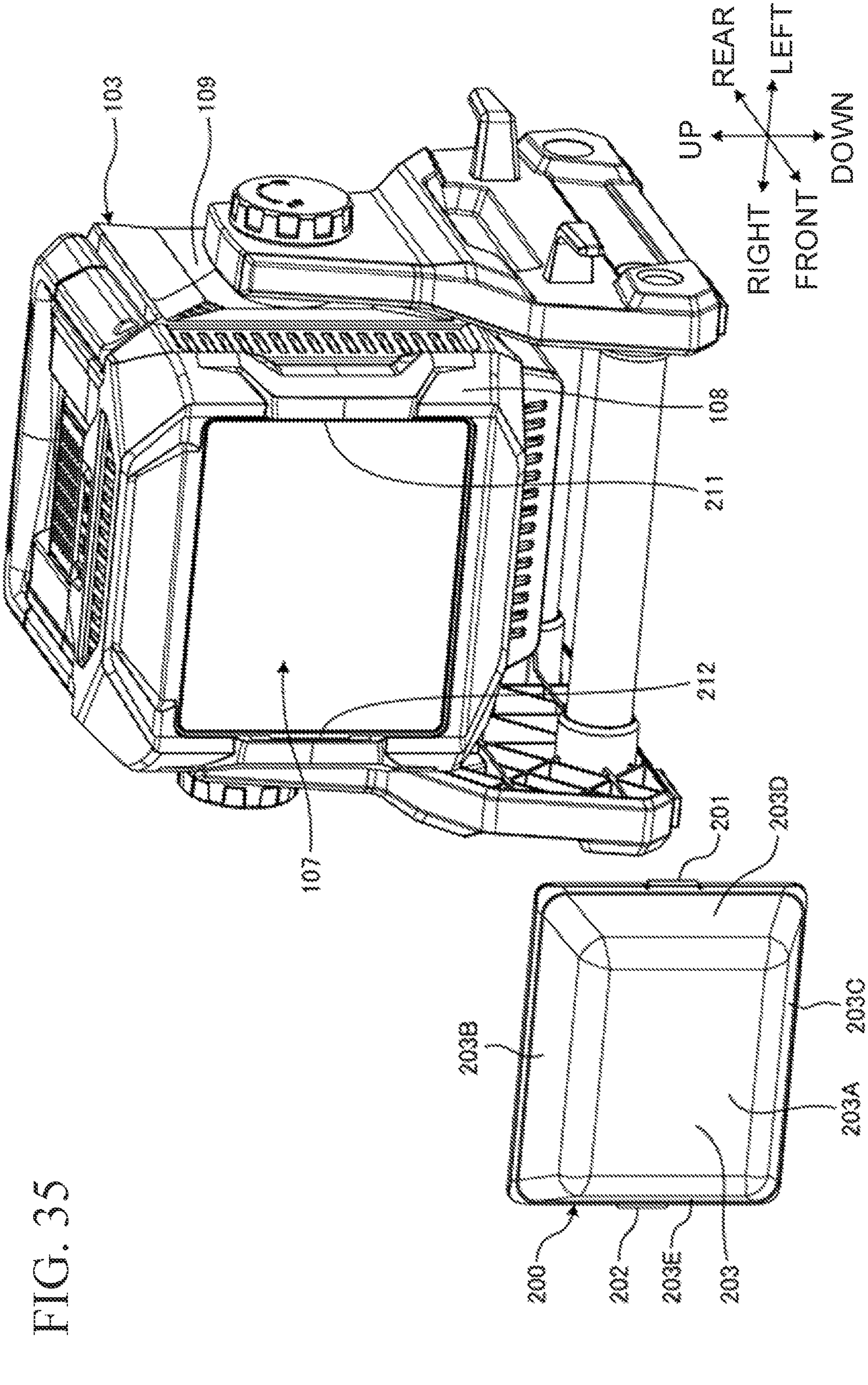
FIG. 35 is an exploded perspective view of the electrical apparatus with the shade according to the seventh embodiment as viewed from the left front.

FIG. 34 is a perspective view of the electrical apparatus 1G with a shade 200 according to the embodiment as viewed from the left front. FIG. 35 is an exploded perspective view of the electrical apparatus 1G with the shade 200 according to the embodiment as viewed from the left front. As shown in FIGS. 34 and 35, the shade 200 is attached to the electrical apparatus 1G. The shade 200 faces the front surface of the light emitter 107. Similarly to the light emitter 7 in the first embodiment above, the light emitter 107 includes multiple light sources 7S and a lens 7L in front of the light sources 7S. The light sources 7S are LEDs. The lens 7L is a light-transmissive plate. The light emitter 107 has its front surface being the front surface of the lens 7L. The light emitter 107 has its front surface being a light-emitting surface for emitting light.

The shade 200 protects the light emitter 107. The shade 200 disperses light emitted from the light emitter 107. The shade 200 transmits at least part of light emitted from the light emitter 107.

The shade 200 is attachable to and detachable from the front housing 108. The shade 200 includes a left projection 201 on its left portion. The shade 200 includes a right projection 202 on its right portion. The left projection 201 is received in a left recess 211 located in a left portion of the light emitter 107 in the front housing 108. The right projection 202 is received in a right recess 212 located in a right portion of the light emitter 107 in the front housing 108.

The shade 200 is bendable. The shade 200 is elastically deformable to cause its left projection 201 and its right projection 202 to move toward each other. To attach the shade 200 to the front housing 108, the user of the electrical apparatus 1G places the left projection 201 into the left recess 211 and then bends the shade 200 to cause the left projection 201 and the right projection 202 to move toward each other. The user of the electrical apparatus 1G can thus place the right projection 202 into the right recess 212 with the left projection 201 being received in the left recess 211. The elastically deformed shade 200 is then released and attached to the front housing 108. The user of the electrical apparatus 1G may place the left projection 201 into the left recess 211 after placing the right projection 202 into the right recess 212. The user of the electrical apparatus 1G may place the left projection 201 into the left recess 211 and place the right projection 202 into the right recess 212 at the same time by bending the shade 200.

The multiple light sources 7S included in the light emitter 107 may produce multiple images (shadows) of the light sources 7S. Such multiple images of the light sources 7S may cause difficulty in the work when the user of the electrical apparatus 1G works on an object illuminated with light from the light emitter 107.

The shade 200 disperses light emitted from each of the multiple light sources 7S. The shade 200 thus reduces the likelihood that multiple images of the light sources 7S are produced. The user of the electrical apparatus 1G can thus smoothly work on an object illuminated with light from the light emitter 107.

The shade 200 disperses light emitted from the front surface of the light emitter 107. The shade 200 has an emission surface 203 for outputting the dispersed light. The emission surface 203 protrudes frontward. The emission surface 203 includes a front surface 203A, an upper surface 203B, a lower surface 203C, a left surface 203D, and a right surface 203E. The front surface 203A faces frontward. The front surface 203A is substantially parallel to the front surface of the light emitter 107. The upper surface 203B is connected to the upper end of the front surface 203A. The upper surface 203B faces frontward and upward. The lower surface 203C is connected to the lower end of the front surface 203A. The lower surface 203C faces frontward and downward. The left surface 203D is connected to the left end of the front surface 203A. The left surface 203D faces frontward and leftward. The right surface 203E is connected to the right end of the front surface 203A. The right surface 203E faces frontward and rightward.

The shade 200 transmits light emitted from the front surface of the light emitter 107 and outputs the light through its emission surface 203. The light is output from each of the front surface 203A, the upper surface 203B, the lower surface 203C, the left surface 203D, and the right surface 203E. This structure allows light emitted from the light emitter 107 to illuminate a larger area.

The light emitted from the front surface of the light emitter 107 is dispersed by the shade 200 and thus becomes softer. The user of the electrical apparatus 1G can thus avoid being dazzled by the light.

The electrical apparatus 1G according to the embodiment includes the battery holder 19 having the rear inner surface 1031 (first surface), the left inner surface 1032 (second surface), and the right inner surface 1033 (second surface). The rear inner surface 1031, the left inner surface 1032, and the right inner surface 1033 are all located on a body 102. The body 102 has the rear inner surface 1031, the left inner surface 1032, and the right inner surface 1033 facing in different directions. Two first battery mounts 21 are located on the rear inner surface 1031, and one second battery mount 22 is located on each of the left inner surface 1032 and the right inner surface 1033. The electrical apparatus 1G with this structure can be miniaturized as compared with, for example, an electrical apparatus including four battery mounts arranged in parallel on a single surface.

In the embodiment, the left first battery mount 21L and the left second battery mount 22L are positioned relative to each other in accordance with the profiles and dimensions of the first battery 61 and the second battery 62 to cause the second battery 62 to be unattachable to the left second battery mount 22L when the first battery 61 is attached to the left first battery mount 21L.

The left second battery mount 22L and the left first battery mount 21L are positioned relative to each other in accordance with the profiles and dimensions of the first battery 61 and the second battery 62 to cause the first battery 61 to be unattachable to the left first battery mount 21L when the second battery 62 is attached to the left second battery mount 22L.

The right first battery mount 21R and the right second battery mount 22R are positioned relative to each other in accordance with the profiles and dimensions of the first battery 61 and the second battery 62 to cause the second battery 62 to be unattachable to the right second battery mount 22R when the first battery 61 is attached to the right first battery mount 21R.

The right second battery mount 22R and the right first battery mount 21R are positioned relative to each other in accordance with the profiles and dimensions of the first battery 61 and the second battery 62 to cause the first battery 61 to be unattachable to the right first battery mount 21R when the second battery 62 is attached to the right second battery mount 22R.

This structure reduces a current flowing from the first battery 61 to the second battery 62 or from the second battery 62 to the first battery 61 as described above.

Modifications

In the above embodiments, two first battery mounts 21 are located on the rear inner surface 1031, and one second battery mount 22 is located on each of the left inner surface 1032 and the right inner surface 1033. The second battery mount 22 may be located on the left inner surface 1032 without any second battery mount 22 located on the right inner surface 1033. The second battery mount 22 may be located on the right inner surface 1033 without any second battery mount 22 located on the left inner surface 1032.

In the above embodiments, the apparatus includes two first battery mounts 21 and two second battery mounts 22. A single first battery mount 21 alone may be located on the rear inner surface 1031. A second battery mount 22 may be located on either the left inner surface 1032 or the right inner surface 1033 alone.

In the above embodiments, the first surface (the rear inner surface 1031) and the second surfaces (the left inner surface 1032 and the right inner surface 1033) of the battery holder 19G may be all located on the body 102. In this case, the cover 103 may be eliminated.

Figure 36:
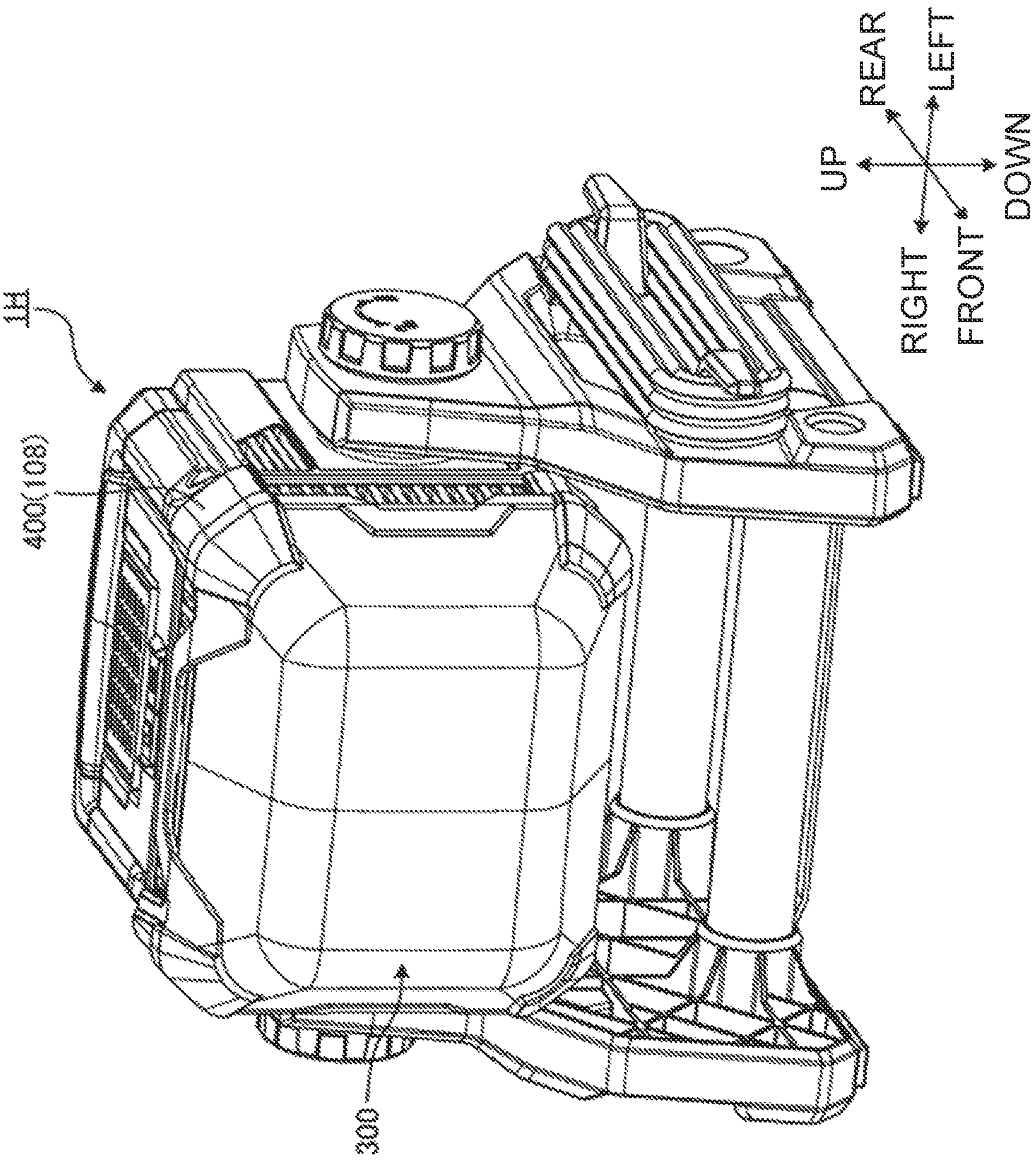
FIG. 36 is a perspective view of an electrical apparatus with a shade according to a modification of the seventh embodiment as viewed from the left front.
Figure 37:
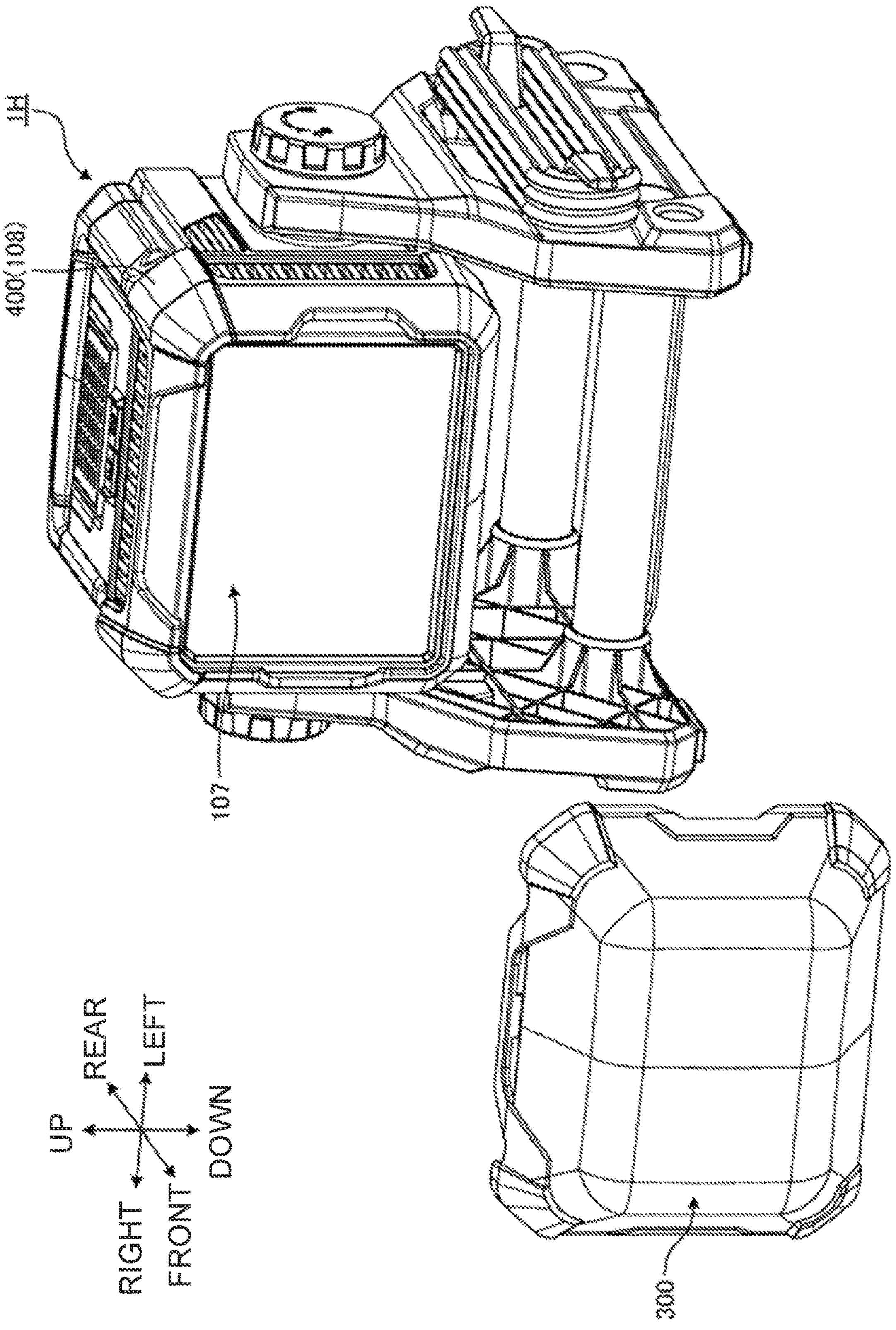
FIG. 37 is an exploded perspective view of the electrical apparatus with the shade according to the modification of the seventh embodiment as viewed from the left front.
Figure 38:
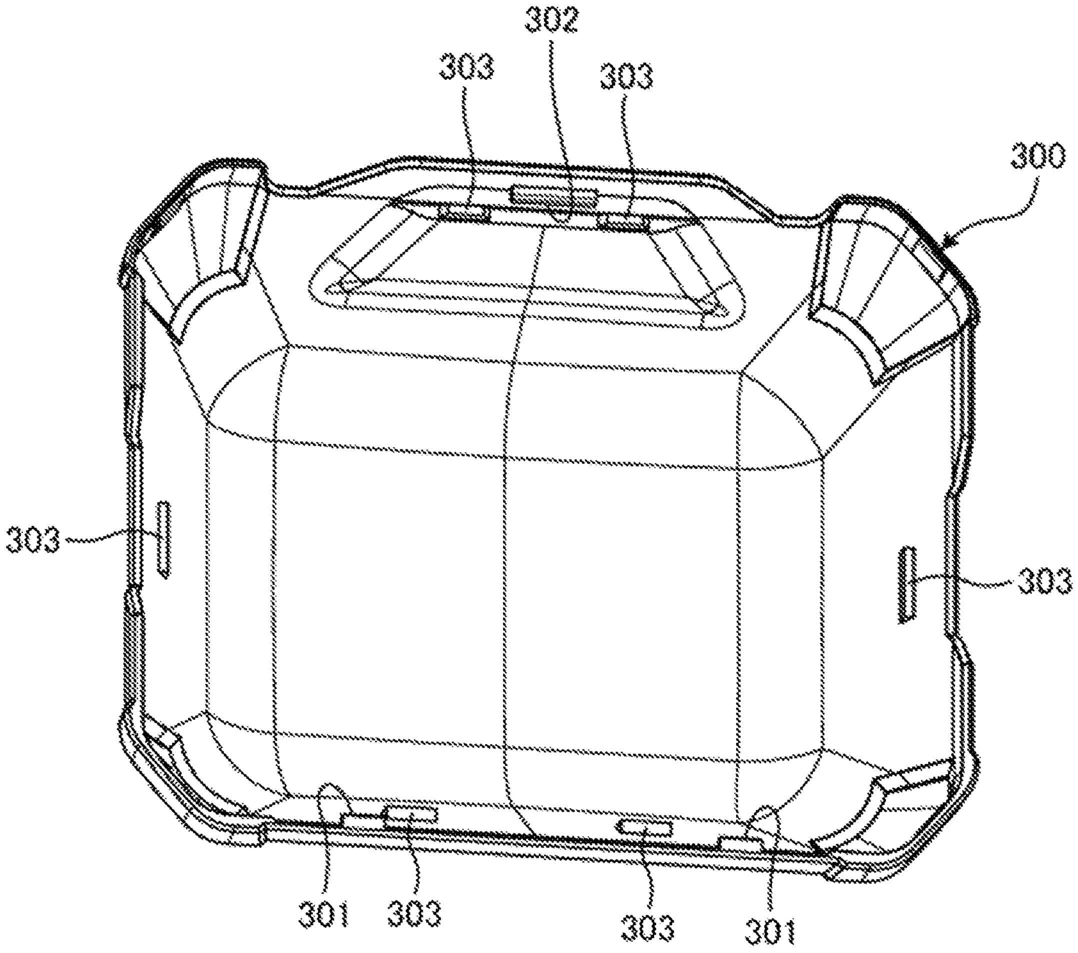
FIG. 38 is a view of the shade in the modification of the seventh embodiment.

FIG. 36 is a perspective view of an electrical apparatus 1H with a shade 300 according to a modification as viewed from the left front. FIG. 37 is an exploded perspective view of the electrical apparatus 1H with the shade 300 according to the modification as viewed from the left front. FIG. 38 is a view of the shade 300 in the modification.

A front housing 108 includes an elastomer portion 400. The elastomer portion 400 is a frame. The elastomer portion 400 surrounds a light emitter 107.

The shade 300 is attachable to and detachable from the elastomer portion 400 on the front housing 108. As shown in FIG. 38, the shade 300 includes two lower tabs 301 on its lower portion. The shade 300 includes one upper tab 302 on its upper portion. The lower tabs 301 are fitted on a lower portion of the elastomer portion 400. The upper tab 302 is fitted on an upper portion of the elastomer portion 400.

As shown in FIG. 38, the shade 300 includes multiple stoppers 303 on its inner surface. The stoppers 303 protrude from the inner surface of the shade 300. The stoppers 303 on the inner surface of the shade 300 include two stoppers 303 located on a lower portion frontward from the lower tabs 301, two stoppers 303 located on an upper portion frontward from the upper tab 302, one stopper 303 located on a left portion, and one stopper 303 located on a right portion.

The lower tabs 301 and the upper tab 302 are fitted on a rear portion of the elastomer portion 400. The stoppers 303 are in contact with the front surface of the elastomer portion 400 with the lower tabs 301 and the upper tab 302 being fitted on the rear portion of the elastomer portion 400. The elastomer portion 400 has its lower portion sandwiched between the lower tabs 301 and the stoppers 303 in the front-rear direction. The elastomer portion 400 has its upper portion sandwiched between the upper tab 302 and the stoppers 303 in the front-rear direction. The stoppers 303 may be slightly spaced apart from the front surface of the elastomer portion 400 with the lower tabs 301 and the upper tab 302 being fitted on the rear portion of the elastomer portion 400.

The shade 300 is bendable. The shade 300 is elastically deformable to cause the lower tabs 301 and the upper tab 302 to move away from each other. To attach the shade 300 to the elastomer portion 400, the user of the electrical apparatus 1H fits the lower tabs 301 onto the lower portion of the elastomer portion 400 and then pivots the shade 300 to cause its upper portion to move toward the upper portion of the elastomer portion 400. The shade 300 has its upper portion placed in contact with the upper portion of the elastomer portion 400 and is then pressed against the elastomer portion 400. The shade 300 thus bends to cause the lower tabs 301 and the upper tab 302 to move away from each other. This causes the upper tab 302 to be fitted on the upper portion of the elastomer portion 400. The elastically deformed shade 300 is then released and attached to the elastomer portion 400. The user of the electrical apparatus 1H may fit the lower tabs 301 onto the lower portion of the elastomer portion 400 after fitting the upper tab 302 onto the upper portion of the elastomer portion 400. The user of the electrical apparatus 1H may fit the lower tabs 301 onto the lower portion of the elastomer portion 400 and fit the upper tab 302 onto the upper portion of the elastomer portion 400 at the same time by bending the shade 300 to cause the lower tabs 301 and the upper tab 302 to move away from each other.

Other Embodiments

In the above embodiments, the cover may be eliminated. The first battery mount may be located on the first surface of the battery holder defined on the body of the electrical apparatus. The second battery mount may be located on the second surface of the battery holder defined on the body of the electrical apparatus. The first surface and the second surface may be different surfaces. The first surface and the second surface may face in different directions, may be at different positions, or may have different sizes or curvatures.

In the above embodiments, the electrical apparatus 1 is an illuminator. The output portion of the electrical apparatus 1 is a light emitter for emitting light. The electrical apparatus 1 may be, for example, a television or an audio output device. The output portion of the television may include a display screen for outputting display data. The output portion of the audio output device may include a speaker for outputting sound. The audio output device may be, for example, an audio amplifier for amplifying and outputting the sound input from a microphone, or a radio for outputting the sound of a radio broadcast.

REFERENCE SIGNS LIST

1 electrical apparatus
1B electrical apparatus
1C electrical apparatus
1D electrical apparatus
1E electrical apparatus
1F electrical apparatus
1G electrical apparatus
1H electrical apparatus
2 body
3 cover
3A upper plate
3B lower plate
3C left plate
3D right plate
3E rear plate
3F support plate
4 leg
4A left leg
4B right leg
4C rod
4D plate
4E lower surface
5 handle
5A arm
5B handle portion
6 housing
7 light emitter (output portion)
7L lens
7S light source
8 front housing
9 rear housing
9A upper plate
9B lower plate
9C left plate
9D right plate
9E rear plate
9F protrusion
9G peripheral portion
10 vent
11 vent
12 hinge
13 latch
14 joining unit
15 hinge
17 power button
19 battery holder
19G battery holder
20 battery compartment
21 first battery mount
21A mount surface
21B first guide
21D power terminal
21L left first battery mount
21R right first battery mount
22 second battery mount
22A mount surface
22B second guide
22C locking slot
22D power terminal
22L left second battery mount
22R right second battery mount
23 first end
24 second end
25 third end
26 fourth end
30 recess
30C recess
31 support surface (first surface)
31C first surface
31D first surface
31E first surface
31F first surface
32 left inner surface
32C second surface
32D second surface
32E second surface
33 right inner surface
33C third surface
33E third surface
34 bottom surface
34C fourth surface
35 opening
35C fifth surface
41 support surface (first surface)
42 left inner surface
43 right inner surface
45 opening
50 linkage
51 link
52 first joint
53 guide slot
54 second joint
55 brake
61 first battery
61A attachment surface
61B housing
61C slide
61F power terminal
62 second battery
62A attachment surface
62B housing
62C slide
62D protruding portion
62E release button
62F power terminal
71 rear surface
71A upper area
71B intermediate area
71C lower area
72 rear surface
72A upper area
72B intermediate area
72C lower area
73 AC terminal
74 cover
80 switch
80B switch
81 AC-DC converter
82 diode
83 diode

84 connection point
85 first switching element
86 second switching element
87 third switching element
88 power switch
89 regulator
90 controller
91 constant current circuit
92 pulse generation circuit
93 signal generation circuit
94 connection point
102 body
103 cover
103A upper plate
103E rear plate
104 leg
104A left leg
104B right leg
104C rod
104D plate
104E lower surface
105 handle
105A arm
105B handle portion
106 housing
107 light emitter (output portion)
108 front housing
109 rear housing
109A upper plate
109B lower plate
109C left plate
109D right plate
109E rear plate
109F protrusion
109G support
200 shade
201 left projection
202 right projection
203 emission surface
203A front surface
203B upper surface
203C lower surface
203D left surface
203E right surface
211 left recess
212 right recess
300 shade
301 lower tab
302 upper tab
303 stopper
350C opening
400 elastomer portion
1010 vent
1012 hinge
1013 latch
1014 joining unit
1015 hinge
1017 power button
1020 battery compartment
1030 recess
1031 rear inner surface (first surface)
1032 left inner surface (second surface)
1033 right inner surface (second surface)
1035 opening
1073 AC terminal
1074 cover
AX hinge axis
BX rotation axis
CX hinge axis
FL placement surface

The invention claimed is:

1. An electrical apparatus to which a first battery or a second battery is detachably attachable, the apparatus comprising:
- a body including an output portion;
- a battery holder having a first surface and a second surface;
- a first battery mount on the first surface, the first battery mount including a first guide to allow the first battery to slide on the first battery mount while being guided along the first guide for attachment to and detachment from the first battery mount;
- a second battery mount on the second surface, the second battery mount including a second guide to allow the second battery to slide on the second battery mount while being guided along the second guide for attachment to and detachment from the second battery mount; and
- a cover configured to define, with the body, a battery compartment;
- wherein the first surface faces the battery compartment,
- the second surface faces the battery compartment,
- the body includes the first surface, and
- the cover includes the second surface.

2. The electrical apparatus according to claim 1, further comprising:
- a hinge joining the cover to the body,
- wherein a guiding direction of the first guide and a guiding direction of the second guide are each orthogonal to a hinge axis of the hinge.

3. The electrical apparatus according to claim 1, further comprising:
- a linkage joining the cover to the body and defining a pivot range of the cover.

4. The electrical apparatus according to claim 1, wherein
- the first battery mount is configured to receive the first battery with a first rated voltage, and
- the second battery mount is configured to receive the second battery with a second rated voltage different from the first rated voltage.

5. The electrical apparatus according to claim 1, wherein
- the first battery mount is configured to receive the first battery with a first outer dimension, and
- the second battery mount is configured to receive the second battery with a second outer dimension different from the first outer dimension.

6. The electrical apparatus according to claim 1, wherein
- the second surface includes a second surface located adjacent to one end of the first surface and a second surface located adjacent to another end of the first surface,
- the first battery mount is configured to receive the first battery with a first outer dimension, and
- the second battery mount is configured to receive the second battery with a second outer dimension smaller than the first outer dimension.

7. The electrical apparatus according to claim 1, wherein
- the electrical apparatus comprises two of the first battery mounts, and two of the second battery mounts.

8. The electrical apparatus according to claim 7, wherein the two first battery mounts are located on the first surface, and the second surface includes a pair of second surfaces, one of the two second battery mounts is located on one of the pair of second surfaces, and the other of the two second battery mounts is located on the other of the pair of second surfaces.

9. The electrical apparatus according to claim 8, wherein one of the pair of second surfaces is connected to a left end of the first surface, and the other of the pair of second surfaces is connected to a right end of the first surface, the pair of second surfaces face each other, the two first battery mounts are arranged in a lateral direction on the first surface, one of the two second battery mounts is located on one of the pair of second surfaces, and the other of the two second battery mounts is located on the other of the pair of second surfaces, and the two first battery mounts and the two second battery mounts are positioned relative to each other in accordance with profiles and dimensions of the first battery and the second battery to cause the second battery to be unattachable to a left second battery mount of the two second battery mounts when the first battery is attached to a left first battery mount of the two first battery mounts, the first battery to be unattachable to the left first battery mount when the second battery is attached to the left second battery mount, the second battery to be unattachable to a right second battery mount of the two second battery mounts when the first battery is attached to a right first battery mount of the two first battery mounts, and the first battery to be unattachable to the right first battery mount when the second battery is attached to the right second battery mount.

10. The electrical apparatus according to claim 7, wherein the first battery is attachable to each of the two first battery mounts when the second battery is unattached to each of the two second battery mounts.

11. The electrical apparatus according to claim 7, wherein the second battery is attachable to each of the two second battery mounts when the first battery is unattached to each of the two first battery mounts.

12. The electrical apparatus according to claim 7, wherein when the first battery is unattached to a first battery mount of the two first battery mounts located in a first direction and the second battery is unattached to a second battery mount of the two second battery mounts located in a second direction, the first battery is attachable to the other first battery mount of the two first battery mounts located in the second direction and the second battery is attachable to the other second battery mount of the two second battery mounts located in the first direction.

13. The electrical apparatus according to claim 1, further comprising:

the first battery attachable to the first battery mount; and the second battery attachable to the second battery mount.

14. An electrical apparatus to which a first battery or a second battery is detachably attachable, the apparatus comprising:

a body including an output portion;

a cover configured to define, with the body, a battery compartment;

a first battery mount to which the first battery is attachable, the first battery mount being located on a first surface of the body facing the battery compartment; and a second battery mount to which the second battery is attachable, the second battery mount being located on at least one second surface of the cover facing the battery compartment.

15. The electrical apparatus according to claim 14, wherein the first battery mount includes a first guide, the second battery mount includes a second guide, the first battery is slidable on the first battery mount while being guided along the first guide for attachment to and detachment from the first battery mount, and the second battery is slidable on the second battery mount while being guided along the second guide for attachment to and detachment from the second battery mount.

16. The electrical apparatus according to claim 15, further comprising:

a hinge joining the cover to the body, wherein a guiding direction of the first guide and a guiding direction of the second guide are each orthogonal to a hinge axis of the hinge.

* * * * *